US010779608B2

(12) United States Patent
Gopalan et al.

(10) Patent No.: US 10,779,608 B2
(45) Date of Patent: Sep. 22, 2020

(54) POLYOLEFIN ELASTOMER COMPOSITIONS AND METHODS OF MAKING THE SAME

(71) Applicant: Cooper-Standard Automotive Inc., Novi, MI (US)

(72) Inventors: Krishnamachari Gopalan, Troy, MI (US); Robert J. Lenhart, Fort Wayne, IN (US); Gending Ji, Waterloo (CA); Roland Herd-Smith, Brignancourt (FR)

(73) Assignee: COOPER-STANDARD AUTOMOTIVE, INC., Novi, MI (US)

( * ) Notice: Subject to any disclaimer, the term of this patent is extended or adjusted under 35 U.S.C. 154(b) by 0 days.

(21) Appl. No.: 15/836,437

(22) Filed: Dec. 8, 2017

(65) Prior Publication Data
US 2018/0163024 A1 Jun. 14, 2018

Related U.S. Application Data

(60) Provisional application No. 62/497,954, filed on Dec. 10, 2016, provisional application No. 62/497,959, filed on Dec. 10, 2016.

(51) Int. Cl.
*C08F 210/02* (2006.01)
*C08J 3/24* (2006.01)
(Continued)

(52) U.S. Cl.
CPC ............ *A43B 13/04* (2013.01); *A43B 13/187* (2013.01); *B29D 35/122* (2013.01); *B32B 5/028* (2013.01); *B32B 27/12* (2013.01); *B32B 27/26* (2013.01); *B32B 27/32* (2013.01); *B32B 37/15* (2013.01); *C08F 8/00* (2013.01); *C08F 8/12* (2013.01); *C08F 210/02* (2013.01); *C08F 210/06* (2013.01); *C08F 255/02* (2013.01); *C08G 77/442* (2013.01); *C08J 3/24* (2013.01); *C08J 3/246* (2013.01); *C08J 5/18* (2013.01); *C08J 9/0061* (2013.01); *C08J 9/06* (2013.01);
(Continued)

(58) Field of Classification Search
CPC .... A43B 13/04; A43B 13/187; B29D 35/122; B32B 27/12; B32B 27/26; B32B 27/32; B32B 37/15; B32B 5/028; B32B 2274/00; B32B 2305/72; B32B 2307/3065; B32B 2307/72; B32B 2419/06; B32B 3/263; B32B 5/18; B32B 2266/0207; B32B 2266/08; B32B 2266/10; B32B 2307/4026; B32B 2307/50; B32B 2307/51; B32B 2307/536; B32B 2307/56; B32B 2307/704; B32B 2437/02; C08F 210/02; C08F 210/06; C08F 255/02; C08F 8/00; C08F 8/12; C08F 2500/08; C08F 2500/21; C08F 2800/20; C08F 2810/20; C08F 210/16; C08F 8/42; C08F 230/08; C08F 2500/18; C08G 77/442; C08G 77/44; C08J 3/24; C08J 3/246; C08J 5/18; C08J 9/0061; C08J 9/06; C08J 9/32; C08J 2201/026; C08J 2203/04; C08J 2300/26; C08J 2323/08; C08J 2323/12; C08J 2323/16; C08J 2383/10; C08J 2423/06; C08J 2423/08; C08J 2423/12; C08J 2423/14; C08J 2423/16; C08J 9/04; C08J 9/122; C08J 2201/03; C08J 2203/06; C08J 2203/08; C08J 2205/052; C08J 2207/00; C08J 2323/14; C08K 3/22; C08K 5/00; C08K 5/0025; C08K 5/5419; C08K 5/42; C08K 5/5415; C08K 9/10; C08L 101/00; C08L 23/06; C08L 23/08; C08L 23/0815; C08L 23/12; C08L 23/16; C08L 23/20; C08L 43/04; C08L 51/06; C08L 53/00; C08L 2205/02; C08L 23/14; C08L 2312/08; C09K 3/1006; C09K 2200/0617; C09K 2200/062; E04D 5/06; E04D 5/10; D06N 5/00
See application file for complete search history.

(56) References Cited

U.S. PATENT DOCUMENTS 3,644,315 A 2/1972 Gardner et al.
3,646,155 A 2/1972 Scott
(Continued)

FOREIGN PATENT DOCUMENTS

EP 0913427 A1 6/1999
EP 920876 A2 6/1999
(Continued)

OTHER PUBLICATIONS

Arhart, Richard J., The Chemistry of Ethylene Propylene Insulation—PartII, IEEE Electrical Insulation Magazine 9 (6), 1993, 11-14.
Adachi et al., Controllable Sllane Water-Cross-Linking Kinetics and Curability of Ethylene-Propylene Copolymer by Amine Compounds, Industrial and Engineering Chemistry Research, 47, 2008, 1812-1819.

(Continued)

*Primary Examiner* — Irina S Zemel
(74) *Attorney, Agent, or Firm* — Mary Jo Boldingh

(57) ABSTRACT

An elastomeric article is provided that includes a composition having a silane-crosslinked polyolefin elastomer with a density less than 0.90 g/cm³. The elastomeric article can exhibit a compression set of from about 5.0% to about 35.0%, as measured according to ASTM D 395 (22 hrs @ 70° C.). The silane-crosslinked polyolefin elastomer can include a first polyolefin having a density less than 0.86 g/cm³, a second polyolefin having a crystallinity less than 40%, a silane crosslinker, a grafting initiator, and a condensation catalyst.

20 Claims, 15 Drawing Sheets

(51) Int. Cl.

| | | |
|---|---|---|
| C08L 23/08 | (2006.01) | |
| A43B 13/04 | (2006.01) | |
| C08L 23/06 | (2006.01) | |
| C08L 23/12 | (2006.01) | |
| C08L 23/14 | (2006.01) | |
| C08J 9/00 | (2006.01) | |
| C08F 255/02 | (2006.01) | |
| C08K 5/00 | (2006.01) | |
| A43B 13/18 | (2006.01) | |
| B29D 35/12 | (2010.01) | |
| B32B 27/12 | (2006.01) | |
| B32B 27/26 | (2006.01) | |
| C08F 8/00 | (2006.01) | |
| C08F 8/12 | (2006.01) | |
| C08L 43/04 | (2006.01) | |
| C08L 51/06 | (2006.01) | |
| C08L 53/00 | (2006.01) | |
| C08J 9/06 | (2006.01) | |
| C08J 9/32 | (2006.01) | |
| C08J 9/12 | (2006.01) | |
| B32B 5/02 | (2006.01) | |
| B32B 27/32 | (2006.01) | |
| B32B 37/15 | (2006.01) | |
| C08J 5/18 | (2006.01) | |
| E04D 5/06 | (2006.01) | |
| E04D 5/10 | (2006.01) | |
| C08F 210/06 | (2006.01) | |
| C08K 5/5419 | (2006.01) | |
| C08L 101/00 | (2006.01) | |
| C08K 3/22 | (2006.01) | |
| C08L 23/16 | (2006.01) | |
| C08L 23/20 | (2006.01) | |
| C09K 3/10 | (2006.01) | |
| C08G 77/442 | (2006.01) | |
| D06N 5/00 | (2006.01) | |
| C08F 230/08 | (2006.01) | |

(52) U.S. Cl.
CPC .......... *C08J 9/122* (2013.01); *C08J 9/32* (2013.01); *C08K 3/22* (2013.01); *C08K 5/00* (2013.01); *C08K 5/0025* (2013.01); *C08K 5/5419* (2013.01); *C08L 23/06* (2013.01); *C08L 23/08* (2013.01); *C08L 23/0815* (2013.01); *C08L 23/12* (2013.01); *C08L 23/14* (2013.01); *C08L 23/16* (2013.01); *C08L 23/20* (2013.01); *C08L 43/04* (2013.01); *C08L 51/06* (2013.01); *C08L 53/00* (2013.01); *C08L 101/00* (2013.01); *C09K 3/1006* (2013.01); *D06N 5/00* (2013.01); *E04D 5/06* (2013.01); *E04D 5/10* (2013.01); *B32B 2274/00* (2013.01); *B32B 2305/72* (2013.01); *B32B 2307/3065* (2013.01); *B32B 2307/72* (2013.01); *B32B 2419/06* (2013.01); *C08F 230/08* (2013.01); *C08F 2500/08* (2013.01); *C08F 2500/21* (2013.01); *C08F 2800/20* (2013.01); *C08F 2810/20* (2013.01); *C08J 2201/026* (2013.01); *C08J 2201/03* (2013.01); *C08J 2203/04* (2013.01); *C08J 2203/06* (2013.01); *C08J 2203/08* (2013.01); *C08J 2205/052* (2013.01); *C08J 2207/00* (2013.01); *C08J 2300/26* (2013.01); *C08J 2323/08* (2013.01); *C08J 2323/12* (2013.01); *C08J 2323/16* (2013.01); *C08J 2383/10* (2013.01); *C08J 2423/06* (2013.01); *C08J 2423/08* (2013.01); *C08J 2423/12* (2013.01); *C08J 2423/14* (2013.01); *C08J 2423/16* (2013.01); *C08L 2205/02* (2013.01); *C08L 2312/08* (2013.01); *C09K 2200/0617* (2013.01)

(56) References Cited

U.S. PATENT DOCUMENTS

| | | | |
|---|---|---|---|
| 3,682,201 | A | 8/1972 | Atwell et al. |
| 4,076,698 | A | 2/1978 | Anderson et al. |
| 4,412,042 | A | 10/1983 | Matsuura et al. |
| 4,419,844 | A | 12/1983 | Kreisfeld |
| 4,515,210 | A | 5/1985 | Smith et al. |
| 4,614,208 | A | 9/1986 | Skarelius |
| 4,618,654 | A | 10/1986 | Schmidtchen et al. |
| 4,798,864 | A | 1/1989 | Topcik |
| 4,803,244 | A | 2/1989 | Umpleby |
| 4,806,594 | A | 2/1989 | Gross et al. |
| 4,818,789 | A | 4/1989 | Tomko et al. |
| 4,870,136 | A | 9/1989 | Yagi et al. |
| 4,894,281 | A | 1/1990 | Yagi et al. |
| 4,927,184 | A | 5/1990 | Bourjot et al. |
| 4,927,871 | A | 5/1990 | Ohori et al. |
| 5,145,628 | A | 9/1992 | Karg et al. |
| 5,252,660 | A | 10/1993 | Hazan et al. |
| 5,266,627 | A | 11/1993 | Meverden et al. |
| 5,272,236 | A | 12/1993 | Lai et al. |
| 5,278,272 | A | 1/1994 | Lai et al. |
| 5,741,858 | A | 4/1998 | Brann et al. |
| 5,814,254 | A | 9/1998 | Bisconti |
| 5,824,718 | A | 10/1998 | Penfold et al. |
| 5,837,174 | A | 11/1998 | Bisconti |
| 5,868,981 | A | 2/1999 | Bisconti |
| 5,880,192 | A | 3/1999 | Brown et al. |
| 5,883,144 | A | 3/1999 | Bambara et al. |
| 5,974,694 | A | 11/1999 | Vecchiola |
| 5,986,002 | A | 11/1999 | Hwang et al. |
| 5,994,474 | A | 11/1999 | Wey et al. |
| 6,048,935 | A | 4/2000 | Penfold et al. |
| 6,068,026 | A | 5/2000 | Garois |
| 6,124,370 | A * | 9/2000 | Walton .............. C08J 9/00 521/143 |
| 6,235,848 | B1 | 5/2001 | Bickert et al. |
| 6,316,512 | B1 | 11/2001 | Bambara et al. |
| 6,361,842 | B1 | 3/2002 | Stachowiak |
| 6,395,791 | B1 | 5/2002 | Chaudhary et al. |
| 6,399,708 | B2 | 6/2002 | Valligny et al. |
| 6,476,132 | B1 | 11/2002 | Abdou-Sabet et al. |
| 6,652,937 | B1 | 11/2003 | Guo et al. |
| 6,794,453 | B2 | 9/2004 | Jackson et al. |
| 6,828,011 | B2 | 12/2004 | Yu et al. |
| 6,864,315 | B1 | 3/2005 | Hakuta et al. |
| 7,041,744 | B2 | 5/2006 | Palmlöf et al. |
| 7,279,529 | B2 | 10/2007 | Hogge et al. |
| 7,281,547 | B2 | 10/2007 | Cleveland et al. |
| 7,524,911 | B2 * | 4/2009 | Karjala .............. A61L 15/58 526/348 |
| 7,834,115 | B2 | 11/2010 | Johansson et al. |
| 8,017,710 | B2 | 9/2011 | Sultan et al. |
| 8,205,391 | B2 | 6/2012 | Aritake et al. |
| 8,299,166 | B2 | 10/2012 | Carlsson |
| 8,318,864 | B2 | 11/2012 | Harris et al. |
| 8,387,625 | B2 | 3/2013 | Kawata et al. |
| 8,728,600 | B1 | 5/2014 | Hayes |
| 8,835,548 | B2 | 9/2014 | Esseghir et al. |
| 9,115,620 | B2 | 8/2015 | Doneva et al. |
| 9,127,110 | B2 | 9/2015 | Sugita et al. |
| 9,387,625 | B2 | 7/2016 | Esseghir et al. |
| 2002/0177659 | A1* | 11/2002 | Morikawa ........... C08J 9/0061 525/88 |
| 2004/0006179 | A1 | 1/2004 | Graf |
| 2004/0045619 | A1 | 3/2004 | Backman et al. |
| 2004/0103948 | A1 | 6/2004 | Scheelen et al. |
| 2004/0157053 | A1 | 8/2004 | Yu et al. |
| 2004/0265524 | A1 | 12/2004 | Wideman et al. |
| 2004/0265563 | A1 | 12/2004 | Sakai et al. |
| 2005/0095374 | A1 | 5/2005 | Cothran et al. |
| 2005/0100747 | A1 | 5/2005 | Gopalan et al. |

(56) References Cited

U.S. PATENT DOCUMENTS

| | | | |
|---|---|---|---|
| 2005/0269737 A1* | 12/2005 | Hogge | A63B 37/0003 264/236 |
| 2006/0185750 A1 | 8/2006 | Mestemacher | |
| 2007/0027250 A1 | 2/2007 | Joseph et al. | |
| 2007/0122570 A1 | 5/2007 | Honda et al. | |
| 2008/0023215 A1 | 1/2008 | Uehara et al. | |
| 2008/0097038 A1 | 4/2008 | Biscoglio et al. | |
| 2008/0306217 A1 | 12/2008 | Karjala et al. | |
| 2008/0314470 A1 | 12/2008 | Trace et al. | |
| 2009/0143531 A1 | 6/2009 | Ouhadi et al. | |
| 2010/0209705 A1 | 8/2010 | Lin et al. | |
| 2010/0249256 A1 | 9/2010 | Moscardi et al. | |
| 2011/0021103 A1* | 1/2011 | Alper | B32B 5/26 442/329 |
| 2011/0144277 A1 | 6/2011 | Weissenbach et al. | |
| 2011/0144278 A1 | 6/2011 | Weissenbach et al. | |
| 2011/0146792 A1 | 6/2011 | Wu et al. | |
| 2011/0172367 A1 | 7/2011 | Backer et al. | |
| 2011/0259464 A1 | 10/2011 | Lacroix et al. | |
| 2012/0042980 A1 | 2/2012 | Mezzalira et al. | |
| 2012/0145275 A1 | 6/2012 | Seebold et al. | |
| 2012/0171496 A1 | 7/2012 | Esseghir et al. | |
| 2012/0178867 A1 | 7/2012 | Esseghir et al. | |
| 2012/0312581 A1 | 12/2012 | Yasuda et al. | |
| 2014/0191161 A1 | 7/2014 | Amako et al. | |
| 2015/0025165 A1* | 1/2015 | Chen | C08L 23/0815 521/140 |
| 2015/0047264 A1 | 2/2015 | Kobayashi | |
| 2016/0174655 A1 | 6/2016 | Schiller et al. | |
| 2016/0208060 A1 | 7/2016 | Nishiguchi et al. | |
| 2016/0251535 A1 | 9/2016 | Chaudhary et al. | |
| 2017/0130876 A1 | 5/2017 | Gopalan et al. | |
| 2017/0204353 A1* | 7/2017 | Lee | C08J 9/103 |

FOREIGN PATENT DOCUMENTS

| | | |
|---|---|---|
| EP | 0944670 B1 | 4/2003 |
| EP | 1820821 A1 | 8/2007 |
| EP | 2083047 A1 | 7/2009 |
| EP | 2143984 A1 | 1/2010 |
| EP | 2407496 A1 | 1/2012 |
| EP | 2520422 A1 | 11/2012 |
| EP | 2546291 A1 | 1/2013 |
| EP | 2395878 B1 | 4/2013 |
| JP | 2013119583 A | 6/2013 |
| WO | 9001503 A1 | 2/1990 |
| WO | 2004031292 A2 | 4/2004 |
| WO | 2005005532 A1 | 1/2005 |
| WO | 2010074916 A1 | 7/2010 |
| WO | 2013134945 A1 | 9/2013 |
| WO | 2015054893 A1 | 4/2015 |
| WO | 2015126931 A1 | 8/2015 |
| WO | 2016004204 A1 | 1/2016 |

OTHER PUBLICATIONS

DOW Corning, Plastics, Polymerization and Rubber, 2009, 5 pages.
Morshedian et al., Polyethylene Cross-linking by Two-step Silane Method: A Review, Iranian Polymer Journal, 18 (2), 2009, 103-128.
Morshedian et al., Silane grafting of polyethylene: effect of molecular structure, physical form, blending, and antioxidants, e-Polymers, No. 24, 2009, 1-17.
Sirisinha et al., The effect of silane carriers on silane grafting of high-desity polyethylene and properties of crosslinked products, Poymer Testing 29, (2010), 958-965.
Why Use Silane Crosslinking Technology, Jun. 8, 2012, <https://wenku.baidu.com/view/3454a9a7b0717fd5360cdcb4>.
Gopalan et al., U.S. Appl. No. 14/305,918, filed Jun. 16, 2014.
Gopalan et al., U.S. Appl. No. 14/449,702, filed Aug. 1, 2014.
International Searching Authority, International Search Report and Written Opinion for International Application No. PCT/US2015/038830, dated Sep. 23, 2015, 12 pages.
European Patent Office, "International Search Report and the Written Opinion of the International Searching Authority," PCT Application No. PCT/US2017/065442, dated Mar. 16, 2018 (10 pages).
European Patent Office, "International Search Report and the Written Opinion of the International Searching Authority," PCT Application No. PCT/US2017/065451, dated Mar. 16, 2018 (10 pages).
European Patent Office, "International Search Report and the Written Opinion of the International Searching Authority," PCT Application No. PCT/US2017/065463, dated Mar. 16, 2018 (10 pages).
European Patent Office, "International Search Report and the Written Opinion of the International Searching Authority," PCT Application No. PCT/US2017/065360, dated Mar. 26, 2018 (11 pages).
European Patent Office, "International Search Report and the Written Opinion of the International Searching Authority," PCT Application No. PCT/US2017/065376, dated Feb. 22, 2018 (11 pages).
European Patent Office, "International Search Report and the Written Opinion of the International Searching Authority," PCT Application No. PCT/US2017/065386, dated Mar. 22, 2018 (11 pages).
European Patent Office, International Search Report and Written Opinion of the International Searching Authority, PCT Application No. PCT/US2017/065459, dated May 25, 2018 (16 pages).
European Patent Office, International Search Report and Written Opion of the International Searching Authority, PCT Application No. PCT/US2017/065404, dated Mar. 16, 2018 (10 pages).
Material Data Center Datasheet of Infuse 9107—TPO—The Dow Chemical Company; Web address https://www.materialdatacenter.com/ms/en/tradenames/Infuse/The+Dow+Chemical+Company/INFUSE%E2%84%A2+9807/4c8e141f/5862.
Material Data Center Datasheet of Infuse 9807+TPO+The Dow Chemical Company; Web address https://www.materialdatacenter.com/ms/en/tradenames/Infuse/The+Dow+Chemical+Company/INFUSE%E2%84%A2+9107/af4357d6/5862.

* cited by examiner

Initiation
Propagation
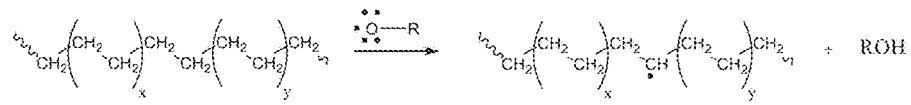
Chain Transfer
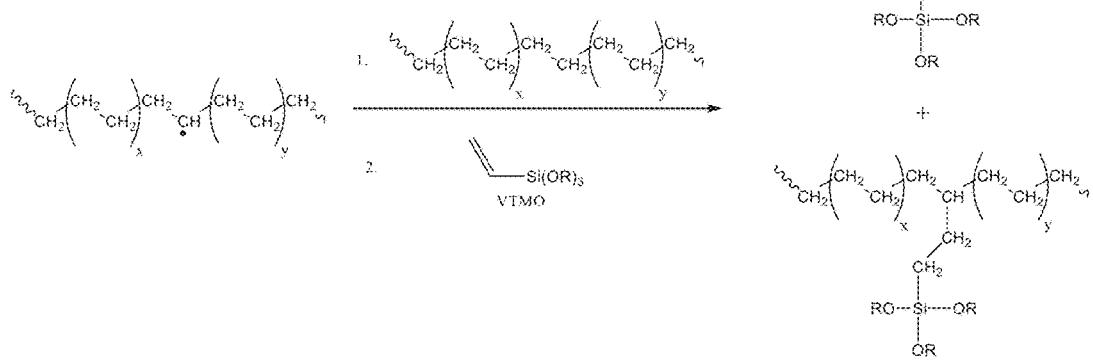
Hydrolysis
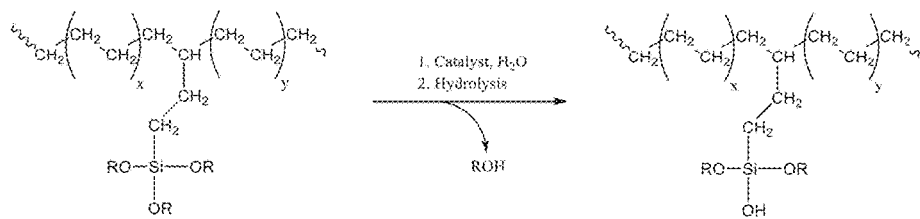
Condensation/Crosslinking
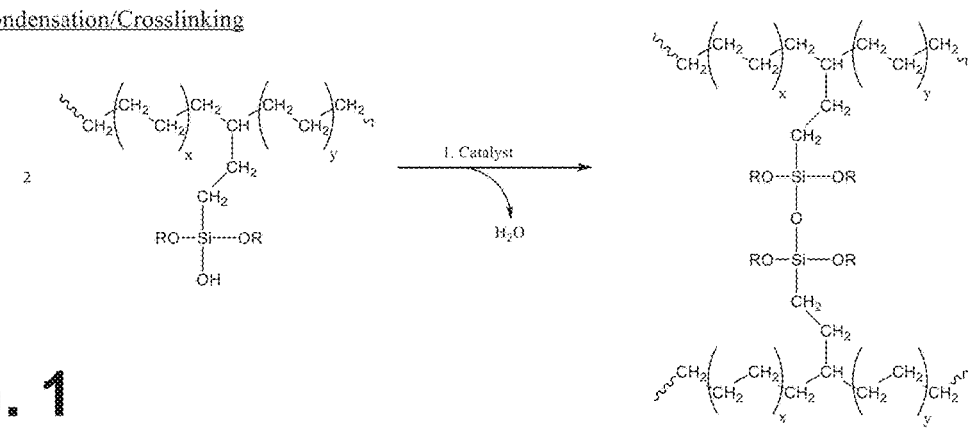
FIG. 1

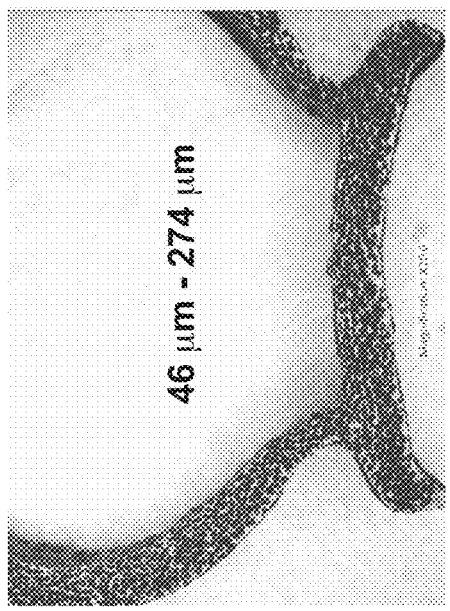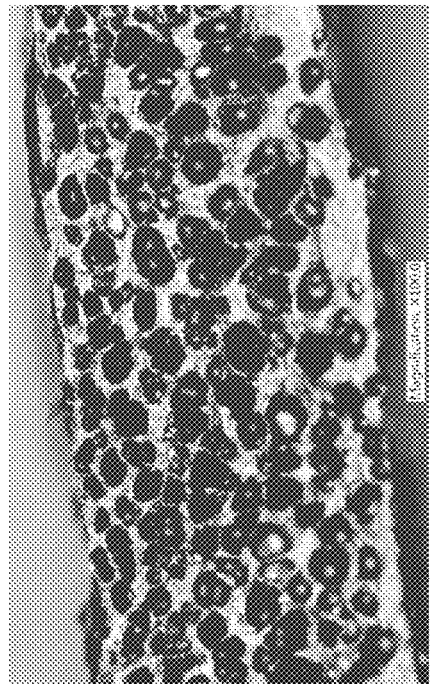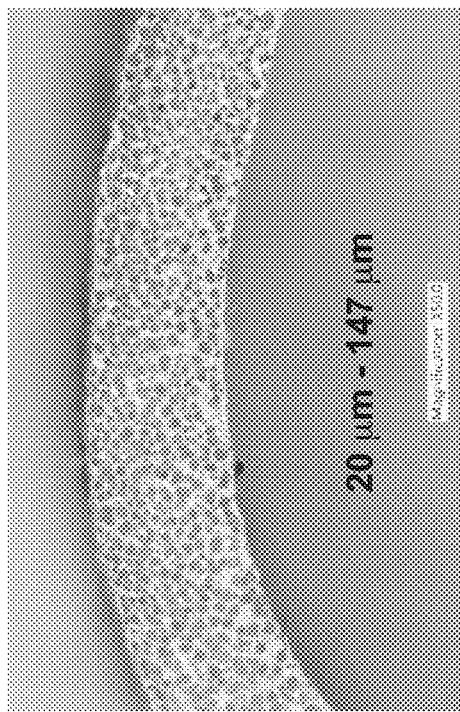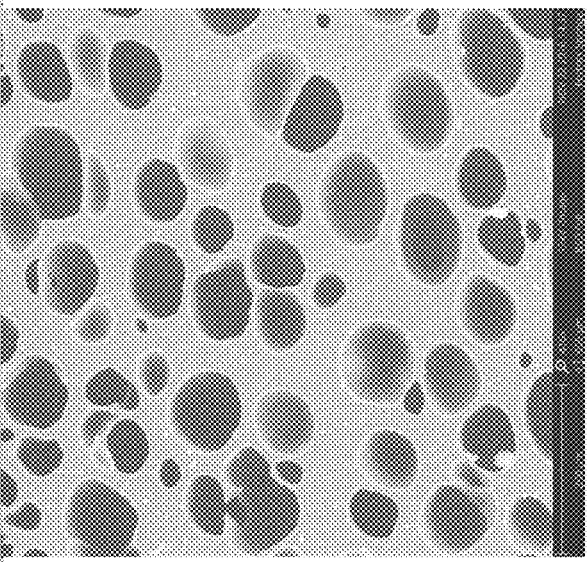
FIG. 15

POLYOLEFIN ELASTOMER COMPOSITIONS AND METHODS OF MAKING THE SAME

CROSS-REFERENCE TO RELATED APPLICATION

This application claims priority under 35 U.S.C. 119(e) to U.S. Provisional Patent Application No. 62/497,959, filed Dec. 10, 2016, entitled "HOSE, COMPOSITION INCLUDING SILANE-GRAFTED POLYOLEFIN, AND PROCESS OF MAKING A HOSE," and to U.S. Provisional Patent Application No. 62/497,954 filed Dec. 10, 2016, entitled "WEATHERSTRIP, COMPOSITION INCLUDING SILANE-GRAFTED POLYOLEFIN, AND PROCESS OF MAKING A WEATHERSTRIP," both of which are herein incorporated by reference in their entirety.

FIELD OF THE DISCLOSURE

The disclosure generally relates to silane-grafted polyolefin elastomer compositions that may be used to form many different end products, and more particularly, to compositions and methods for manufacturing these compositions used to form weatherstrip seals, membranes, hoses, and other elastic materials.

BACKGROUND OF THE DISCLOSURE

Thermoplastic vulcanizates (TPV) are part of the thermoplastic elastomer (TPE) family of polymers but are closest in elastomeric properties to ethylene propylene diene monomer (EPDM) thermoset rubber. TPVs are relatively easy to process, but their properties can be limited in terms of elastomeric performance and durability over time. Similarly, EPDM rubber formulations often require many ingredients (e.g., carbon black, petroleum-based oil, zinc oxide, miscellaneous fillers such as calcium carbonate or talc, processing aids, curatives, blowing agents, and many other materials to meet performance requirements), which tend to decrease their elastic performance over time and increase their material cost.

EPDM-based materials are also costly from a process standpoint. The EPDM constituent ingredients are typically mixed together in a one- or two-step process prior to shipping to an extrusion facility. At the extrusion facility, the ingredients and rubber compound(s) are extruded together to form a final material, which is subsequently formed into a variety of elastomeric materials. Hence, the extrusion process used to manufacture weatherstrips can include many stages, depending on the type of EPDM or other types of resins, and may additionally require long lengths of curing ovens. For example, extrusion lines of up to 80 yards in length that are powered by natural gas and/or electricity may be required. Much of the natural gas and/or electricity is used to fuel hot air ovens, microwaves, infrared ovens, or other types of equipment used to vulcanize the EPDM rubber compounds. The vulcanization process also produces fumes that must be vented and monitored to comply with environmental requirements. Overall, the processes used to fabricate traditional EPDM-based products can be very time consuming, costly, and environmentally unfriendly.

Mindful of the drawbacks associated with current TPV and EPDM-based polymeric compositions, industry has a need for the development of new compositions and methods for manufacturing polyolefin elastomeric materials that are simpler, lighter in weight, lower in cost, have superior long-term load loss (LLS), and are more environmentally friendly.

SUMMARY OF THE DISCLOSURE

According to one aspect of the present disclosure, a silane-crosslinked polyolefin elastomer blend is disclosed. The silane-crosslinked polyolefin elastomer blend includes a first polyolefin having a density less than 0.86 g/cm$^3$, a second polyolefin having a crystallinity less than 40%, and a silane crosslinker. The silane-crosslinked polyolefin elastomer blend exhibits a compression set of from about 5.0% to about 35.0%, as measured according to ASTM D 395 (22 hrs @ 70° C.). The silane-crosslinked polyolefin elastomer blend has a density less than 0.90 g/cm$^3$.

According to another aspect of the present disclosure, a silane-crosslinked polyolefin elastomer blend is disclosed. The silane-crosslinked polyolefin elastomer blend includes a first polyolefin having a density less than 0.86 g/cm$^3$, a second polyolefin having a crystallinity less than 40%, a silane crosslinker, and a microencapsulating foaming agent. The silane-crosslinked polyolefin elastomer blend exhibits a compression set of from about 5.0% to about 35.0%, as measured according to ASTM D 395 (22 hrs @ 70° C.). The silane-crosslinked polyolefin elastomer blend has a density less than 0.70 g/cm$^3$.

According to a further aspect of the present disclosure, a silane-crosslinked polyolefin elastomer blend is disclosed. The silane-crosslinked polyolefin elastomer blend includes a first polyolefin having a density less than 0.86 g/cm$^3$, a second polyolefin having a crystallinity less than 40%, a silane crosslinker, and a foaming agent. The silane-crosslinked polyolefin elastomer blend exhibits a compression set of from about 5.0% to about 35.0%, as measured according to ASTM D 395 (22 hrs @ 70° C.). The silane-crosslinked polyolefin elastomer blend has a density less than 0.60 g/cm$^3$.

According to a further aspect of the present disclosure, an elastomeric article is disclosed having a silane-crosslinked polyolefin elastomer blend includes a first polyolefin having a density less than 0.86 g/cm$^3$, a second polyolefin having a crystallinity less than 40%, and a silane crosslinker. The elastomeric article exhibits a compression set of from about 5.0% to about 35.0%, as measured according to ASTM D 395 (22 hrs @ 70° C.). The elastomeric article additionally has a density less than 0.60 g/cm$^3$.

According to yet a further aspect of the present disclosure, a method for making an elastomeric article is disclosed. The method includes the steps of: extruding a first polyolefin having a density less than 0.86 g/cm$^3$, a second polyolefin having a crystallinity less than 40%, a silane crosslinker and a grafting initiator together to form a silane-grafted polyolefin blend; extruding the silane-grafted polyolefin blend and a condensation catalyst together to form a silane-crosslinkable polyolefin blend; molding the silane-crosslinkable polyolefin blend into an uncured elastomeric article; and crosslinking the crosslinkable-polyolefin blend at an ambient temperature and an ambient humidity to form the elastomeric article having a density from less than 0.90 g/cm$^3$. The elastomeric article exhibits a compression set of from about 5.0% to about 35.0%, as measured according to ASTM D 395 (22 hrs @ 70° C.).

These and other aspects, objects, and features of the present disclosure will be understood and appreciated by those skilled in the art upon studying the following specification, claims, and appended drawings.

BRIEF DESCRIPTION OF THE DRAWINGS

In the drawings:

FIG. 1 is a schematic reaction pathway used to produce a silane-crosslinked polyolefin elastomer according to some aspects of the present disclosure;

FIG. 15 is a set of micrographs of dynamic silane-crosslinked elastomers, as processed with a supercritical gas-injected fluid or a chemical foaming agent, according to aspects of the disclosure.

DETAILED DESCRIPTION OF THE EMBODIMENTS

Figure 2:
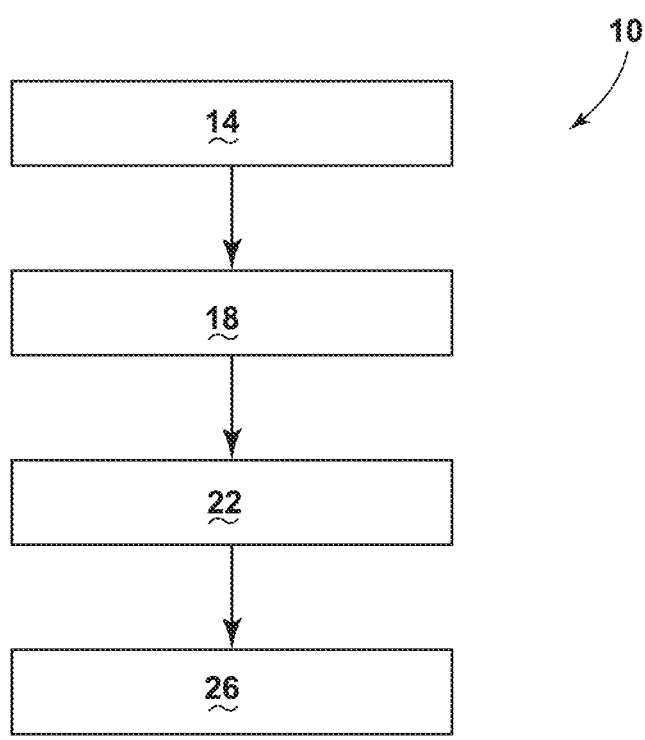
FIG. 2 is a flow diagram of a method for making a static seal with a silane-crosslinked polyolefin elastomer using a two-step Sioplas approach according to some aspects of the present disclosure.

It is to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

All ranges disclosed herein are inclusive of the recited endpoint and independently combinable (for example, the range of "from 2 to 10" is inclusive of the endpoints, 2 and 10, and all the intermediate values). The endpoints of the ranges and any values disclosed herein are not limited to the precise range or value; they are sufficiently imprecise to include values approximating these ranges and/or values.

A value modified by a term or terms, such as "about" and "substantially," may not be limited to the precise value specified. The approximating language may correspond to the precision of an instrument for measuring the value. The modifier "about" should also be considered as disclosing the range defined by the absolute values of the two endpoints. For example, the expression "from about 2 to about 4" also discloses the range "from 2 to 4."

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

A silane-crosslinked polyolefin elastomer is provided. In general, the silane-crosslinked polyolefin elastomer can exhibit a compression set of from about 5.0% to about 35.0% measured according to ASTM D 395 (22 hrs @ 70° C.). The silane-crosslinked polyolefin elastomer can be produced from a blend including a first polyolefin having a density less than 0.86 g/cm$^3$, a second polyolefin having a crystallinity less than 40° C., a silane crosslinker, a grafting initiator, and a condensation catalyst. In some aspects, the silane-crosslinked polyolefin elastomer has a density less than 0.90 g/cm$^3$. In other aspects, the silane-crosslinked polyolefin elastomer has a density less than 0.70 g/cm$^3$. In still other aspects, the silane-crosslinked polyolefin elastomer has a density less than 0.60 g/cm$^3$.

Thus, the disclosure herein focuses on the composition, method of making the composition, and the corresponding material properties for the silane-crosslinked polyolefin elastomer used to make elastomeric articles. The elastomeric article is formed from a silane-grafted polyolefin where the silane-grafted polyolefin may have a catalyst added to form a silane-crosslinkable polyolefin elastomer. This silane-crosslinkable polyolefin may then be crosslinked upon exposure to moisture and/or heat to form the final silane-crosslinked polyolefin elastomer or blend. In many aspects, the silane-crosslinked polyolefin elastomer or blend includes a first polyolefin having a density less than 0.90 g/cm$^3$, a second polyolefin having a crystallinity of less than 40%, a silane crosslinker, a graft initiator, and a condensation catalyst. In other aspects, the silane-crosslinked polyolefin elastomer or blend includes just one polyolefin having a density less than 0.90 g/cm$^3$ and a crystallinity of less than 40%, a silane crosslinker, a graft initiator, and a condensation catalyst.

First Polyolefin

The first polyolefin can be a polyolefin elastomer including an olefin block copolymer, an ethylene/α-olefin copolymer, a propylene/α-olefin copolymer, EPDM, EPM, or a mixture of two or more of any of these materials. Exemplary block copolymers include those sold under the trade names INFUSE™, an olefin block co-polymer (the Dow Chemical Company) and SEPTON™ V-SERIES, a styrene-ethylene-butylene-styrene block copolymer (Kuraray Co., LTD.). Exemplary ethylene/α-olefin copolymers include those sold under the trade names TAFMER™ (e.g., TAFMER DF710) (Mitsui Chemicals, Inc.), and ENGAGE™ (e.g., ENGAGE 8150) (the Dow Chemical Company). Exemplary propylene/α-olefin copolymers include those sold under the trade name VISTAMAXX 6102 grades (Exxon Mobil Chemical Company), TAFMER™ XM (Mitsui Chemical Company), and Versify (Dow Chemical Company). The EPDM may have a diene content of from about 0.5 to about 10 wt %. The EPM may have an ethylene content of 45 wt % to 75 wt %.

The term "comonomer" refers to olefin comonomers which are suitable for being polymerized with olefin monomers, such as ethylene or propylene monomers. Comonomers may comprise but are not limited to aliphatic $C_2$-$C_{20}$ α-olefins. Examples of suitable aliphatic $C_2$-$C_{20}$ α-olefins include ethylene, propylene, 1-butene, 4-methyl-1-pentene, 1-hexene, 1-octene, 1-decene, 1-dodecene, 1-tetradecene, 1-hexadecene, 1-octadecene and 1-eicosene. In some aspects, the comonomer is vinyl acetate. The term "copolymer" refers to a polymer, which is made by linking more than one type of monomer in the same polymer chain. The term "homopolymer" refers to a polymer which is made by linking olefin monomers, in the absence of comonomers. The amount of comonomer can, in some embodiments, be from greater than 0 to about 12 wt % based on the weight of the polyolefin, including from greater than 0 to about 9 wt % and from greater than 0 to about 7 wt %. In some embodiments, the comonomer content is greater than about 2 mol % of the final polymer, including greater than about 3 mol % and greater than about 6 mol %. The comonomer content may be less than or equal to about 30 mol %. A copolymer can be a random or block (heterophasic) copolymer. In some embodiments, the polyolefin is a random copolymer of propylene and ethylene.

In some aspects, the first polyolefin is selected from the group consisting of: an olefin homopolymer, a blend of homopolymers, a copolymer made using two or more olefins, a blend of copolymers each made using two or more olefins, and a combination of olefin homopolymers blended with copolymers made using two or more olefins. The olefin may be selected from ethylene, propylene, 1-butene, 1-propene, 1-hexene, 1-octene, and other higher 1-olefin. The first polyolefin may be synthesized using many different processes (e.g., using gas phase and solution based using metallocene catalysis and Ziegler-Natta catalysis) and optionally using a catalyst suitable for polymerizing ethylene and/or α-olefins. In some aspects, a metallocene catalyst may be used to produce low density ethylene/α-olefin polymers.

In some aspects, the first polyolefin includes an ethylene-octene copolymer, an ethylene-octene random copolymer, an ethylene-octene block copolymer where the ethylene-octene copolymer is made from about 30 wt % ethylene, about 35 wt % ethylene, about 40 wt % ethylene, about 45 wt % ethylene, about 50 wt % ethylene, about 55 wt % ethylene, about 60 wt % ethylene, about 65 wt % ethylene, about 70 wt % ethylene, about 75 wt % ethylene, about 80 wt % ethylene, or about 85 wt % ethylene. In other aspects, the first polyolefin includes an ethylene-1-alkene copolymer, an ethylene-1-alkene random copolymer, an ethylene-1-alkene block copolymer where the ethylene-1-alkene copolymer is made from about 30 wt % ethylene, about 35 wt % ethylene, about 40 wt % ethylene, about 45 wt % ethylene, about 50 wt % ethylene, about 55 wt % ethylene, about 60 wt % ethylene, about 65 wt % ethylene, about 70 wt % ethylene, about 75 wt % ethylene, about 80 wt % ethylene, or about 85 wt % ethylene.

In some aspects, the polyethylene used for the first polyolefin can be classified into several types including, but not limited to, LDPE (Low Density Polyethylene), LLDPE (Linear Low Density Polyethylene), and HDPE (High Density Polyethylene). In other aspects, the polyethylene can be classified as Ultra High Molecular Weight (UHMW), High Molecular Weight (HMW), Medium Molecular Weight (MMW) and Low Molecular Weight (LMW). In still other aspects, the polyethylene may be an ultra-low density ethylene elastomer.

In some aspects, the first polyolefin may include a LDPE/silane copolymer or blend. In other aspects, the first polyolefin may be polyethylene that can be produced using any catalyst known in the art including, but not limited to, chromium catalysts, Ziegler-Natta catalysts, metallocene catalysts or post-metallocene catalysts.

In some aspects, the first polyolefin may have a molecular weight distribution $M_w/M_n$ of less than or equal to about 5, less than or equal to about 4, from about 1 to about 3.5, or from about 1 to about 3.

The first polyolefin may be present in an amount of from greater than 0 to about 100 wt % of the composition. In some embodiments, the amount of polyolefin elastomer is from about 30 to about 70 wt %. In some aspects, the first polyolefin fed to an extruder can include from about 50 wt % to about 80 wt % of an ethylene/α-olefin copolymer, including from about 60 wt % to about 75 wt % and from about 62 wt % to about 72 wt %.

The first polyolefin may have a melt viscosity in the range of from about 2,000 cP to about 50,000 cP as measured using a Brookfield viscometer at a temperature of about 177° C. In some embodiments, the melt viscosity is from about 4,000 cP to about 40,000 cP, including from about 5,000 cP to about 30,000 cP and from about 6,000 cP to about 18,000 cP.

The first polyolefin may have a melt index (T2), measured at 190° C. under a 2.16 kg load, of from about 20.0 g/10 min to about 3,500 g/10 min, including from about 250 g/10 min to about 1,900 g/10 min and from about 300 g/10 min to about 1,500 g/10 min. In some aspects, the first polyolefin has a fractional melt index of from 0.5 g/10 min to about 3,500 g/10 min.

In some aspects, the density of the first polyolefin is less than 0.90 g/cm$^3$, less than about 0.89 g/cm$^3$, less than about 0.88 g/cm$^3$, less than about 0.87 g/cm$^3$, less than about 0.86 g/cm$^3$, less than about 0.85 g/cm$^3$, less than about 0.84 g/cm$^3$, less than about 0.83 g/cm$^3$, less than about 0.82 g/cm$^3$, less than about 0.81 g/cm$^3$, or less than about 0.80 g/cm$^3$. In other aspects, the density of the first polyolefin may be from about 0.85 g/cm$^3$ to about 0.89 g/cm$^3$, from about 0.85 g/cm$^3$ to about 0.88 g/cm$^3$, from about 0.84 g/cm$^3$ to about 0.88 g/cm$^3$, or from about 0.83 g/cm$^3$ to about 0.87 g/cm$^3$. In still other aspects, the density is at about 0.84 g/cm$^3$, about 0.85 g/cm$^3$, about 0.86 g/cm$^3$, about 0.87 g/cm$^3$, about 0.88 g/cm$^3$, or about 0.89 g/cm$^3$.

The percent crystallinity of the first polyolefin may be less than about 60%, less than about 50%, less than about 40%, less than about 35%, less than about 30%, less than about 25%, or less than about 20%. The percent crystallinity may be at least about 10%. In some aspects, the crystallinity is in the range of from about 2% to about 60%.

Second Polyolefin

The second polyolefin can be a polyolefin elastomer including an olefin block copolymer, an ethylene/α-olefin copolymer, a propylene/α-olefin copolymer, EPDM, EPM, or a mixture of two or more of any of these materials. Exemplary block copolymers include those sold under the trade names INFUSE™ (the Dow Chemical Company) and SEPTON™ V-SERIES (Kuraray Co., LTD.). Exemplary ethylene/α-olefin copolymers include those sold under the trade names TAFMER™ (e.g., TAFMER DF710) (Mitsui Chemicals, Inc.) and ENGAGE™ (e.g., ENGAGE 8150) (the Dow Chemical Company). Exemplary propylene/α-olefin copolymers include those sold under the trade name TAFMER™ XM grades (Mitsui Chemical Company) and VISTAMAXX™ (e.g., VISTAMAXX 6102) (Exxon Mobil Chemical Company). The EPDM may have a diene content of from about 0.5 to about 10 wt %. The EPM may have an ethylene content of 45 wt % to 75 wt %.

In some aspects, the second polyolefin is selected from the group consisting of: an olefin homopolymer, a blend of homopolymers, a copolymer made using two or more olefins, a blend of copolymers each made using two or more olefins, and a blend of olefin homopolymers with copolymers made using two or more olefins. The olefin may be selected from ethylene, propylene, 1-butene, 1-propene, 1-hexene, 1-octene, and other higher 1-olefin. The first polyolefin may be synthesized using many different processes (e.g., using gas phase and solution based using metallocene catalysis and Ziegler-Natta catalysis) and optionally using a catalyst suitable for polymerizing ethylene and/or α-olefins. In some aspects, a metallocene catalyst may be used to produce low density ethylene/α-olefin polymers.

In some aspects, the second polyolefin includes an ethylene-octene copolymer, an ethylene-octene random copolymer, an ethylene-octene block copolymer where the ethylene-octene copolymer is made from about 30 wt % ethylene, about 35 wt % ethylene, about 40 wt % ethylene, about 45 wt % ethylene, about 50 wt % ethylene, about 55 wt % ethylene, about 60 wt % ethylene, about 65 wt % ethylene, about 70 wt % ethylene, about 75 wt % ethylene, about 80 wt % ethylene, or about 85 wt % ethylene. In other aspects, the first polyolefin includes an ethylene-1-alkene copolymer, an ethylene-1-alkene random copolymer, an ethylene-1-alkene block copolymer where the ethylene-1-alkene copolymer is made from about 30 wt % ethylene, about 35 wt % ethylene, about 40 wt % ethylene, about 45 wt % ethylene, about 50 wt % ethylene, about 55 wt % ethylene, about 60 wt % ethylene, about 65 wt % ethylene, about 70 wt % ethylene, about 75 wt % ethylene, about 80 wt % ethylene, or about 85 wt % ethylene.

In some aspects, the second polyolefin may include a polypropylene homopolymer, a polypropylene copolymer, a polyethylene-co-propylene copolymer, or a mixture thereof. Suitable polypropylenes include but are not limited to polypropylene obtained by homopolymerization of propylene or copolymerization of propylene and an alpha-olefin comonomer. In some aspects, the second polyolefin may have a higher molecular weight and/or a higher density than the first polyolefin.

In some embodiments, the second polyolefin may have a molecular weight distribution $M_w/M_n$ of less than or equal to about 5, less than or equal to about 4, from about 1 to about 3.5, or from about 1 to about 3.

The second polyolefin may be present in an amount of from greater than 0 wt % to about 100 wt % of the composition. In some embodiments, the amount of polyolefin elastomer is from about 30 wt % to about 70 wt %. In some embodiments, the second polyolefin fed to the extruder can include from about 10 wt % to about 50 wt % polypropylene, from about 20 wt % to about 40 wt % polypropylene, or from about 25 wt % to about 35 wt % polypropylene. The polypropylene may be a homopolymer or a copolymer.

The second polyolefin may have a melt viscosity in the range of from about 2,000 cP to about 50,000 cP as measured using a Brookfield viscometer at a temperature of about 177° C. In some embodiments, the melt viscosity is from about 4,000 cP to about 40,000 cP, including from about 5,000 cP to about 30,000 cP and from about 6,000 cP to about 18,000 cP.

The second polyolefin may have a melt index (T2), measured at 190° C. under a 2.16 kg load, of from about 20.0 g/10 min to about 3,500 g/10 min, including from about 250 g/10 min to about 1,900 g/10 min and from about 300 g/10 min to about 1,500 g/10 min. In some embodiments, the polyolefin has a fractional melt index of from 0.5 g/10 min to about 3,500 g/10 min.

In some aspects, the density of the second polyolefin is less than 0.90 g/cm$^3$, less than about 0.89 g/cm$^3$, less than about 0.88 g/cm$^3$, less than about 0.87 g/cm$^3$, less than about 0.86 g/cm$^3$, less than about 0.85 g/cm$^3$, less than about 0.84 g/cm$^3$, less than about 0.83 g/cm$^3$, less than about 0.82 g/cm$^3$, less than about 0.81 g/cm$^3$, or less than about 0.80 g/cm$^3$. In other aspects, the density of the first polyolefin may be from about 0.85 g/cm$^3$ to about 0.89 g/cm$^3$, from about 0.85 g/cm$^3$ to about 0.88 g/cm$^3$, from about 0.84 g/cm$^3$ to about 0.88 g/cm$^3$, or from about 0.83 g/cm$^3$ to about 0.87 g/cm$^3$. In still other aspects, the density is at about 0.84 g/cm$^3$, about 0.85 g/cm$^3$, about 0.86 g/cm$^3$, about 0.87 g/cm$^3$, about 0.88 g/cm$^3$, or about 0.89 g/cm$^3$.

The percent crystallinity of the second polyolefin may be less than about 60%, less than about 50%, less than about 40%, less than about 35%, less than about 30%, less than about 25%, or less than about 20%. The percent crystallinity may be at least about 10%. In some aspects, the crystallinity is in the range of from about 2% to about 60%.

As noted, the silane-crosslinked polyolefin elastomer or blend includes both the first polyolefin and the second polyolefin. The second polyolefin is generally used to modify the hardness and/or processability of the first polyolefin having a density less than 0.90 g/cm$^3$. In some aspects, more than just the first and second polyolefins may be used to form the silane-crosslinked polyolefin elastomer or blend. For example, in some aspects, one, two, three, four, or more different polyolefins having a density less than 0.90 g/cm$^3$, less than 0.89 g/cm$^3$, less than 0.88 g/cm$^3$, less than 0.87 g/cm$^3$, less than 0.86 g/cm$^3$, or less than 0.85 g/cm$^3$ may be substituted and/or used for the first polyolefin. In some aspects, one, two, three, four, or more different polyolefins, polyethylene-co-propylene copolymers may be substituted and/or used for the second polyolefin.

The blend of the first polyolefin having a density less than 0.90 g/cm$^3$ and the second polyolefin having a crystallinity less than 40% is used because the subsequent silane grafting and crosslinking of these first and second polyolefin materials together are what form the core resin structure in the final silane-crosslinked polyolefin elastomer. Although additional polyolefins may be added to the blend of the silane-grafted, silane-crosslinkable, and/or silane-crosslinked polyolefin elastomer as fillers to improve and/or modify the Young's modulus as desired for the final product, any polyolefins added to the blend having a crystallinity equal to or greater than 40% are not chemically or covalently incorporated into the crosslinked structure of the final silane-crosslinked polyolefin elastomer.

In some aspects, the first and second polyolefins may further include one or more TPVs and/or EPDM with or without silane graft moieties where the TPV and/or EPDM polymers are present in an amount of up to 20 wt % of the silane-crosslinker polyolefin elastomer/blend.

Grafting Initiator

A grafting initiator (also referred to as "a radical initiator" in the disclosure) can be utilized in the grafting process of at least the first and second polyolefins by reacting with the respective polyolefins to form a reactive species that can react and/or couple with the silane crosslinker molecule. The grafting initiator can include halogen molecules, azo compounds (e.g., azobisisobutyl), carboxylic peroxyacids, peroxyesters, peroxyketals, and peroxides (e.g., alkyl hydroperoxides, dialkyl peroxides, and diacyl peroxides). In some embodiments, the grafting initiator is an organic peroxide selected from di-t-butyl peroxide, t-butyl cumyl peroxide, dicumyl peroxide, 2,5-dimethyl-2,5-di(t-butyl-peroxy) hexyne-3,1,3-bis(t-butyl-peroxy-isopropyl)benzene, n-butyl-4,4-bis(t-butyl-peroxy)valerate, benzoyl peroxide, t-butylperoxybenzoate, t-butylperoxy isopropyl carbonate, and t-butylperbenzoate, as well as bis(2-methylbenzoyl)peroxide, bis(4-methylbenzoyl)peroxide, t-butyl peroctoate, cumene hydroperoxide, methyl ethyl ketone peroxide, lauryl peroxide, tert-butyl peracetate, di-t-amyl peroxide, t-amyl peroxybenzoate, 1,1-bis(t-butylperoxy)-3,3,5-trimethylcyclohexane, α,α'-bis(t-butylperoxy)-1,3-diisopropylbenzene, α,α'-bis(t-butylpexoxy)-1,4-diisopropylbenzene, 2,5-bis(t-butylperoxy)-2,5-dimethylhexane, and 2,5-bis(t-butylperoxy)-2,5-dimethyl-3-hexyne and 2,4-dichlorobenzoyl peroxide. Exemplary peroxides include those sold under the tradename LUPEROX™ (available from Arkema, Inc.).

In some aspects, the grafting initiator is present in an amount of from greater than 0 wt % to about 2 wt % of the composition, including from about 0.15 wt % to about 1.2 wt % of the composition. The amount of initiator and silane employed may affect the final structure of the silane grafted polymer (e.g., the degree of grafting in the grafted polymer and the degree of crosslinking in the cured polymer). In some aspects, the reactive composition contains at least 100 ppm of initiator, or at least 300 ppm of initiator. The initiator may be present in an amount from 300 ppm to 1500 ppm, or from 300 ppm to 2000 ppm. The silane:initiator weight ratio may be from about 20:1 to 400:1, including from about 30:1 to about 400:1, from about 48:1 to about 350:1, and from about 55:1 to about 333:1.

The grafting reaction can be performed under conditions that optimize grafts onto the interpolymer backbone while minimizing side reactions (e.g., the homopolymerization of the grafting agent). The grafting reaction may be performed in a melt, in solution, in a solid-state, and/or in a swollen-state. The silanation may be performed in a wide-variety of equipment (e.g., twin screw extruders, single screw extruders, Brabenders, internal mixers such as Banbury mixers, and batch reactors). In some embodiments, the polyolefin, silane, and initiator are mixed in the first stage of an extruder. The melt temperature (i.e., the temperature at which the polymer starts melting and starts to flow) may be from about 120° C. to about 260° C., including from about 130° C. to about 250° C.

Silane Crosslinker

A silane crosslinker can be used to covalently graft silane moieties onto the first and second polyolefins and the silane crosslinker may include alkoxysilanes, silazanes, siloxanes, or a combination thereof. The grafting and/or coupling of the various potential silane crosslinkers or silane crosslinker molecules is facilitated by the reactive species formed by the grafting initiator reacting with the respective silane crosslinker.

In some aspects, the silane crosslinker is a silazane where the silazane may include, for example, hexamethyldisilazane (HMDS) or Bis(trimethylsilyl)amine. In some aspects, the silane crosslinker is a siloxane where the siloxane may include, for example, polydimethylsiloxane (PDMS) and octamethylcyclotetrasiloxane.

In some aspects, the silane crosslinker is an alkoxysilane. As used herein, the term "alkoxysilane" refers to a compound that comprises a silicon atom, at least one alkoxy group and at least one other organic group, wherein the silicon atom is bonded with the organic group by a covalent bond. Preferably, the alkoxysilane is selected from alkylsilanes; acryl-based silanes; vinyl-based silanes; aromatic silanes; epoxy-based silanes; amino-based silanes and amines that possess —$NH_2$, —$NHCH_3$ or —$N(CH_3)_2$; ureide-based silanes; mercapto-based silanes; and alkoxysilanes which have a hydroxyl group (i.e., —OH). An acryl-based silane may be selected from the group comprising beta-acryloxyethyl trimethoxysilane; beta-acryloxy propyl trimethoxysilane; gamma-acryloxyethyl trimethoxysilane; gamma-acryloxypropyl trimethoxysilane; beta-acryloxyethyl triethoxysilane; beta-acryloxypropyl triethoxysilane; gamma-acryloxyethyl triethoxysilane; gamma-acryloxypropyl triethoxysilane; beta-methacryloxyethyl trimethoxysilane; beta-methacryloxypropyl trimethoxysilane; gamma-methacryloxyethyl trimethoxysilane; gamma-methacryloxypropyl trimethoxysilane; beta-methacryloxyethyl triethoxysilane; beta-methacryloxypropyl triethoxysilane; gamma-methacryloxyethyl triethoxysilane; gamma-methacryloxypropyl triethoxysilane; 3-methacryloxypropylmethyl diethoxysilane. A vinyl-based silane may be selected from the group comprising vinyl trimethoxysilane; vinyl triethoxysilane; p-styryl trimethoxysilane, methylvinyldimethoxysilane, vinyldimethylmethoxysilane, divinyldimethoxysilane, vinyltris(2-methoxyethoxy)silane, and vinylbenzylethylenediaminopropyltrimethoxysilane. An aromatic silane may be selected from phenyltrimethoxysilane and phenyltriethoxysilane. An epoxy-based silane may be selected from the group comprising 3-glycydoxypropyl trimethoxysilane; 3-glycydoxypropylmethyl diethoxysilane; 3-glycydoxypropyl triethoxysilane; 2-(3,4-epoxycyclohexyl)ethyl trimethoxysilane, and glycidyloxypropylmethyldimethoxysilane. An amino-based silane may be selected from the group comprising 3-aminopropyl triethoxysilane; 3-aminopropyl trimethoxysilane; 3-aminopropyldimethyl ethoxysilane; 3-aminopropylmethyldiethoxysilane; 4-aminobutyltriethoxysilane; 3-aminopropyldiisopropyl ethoxysilane; 1-amino-2-(dimethylethoxysilyl)propane; (aminoethylamino)-3-isobutyldimethyl methoxysilane; N-(2-aminoethyl)-3-aminoisobutylmethyl dimethoxysilane; (aminoethylaminomethyl)phenetyl trimethoxysilane; N-(2-aminoethyl)-3-aminopropylmethyl dimethoxysilane; N-(2-aminoethyl)-3-aminopropyl trimethoxysilane; N-(2-aminoethyl)-3-aminopropyl triethoxysilane; N-(6-aminohexyl) aminomethyl trimethoxysilane; N-(6-aminohexyl) aminomethyl trimethoxysilane; N-(6-aminohexyl) aminopropyl trimethoxysilane; N-(2-aminoethyl)-1,1-aminoundecyl trimethoxysilane; 1,1-aminoundecyl triethoxysilane; 3-(m-aminophenoxy)propyl trimethoxysilane; m-aminophenyl trimethoxysilane; p-aminophenyl trimethoxysilane; (3-trimethoxysilylpropyl)diethylenetriamine; N-methylaminopropylmethyl dimethoxysilane; N-methylaminopropyl trimethoxysilane; dimethylaminomethyl ethoxysilane; (N,N-dimethylaminopropyl)trimethoxysilane; (N-acetylglycysil)-3-aminopropyl trimethoxysilane, N-phenyl-3-aminopropyltrimethoxysilane, N-phenyl-3-aminopropyltriethoxysilane, phenylaminopropyltrimethoxysilane, aminoethylaminopropyltrimethoxysilane, and aminoethylaminopropylmethyldimethoxysilane. An ureide-based silane may be 3-ureidepropyl triethoxysilane. A mercapto-based silane may be selected from the group comprising 3-mercaptopropylmethyl dimethoxysilane, 3-mercaptopropyl trimethoxysilane, and 3-mercaptopropyl triethoxysilane. An alkoxysilane having a hydroxyl group may be selected from the group comprising hydroxymethyl triethoxysilane; N-(hydroxyethyl)-N-methylaminopropyl trimethoxysilane; bis(2-hydroxyethyl)-3-aminopropyl triethoxysilane; N-(3-triethoxysilylpropyl)-4-hydroxy butylamide; 1,1-(triethoxysilyl) undecanol; triethoxysilyl undecanol, ethylene glycol acetal; and N-(3-ethoxysilylpropyl)gluconamide.

In some aspects, the alkylsilane may be expressed with a general formula: $R_nSi(OR')_{4-n}$ wherein: n is 1, 2 or 3; R is a $C_{1-20}$ alkyl or a $C_{2-20}$ alkenyl; and R' is an $C_{1-20}$alkyl. The term "alkyl" by itself or as part of another substituent, refers to a straight, branched or cyclic saturated hydrocarbon group joined by single carbon-carbon bonds having 1 to 20 carbon atoms, for example 1 to 10 carbon atoms, for example 1 to 8 carbon atoms, preferably 1 to 6 carbon atoms. When a subscript is used herein following a carbon atom, the subscript refers to the number of carbon atoms that the named group may contain. Thus, for example, $C_{1-6}$ alkyl means an alkyl of one to six carbon atoms. Examples of alkyl groups are methyl, ethyl, propyl, isopropyl, butyl, isobutyl, sec-butyl, f-butyl, 2-methylbutyl, pentyl, iso-amyl and its isomers, hexyl and its isomers, heptyl and its isomers, octyl and its isomer, decyl and its isomer, dodecyl and its isomers. The term "$C_{2-20}$alkenyl" by itself or as part of another substituent, refers to an unsaturated hydrocarbyl group, which may be linear, or branched, comprising one or more carbon-carbon double bonds having 2 to 20 carbon atoms. Examples of $C_{2-6}$ alkenyl groups are ethenyl, 2-propenyl, 2-butenyl, 3-butenyl, 2-pentenyl and its isomers, 2-hexenyl and its isomers, 2,4-pentadienyl and the like.

In some aspects, the alkylsilane may be selected from the group comprising methyltrimethoxysilane; methyltriethoxysilane; ethyltrimethoxysilane; ethyltriethoxysilane; propyltrimethoxysilane; propyltriethoxysilane; hexyltrimethoxysilane; hexyltriethoxysilane; octyltrimethoxysilane; octyltriethoxysilane; decyltrimethoxysilane; decyltriethoxysilane; dodecyltrimethoxysilane: dodecyltriethoxysilane; tridecyltrimethoxysilane; dodecyltriethoxysilane; hexadecyltrimethoxysilane; hexadecyltriethoxysilane; octadecyltrimethoxysilane; octadecyltriethoxysilane, trimethylmethoxysilane, methylhydrodimethoxysilane, dimethyldimethoxysilane, diisopropyldimethoxysilane, diisobutyldimethoxysilane, isobutyltrimethoxysilane, n-butyltrimethoxysilane, n-butylmethyldimethoxysilane, phenyltrimethoxysilane, phenyltrimethoxysilane, phenylmethyldimethoxysilane, triphenylsilanol, n-hexyltrimethoxysilane, n-octyltrimethoxysilane, isooctyltrimethoxysilane, decyltrimethoxysilane, hexadecyltrimethoxysilane, cyclohexylmethyldimethoxysilane, cyclohexylethyldimethoxysilane, dicyclopentyldimethoxysilane, tert-butylethyldimethoxysilane, tert-butylpropyldimethoxysilane, dicyclohexyldimethoxysilane, and a combination thereof.

In some aspects, the alkylsilane compound may be selected from triethoxyoctylsilane, trimethoxyoctylsilane, and a combination thereof.

Additional examples of silanes that can be used as silane crosslinkers include, but are not limited to, those of the general formula $CH_2=CR-(COO)_x(C_nH_{2n})_ySiR'_3$, wherein R is a hydrogen atom or methyl group; x is 0 or 1; y is 0 or 1; n is an integer from 1 to 12; each R' can be an organic group and may be independently selected from an alkoxy group having from 1 to 12 carbon atoms (e.g., methoxy, ethoxy, butoxy), aryloxy group (e.g., phenoxy), araloxy group (e.g., benzyloxy), aliphatic acyloxy group having from 1 to 12 carbon atoms (e.g., formyloxy, acetyloxy, propanoyloxy), amino or substituted amino groups (e.g., alkylamino, arylamino), or a lower alkyl group having 1 to 6 carbon atoms. x and y may both equal 1. In some aspects, no more than one of the three R' groups is an alkyl. In other aspects, not more than two of the three R' groups is an alkyl.

Any silane or mixture of silanes known in the art that can effectively graft to and crosslink an olefin polymer can be used in the practice of the present disclosure. In some aspects, the silane crosslinker can include, but is not limited to, unsaturated silanes which include an ethylenically unsaturated hydrocarbyl group (e.g., a vinyl, allyl, isopropenyl, butenyl, cyclohexenyl or a gamma-(meth)acryloxy allyl group) and a hydrolyzable group (e.g., a hydrocarbyloxy, hydrocarbonyloxy, or hydrocarbylamino group). Non-limiting examples of hydrolyzable groups include, but are not limited to, methoxy, ethoxy, formyloxy, acetoxy, proprionyloxy, and alkyl, or arylamino groups. In other aspects, the silane crosslinkers are unsaturated alkoxy silanes which can be grafted onto the polymer. In still other aspects, additional exemplary silane crosslinkers include vinyltrimethoxysilane, vinyltriethoxysilane, 3-(trimethoxysilyl) propyl methacrylate gamma-(meth)acryloxypropyl trimethoxysilane), and mixtures thereof.

The silane crosslinker may be present in the silane-grafted polyolefin elastomer in an amount of from greater than 0 wt % to about 10 wt %, including from about 0.5 wt % to about 5 wt %. The amount of silane crosslinker may be varied based on the nature of the olefin polymer, the silane itself, the processing conditions, the grafting efficiency, the application, and other factors. The amount of silane crosslinker may be at least 2 wt %, including at least 4 wt % or at least 5 wt %, based on the weight of the reactive composition. In other aspects, the amount of silane crosslinker may be at least 10 wt %, based on the weight of the reactive composition. In still other aspects, the silane crosslinker content is at least 1% based on the weight of the reactive composition. In some embodiments, the silane crosslinker fed to the extruder may include from about 0.5 wt % to about 10 wt % of silane monomer, from about 1 wt % to about 5 wt % silane monomer, or from about 2 wt % to about 4 wt % silane monomer.

Condensation Catalyst

A condensation catalyst can facilitate both the hydrolysis and subsequent condensation of the silane grafts on the silane-grafted polyolefin elastomer to form crosslinks. In some aspects, the crosslinking can be aided by the use of an electron beam radiation. In some aspects, the condensation catalyst can include, for example, organic bases, carboxylic acids, and organometallic compounds (e.g., organic titanates and complexes or carboxylates of lead, cobalt, iron, nickel, zinc, and tin). In other aspects, the condensation catalyst can include fatty acids and metal complex compounds such as metal carboxylates; aluminum triacetyl acetonate, iron triacetyl acetonate, manganese tetraacetyl acetonate, nickel tetraacetyl acetonate, chromium hexaacetyl acetonate, titanium tetraacetyl acetonate and cobalt tetraacetyl acetonate; metal alkoxides such as aluminum ethoxide, aluminum propoxide, aluminum butoxide, titanium ethoxide, titanium propoxide and titanium butoxide; metal salt compounds such as sodium acetate, tin octylate, lead octylate, cobalt octylate, zinc octylate, calcium octylate, lead naphthenate, cobalt naphthenate, dibutyltin dioctoate, dibutyltin dilaurate, dibutyltin maleate and dibutyltin di(2-ethylhexanoate); acidic compounds such as formic acid, acetic acid, propionic acid, p-toluenesulfonic acid, trichloroacetic acid, phosphoric acid, monoalkylphosphoric acid, dialkylphosphoric acid, phosphate ester of p-hydroxyethyl (meth)acrylate, monoalkylphosphorous acid and dialkylphosphorous acid; acids such as p-toluenesulfonic acid, phthalic anhydride, benzoic acid, benzenesulfonic acid, dodecylbenzenesulfonic acid, formic acid, acetic acid, itaconic acid, oxalic acid and maleic acid, ammonium salts, lower amine salts or polyvalent metal salts of these acids, sodium hydroxide, lithium chloride; organometal compounds such as diethyl zinc and tetra(n-butoxy)titanium; and amines such as dicyclohexylamine, triethylamine, N,N-dimethylbenzylamine, N,N,N',N'-tetramethyl-1,3-butanediamine, diethanolamine, triethanolamine and cyclohexylethylamine. In still other aspects, the condensation catalyst can include ibutyltindilaurate, dioctyltinmaleate, dibutyltindiacetate, dibutyltindioctoate, stannous acetate, stannous octoate, lead naphthenate, zinc caprylate, and cobalt naphthenate. Depending on the desired final material properties of the silane-crosslinked polyolefin elastomer or blend, a single condensation catalyst or a mixture of condensation catalysts may be utilized. The condensation catalyst(s) may be present in an amount of from about 0.01 wt % to about 1.0 wt %, including from about 0.25 wt % to about 8 wt %, based on the total weight of the silane-grafted polyolefin elastomer/blend composition.

In some aspects, a crosslinking system can include and use one or all of a combination of radiation, heat, moisture, and additional condensation catalyst. In some aspects, the condensation catalyst may be present in an amount of from 0.25 wt % to 8 wt %. In other aspects, the condensation catalyst may be included in an amount of from about 1 wt % to about 10 wt %, or from about 2 wt % to about 5 wt %.

Foaming Agent

The foaming agent can be a chemical foaming agent (e.g., organic or inorganic foaming agent) and/or a physical foaming (e.g., gases and volatile low weight molecules) that is added to the silane-grafted polyolefin elastomer and condensation catalyst blend during the extrusion and/or molding process to produce the foamed silane-crosslinked polyolefin elastomer.

In some aspects, the foaming agent may be a physical foaming agent including a microencapsulated foaming agent, otherwise referred to in the art as a microencapsulated blowing agent (MEBA). MEBAs include a family of physical foaming agents that are defined as a thermo expandable microsphere which is formed by the encapsulation of a volatile hydrocarbon into an acrylic copolymer shell. When the acrylic copolymer shell expands, the volatile hydrocarbon (e.g., butane) positioned inside the shell additionally expands within the shell to create a cell or pocket in the silane-crosslinkable polyolefin elastomer to reduce its weight. The shell of the MEBA is designed not to break so the blowing agent does not lose its ability to expand and reduce the density of the silane-crosslinkable polyolefin elastomer. In some aspects, the MEBAs have an average particle size of from about 20 μm to about 30 μm. Exemplary MEBAs include those sold under the trade name MATSUMOTO F-AC170D. In some aspects, MEBA's may be used in combination with other foaming agents including organic and inorganic foaming agents.

Organic foaming agents that may be used can include, for example, azo compounds, such as azodicarbonamide (ADCA), barium azodicarboxylate, azobisisobutyronitrile (AIBN), azocyclohexylnitrile, and azodiaminobenzene, N-nitroso compounds, such as N,N'-dinitrosopentamethylenetetramine (DPT), N,N'-dimethyl-N,N'-dinitrosoterephthalamide, and trinitrosotrimethyltriamine, hydrazide compounds, such as 4,4'-oxybis(benzenesulfonylhydrazide) (OBSH), paratoluene sulfonylhydrazide, diphenylsulfone-3, 3'-disulfonylhydrazide, 2,4-toluenedisulfonylhydrazide, p,p-bis(benzenesulfonylhydrazide)ether, benzene-1,3-disulfonylhydrazide, and allylbis(sulfonylhydrazide), semicarbazide compounds, such as p-toluilenesulfonylsemicarbazide, and 4,4'-oxybis(benzenesulfonylsemicarbazide), alkane fluorides, such as trichloromonofluoromethane, and dichloromonofluoromethane, and triazole compounds, such as 5-morpholyl-1,2,3,4-thiatriazole, and other known organic foaming agents. Preferably, azo compounds and N-nitroso compounds are used. Further preferably, azodicarbonamide (ADCA) and N,N'-dinitrosopentamethylenetetramine (DPT) are used. The organic foaming agents listed above may be used alone or in any combination of two or more.

The decomposition temperature and amount of organic foaming agent used can have important consequences on the density and material properties of the foamed silane-crosslinker polyolefin elastomer. In some aspects, the organic foaming agent has a decomposition temperature of from about 150° C. to about 210° C. The organic foaming agent can be used in an amount of from about 0.1 wt % to about 40 wt %, from about 5 wt % to about 30 wt %, from about 5 wt % to about 20 wt %, from about 10 wt % to about 30 wt %, or from about 1 wt % to about 10 wt % based on the total weight of the polymer blend. If the organic foaming agent has a decomposition temperature lower than 150° C., early foaming may occur during compounding. Meanwhile, if the organic foaming agent has a decomposition temperature higher than 210° C., it may take longer, e.g., greater than 15 minutes, to mold the foam, resulting in low productivity. Additional foaming agents may include any compound whose decomposition temperature is within the range defined above.

The inorganic foaming agents that may be used include, for example, hydrogen carbonate, such as sodium hydrogen carbonate, and ammonium hydrogen carbonate, carbonate, such as sodium carbonate, and ammonium carbonate, nitrite, such as sodium nitrite, and ammonium nitrite, borohydride, such as sodium borohydride, and other known inorganic foaming agents, such as azides. In some aspect, hydrogen carbonate may be used. In other aspects, sodium hydrogen carbonate may be used. The inorganic foaming agents listed above may be used alone or in any combination of two or more. The inorganic foaming agent can be used in an amount of from about 0.1 wt % to about 40 wt %, from about 5 wt % to about 30 wt %, from about 5 wt % to about 20 wt %, from about 10 wt % to about 30 wt %, or from about 1 wt % to about 10 wt % based on the total weight of the polymer blend.

Physical blowing agents that may be used include, for example, supercritical carbon dioxide, supercritical nitrogen, butane, pentane, isopentane, cyclopentane. The physical foaming agent can be used in an amount of from about 0.1 wt % to about 40 wt %, from about 5 wt % to about 30 wt %, from about 5 wt % to about 20 wt %, from about 10 wt % to about 30 wt %, or from about 1 wt % to about 10 wt % based the total weight of the polymer blend.

In some aspects, an endothermic blowing (foaming) agent may be used that can include, for example, sodium bicarbonate and/or citric acid and its salts or derivatives. Exemplary citric acid foaming agents include those sold under the trade name HYDROCEROL® that includes a mixture of zinc stearate, polyethylene glycol, and a citric acid or citric acid derivative. The desired decomposition temperature for the endothermic blowing (foaming) agent may be from about 160° C. to about 200° C., or about 175° C., about 180° C., about 185° C., about 190° C., or about 195° C.

Optional Additional Components

The silane-crosslinked polyolefin elastomer may optionally include one or more fillers. The filler(s) may be extruded with the silane-grafted polyolefin and in some aspects may include additional polyolefins having a crystallinity greater than 20%, greater than 30%, greater than 40%, or greater than 50%. In some aspects, the filler(s) may include metal oxides, metal hydroxides, metal carbonates, metal sulfates, metal silicates, clays, talcs, carbon black, and silicas. Depending on the application and/or desired properties, these materials may be fumed or calcined.

The metal of the metal oxide, metal hydroxide, metal carbonate, metal sulfate, or metal silicate may be selected from alkali metals (e.g., lithium, sodium, potassium, rubidium, caesium, and francium); alkaline earth metals (e.g., beryllium, magnesium, calcium, strontium, barium, and radium); transition metals (e.g., zinc, molybdenum, cadmium, scandium, titanium, vanadium, chromium, manganese, iron, cobalt, nickel, copper, yttrium, zirconium, niobium, technetium, ruthernium, rhodium, palladium, silver, hafnium, taltalum, tungsten, rhenium, osmium, indium, platinum, gold, mercury, rutherfordium, dubnium, seaborgium, bohrium, hassium, and copernicium); post-transition metals (e.g., aluminum, gallium, indium, tin, thallium, lead, bismuth, and polonium); lanthanides (e.g., lanthanum, cerium, praseodymium, neodymium, promethium, samarium, europium, gadolinium, terbium, dysprosium, holmium, erbium, thulium, ytterbium, and lutetium); actinides (e.g., actinium, thorium, protactinium, uranium, neptunium, plutonium, americium, curium, berkelium, californium, einsteinium, fermium, mendelevium, nobelium, and lawrencium); germanium; arsenic; antimony; and astatine.

The filler(s) of the silane-crosslinked polyolefin elastomer or blend may be present in an amount of from greater than 0 wt % to about 50 wt %, including from about 1 wt % to about 20 wt % and from about 3 wt % to about 10 wt %.

The silane-crosslinked polyolefin elastomer and/or the respective articles formed (e.g., static sealing members 12) may also include waxes (e.g., paraffin waxes, microcrystalline waxes, HDPE waxes, LDPE waxes, thermally degraded waxes, byproduct polyethylene waxes, optionally oxidized Fischer-Tropsch waxes, and functionalized waxes). In some embodiments, the wax(es) are present in an amount of from about 0 wt % to about 10 wt %.

Tackifying resins (e.g., aliphatic hydrocarbons, aromatic hydrocarbons, modified hydrocarbons, terpens, modified terpenes, hydrogenated terpenes, rosins, rosin derivatives, hydrogenated rosins, and mixtures thereof) may also be included in the silane-crosslinked polyolefin elastomer/blend. The tackifying resins may have a ring and ball softening point in the range of from 70° C. to about 150° C. and a viscosity of less than about 3,000 cP at 177° C. In some aspects, the tackifying resin(s) are present in an amount of from about 0 wt % to about 10 wt %.

In some aspects, the silane-crosslinked polyolefin elastomer may include one or more oils. Non-limiting types of oils include white mineral oils and naphthenic oils. In some embodiments, the oil(s) are present in an amount of from about 0 wt % to about 10 wt %.

In some aspects, the silane-crosslinked polyolefin elastomer may include one or more filler polyolefins having a crystallinity greater than 20%, greater than 30%, greater than 40%, or greater than 50%. The filler polyolefin may include polypropylene, poly(ethylene-co-propylene), and/or other ethylene/α-olefin copolymers. In some aspects, the use of the filler polyolefin may be present in an amount of from about 5 wt % to about 60 wt %, from about 10 wt % to about 50 wt %, from about 20 wt % to about 40 wt %, or from about 5 wt % to about 20 wt %. The addition of the filler polyolefin may increase the Young's modulus by at least 10%, by at least 25%, or by at least 50% for the final silane-crosslinked polyolefin elastomer.

In some aspects, the silane-crosslinked polyolefin elastomer of the present disclosure may include one or more stabilizers (e.g., antioxidants). The silane-crosslinked polyolefin elastomer may be treated before grafting, after grafting, before crosslinking, and/or after crosslinking. Other additives may also be included. Non-limiting examples of additives include antistatic agents, dyes, pigments, UV light absorbers, nucleating agents, fillers, slip agents, plasticizers, fire retardants, lubricants, processing aides, smoke inhibitors, anti-blocking agents, and viscosity control agents. The antioxidant(s) may be present in an amount of less than 0.5 wt %, including less than 0.2 wt % of the composition.

In some aspects, a coloring agent may be added to the silane-crosslinked polyolefin elastomer during its production as the silane-crosslinkable polyolefin elastomer or the silane-grafted polyolefin elastomer. In some aspects, the coloring agent may be added in combination with the condensation catalyst (e.g., LE4423/AMBICAT™) and can include colors that include, for example, black (PPM1200/2), blue (PPM1201/2), brown (PPM1202/2), green (PPM1203/2), grey (PPM1204/2), orange (PPM1205/2), red (PPM1206/2), violet (PPM1207/2), white (PPM1208/2), and/or yellow (PPM1200/2) as provided by commercial suppliers.

Method for Making the Silane-Grafted Polyolefin Elastomer

The synthesis/production of the silane-crosslinked polyolefin elastomer may be performed by combining the respective components in one extruder using a single-step Monosil process or in two extruders using a two-step Sioplas process which eliminates the need for additional steps of mixing and shipping rubber compounds prior to extrusion.

Referring now to FIG. 1, the general chemical process used during both the single-step Monosil process and two-step Sioplas process used to synthesize the silane-crosslinked polyolefin elastomer is provided. The process starts with a grafting step that includes initiation from a grafting initiator followed by propagation and chain transfer with the first and second polyolefins. The grafting initiator, in some aspects a peroxide or azo compound, homolytically cleaves to form two radical initiator fragments that transfer to one of the first and second polyolefins chains through a propagation step. The free radical, now positioned on the first or second polyolefin chain, can then transfer to a silane molecule and/or another polyolefin chain. Once the initiator and free radicals are consumed, the silane grafting reaction for the first and second polyolefins is complete.

Still referring to FIG. 1, once the silane grafting reaction is complete, a mixture of stable first and second silane-grafted polyolefins is produced. A crosslinking catalyst may then be added to the first and second silane-grafted polyolefins to form the silane-grafted polyolefin elastomer. The crosslinking catalyst may first facilitate the hydrolysis of the silyl group grafted onto the polyolefin backbones to form reactive silanol groups. The silanol groups may then react with other silanol groups on other polyolefin molecules to form a crosslinked network of elastomeric polyolefin polymer chains linked together through siloxane linkages. The density of silane crosslinks throughout the silane-grafted polyolefin elastomer can influence the material properties exhibited by the elastomer.

Figure 3A:
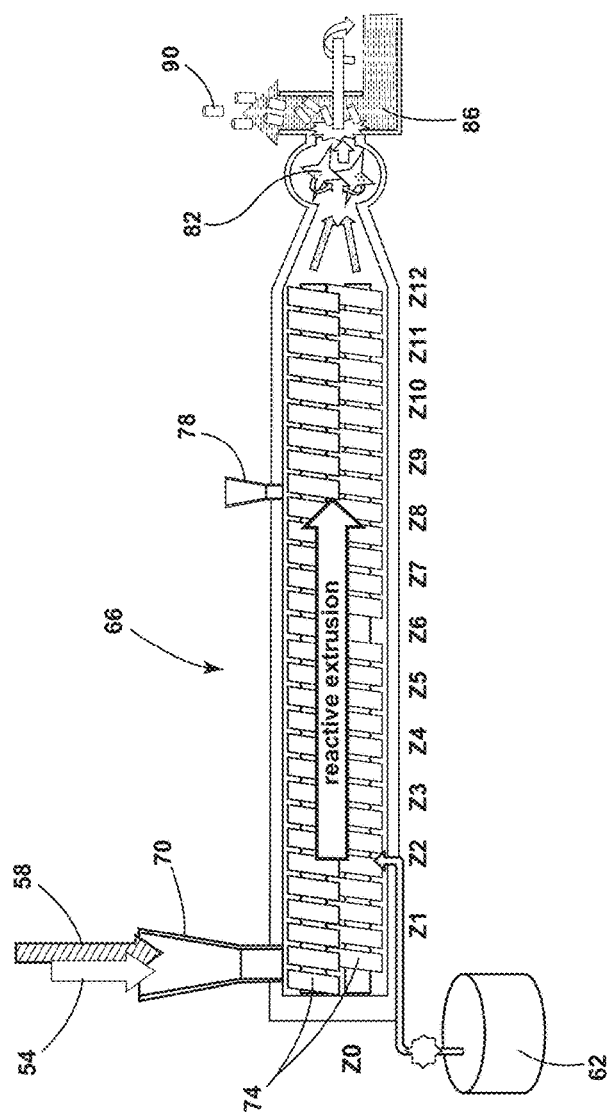
FIG. 3A is a schematic cross-sectional view of a reactive twin-screw extruder according to some aspects of the present disclosure.

Referring now to FIGS. 2 and 3A, a method 10 for making the elastomeric article, using the two-step Sioplas process is shown. The method 10 may begin with a step 14 that includes extruding (e.g., with a twin screw extruder 66) the first polyolefin 54 having a density less than 0.86 g/cm$^3$, the second polyolefin 58 having a crystallinity less than 40%, a silan cocktail 62, including the silane crosslinker (e.g., vinyltrimethoxy silane, VTMO) and the grafting initiator (e.g. dicumyl peroxide) together to form a silane-grafted polyolefin blend 90. The first polyolefin 54 and second polyolefin 58 may be added to the reactive twin screw extruder 66 using an addition hopper 70. The silan cocktail 62 may be added to twin screws 74 further down the extrusion line to help promote better mixing with the first and second polyolefin 54, 58 blend. A forced volatile organic compound (VOC) vacuum 78 may be used on the reactive twin screw extruder 66 to help maintain a desired reaction pressure. The twin screw extruder 66 is considered reactive because the radical initiator and silane crosslinker are reacting with and forming new covalent bonds with both the first and second polyolefins 54, 58. The melted silane-grafted polyolefin blend can exit the reactive twin screw extruder 66 using a gear pump 82 that injects the molten silane-grafted polyolefin blend into a water pelletizer 86 that can form a pelletized silane-grafted polyolefin blend 90. In some aspects, the molten silane-grafted polyolefin blend may be extruded into pellets, pillows, or any other configuration prior to the incorporation of the condensation catalyst 94 (see FIG. 3B) and formation of the final elastomeric article.

The reactive twin screw extruder 66 can be configured to have a plurality of different temperature zones (e.g., Z0-Z12 as shown in FIG. 3A) that extend for various lengths of the twin screw extruder 66. In some aspects, the respective temperature zones may have temperatures ranging from about room temperature to about 180° C., from about 120° C. to about 170° C., from about 120° C. to about 160° C., from about 120° C. to about 150° C., from about 120° C. to about 140° C., from about 120° C. to about 130° C., from about 130° C. to about 170° C., from about 130° C. to about 160° C., from about 130° C. to about 150° C., from about 130° C. to about 140° C., from about 140° C. to about 170° C., from about 140° C. to about 160° C., from about 140° C. to about 150° C., from about 150° C. to about 170° C., and from about 150° C. to about 160° C. In some aspects, Z0 may have a temperature from about 60° C. to about 110° C. or no cooling; Z1 may have a temperature from about 120° C. to about 130° C.; Z2 may have a temperature from about 140° C. to about 150° C.; Z3 may have a temperature from about 150° C. to about 160° C.; Z4 may have a temperature from about 150° C. to about 160° C.; Z5 may have a temperature from about 150° C. to about 160° C.; Z6 may have a temperature from about 150° C. to about 160° C.; and Z7-Z12 may have a temperature from about 150° C. to about 160° C.

In some aspects, the number average molecular weight of the silane-grafted polyolefin elastomers may be in the range of from about 4,000 g/mol to about 30,000 g/mol, including from about 5,000 g/mol to about 25,000 g/mol, from about 6,000 g/mol to about 14,000 g/mol, and greater than 25,000 g/mol. The weight average molecular weight of the grafted polymers may be from about 8,000 g/mol to about 60,000 g/mol, including from about 10,000 g/mol to about 30,000 g/mol.

Figure 3B:
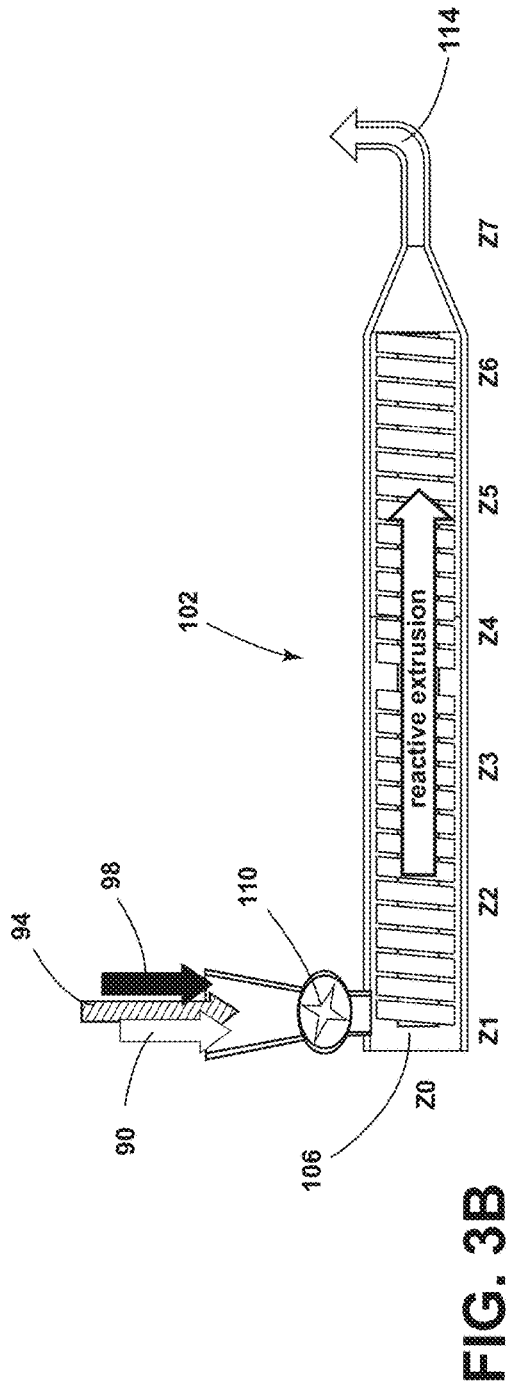
FIG. 3B is a schematic cross-sectional view of a single-screw extruder according to some aspects of the present disclosure.

Referring now to FIGS. 2 and 3B, the method 10 next includes a step 18 of extruding the silane-grafted polyolefin blend 90 and the condensation catalyst 94 together to form a silane-crosslinkable polyolefin blend 114. In some aspects, one or more optional additives 98 may be added with the silane-grafted polyolefin blend 90 and the condensation catalyst 94 to adjust the final material properties of the silane-crosslinked polyolefin olefin blend. In step 18, the silane-grafted polyolefin blend 90 is mixed with a silanol forming condensation catalyst 94 to form reactive silanol groups on the silane grafts that can subsequently crosslink when exposed to humidity and/or heat. In some aspects, the condensation catalyst is AMBICAT™ LE4472 which can include a mixture of sulfonic acid, antioxidant, process aide, and carbon black for coloring where the ambient moisture is sufficient for the condensation catalyst 94 to crosslink the silane-crosslinkable polyolefin blend 114 over a longer time period (e.g., about 48 hours). The silane-grafted polyolefin blend 90 and the condensation catalyst 94 may be added to a reactive single screw extruder 102 using an addition hopper and an addition gear pump 110. The combination of the silane-grafted polyolefin blend 90 and the condensation catalyst 94, and in some aspects one or more optional additives 98, may be added to a single screw 106 of the reactive single screw extruder 102. The single screw extruder 102 is considered reactive because crosslinking can begin as soon as the silane-grafted polyolefin blend 90 and the condensation catalyst 94 are melted and combined together to mix the condensation catalyst 94 thoroughly and evenly throughout the melted silane-grafted polyolefin blend 90. The melted silane-crosslinkable polyolefin blend 114 can exit the reactive single-screw extruder 102 through a die that can inject the molten silane-crosslinkable polyolefin blend into an uncured static sealing element.

During step 18, as the silane-grafted polyolefin blend 90 is extruded together with the condensation catalyst 94 to form the silane-crosslinkable polyolefin blend 114, a certain amount of crosslinking may occur. In some aspects, the silane-crosslinkable polyolefin blend 114 may be about 25% cured, about 30% cured, about 35% cured, about 40% cured, about 45% cured, about 50% cured, about 55% cured, about 60% cured, bout 65% cured, or about 70% cured where gel test (ASTM D2765) can be used to determine the amount of crosslinking in the final silane-crosslinked polyolefin elastomer.

Still referring to FIGS. 2 and 3B, the method 10 further includes a step 22 of molding the silane-crosslinkable polyolefin blend 114 into the uncured elastomeric article. The single screw extruder 102 melts and extrudes the silane-crosslinkable polyolefin 114 through a die that can extrude the molten silane-crosslinkable polyolefin blend 114 into the uncured elastomeric element.

Referring again to FIG. 2, the method 10 can further include a step 26 of crosslinking the silane-crosslinkable polyolefin blend 114 or the uncured elastomeric article at an ambient or elevated temperature and/or an ambient or elevated humidity to form the elastomeric article having a density from about 0.80 g/cm$^3$ to about 0.89 g/cm$^3$, 0.60 g/cm$^3$ to 0.69 g/cm$^3$, or 0.50 g/cm$^3$ to 0.59 g/cm$^3$. More particularly, in this crosslinking process, the water hydrolyzes the silane of the silane-crosslinkable polyolefin elastomer to produce a silanol. The silanol groups on various silane grafts can then be condensed to form intermolecular, irreversible Si—O—Si crosslink sites. The amount of crosslinked silane groups, and thus the final polymer properties, can be regulated by controlling the production process, including the amount of catalyst used.

The crosslinking/curing of step 26 of the method 10 may occur over a time period of from greater than about 20 seconds to about 200 seconds or 0 to about 20 hours. In some aspects, curing takes place over a time period of from about 20 seconds to about 200 seconds, about 1 hour to about 20 hours, about 10 hours to about 20 hours, from about 15 hours to about 20 hours, from about 5 hours to about 15 hours, from about 1 hour to about 8 hours, or from about 3 hours to about 6 hours. The temperature during the crosslinking/curing may be about room temperature, from about 20° C. to about 25° C., from about 20° C. to about 150° C., from about 25° C. to about 100° C., from about 20° C. to about 75° C., from about 50° C. to about 200° C., from about 100° C. to about 400° C., from about 100° C. to about 300° C., or form about 100° C. to about 200° C. The humidity during curing may be from about 30% to about 100%, from about 40% to about 100%, or from about 50% to about 100%.

In some aspects, an extruder setting is used that is capable of extruding thermoplastic, with long L/D, 30 to 1, at an extruder heat setting close to TPV processing conditions wherein the extrudate crosslinks at ambient conditions becoming a thermoset in properties. In other aspects, this process may be accelerated by steam exposure. Immediately after the extrusion step, the gel content (also called the crosslink density) may be about 40%, about 50%, or about 60%, but after 96 hrs at ambient conditions, the gel content may reach greater than about 80%, about 85%, about 90%, or about 95%.

In some aspects, one or more reactive single screw extruders 102 may be used to form the uncured sealing element and corresponding static sealing member that have one or more types of silane-crosslinked polyolefin elastomers. For example, in some aspects, one reactive single screw extruder 102 may be used to produce and extrude the silane-crosslinked polyolefin elastomer while a second reactive single screw extruder 102 may be used to produce and extrude a second silane-crosslinked polyolefin elastomer. The complexity and architecture of the final article or product will determine the number and types of reactive single screw extruder 102.

It is understood that the description outlining and teaching the various elastomeric articles and their respective components/composition previously discussed, which can be used in any combination, applies equally well to the method 10 for making the elastomeric article using the two-step Sioplas process as shown.

Figure 4:
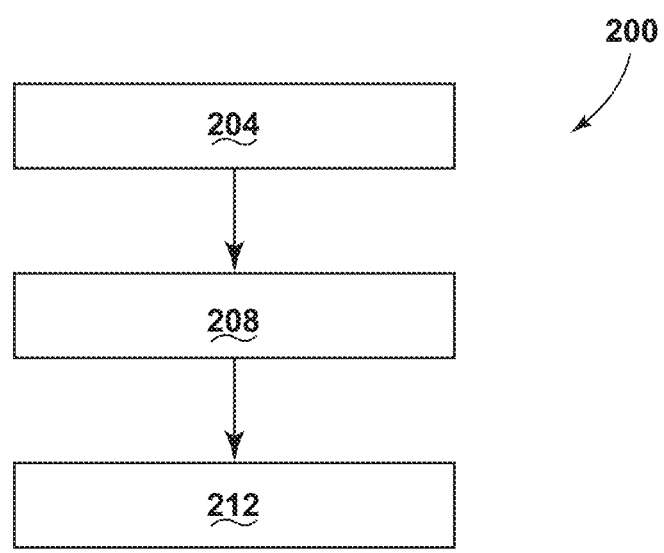
FIG. 4 is a flow diagram of a method for making a static seal with a silane-crosslinked polyolefin elastomer using a one-step Monosil approach according to some aspects of the present disclosure.
Figure 5:
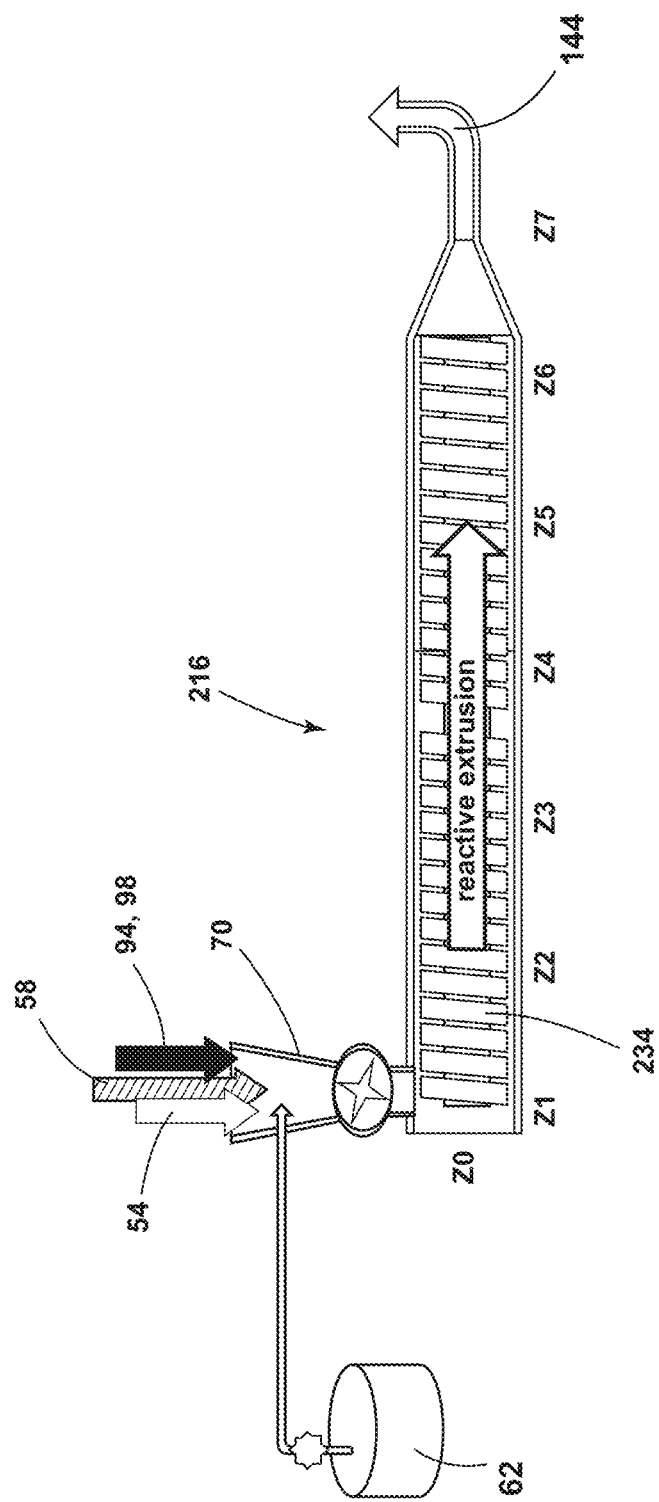
FIG. 5 is a schematic cross-sectional view of a reactive single-screw extruder according to some aspects of the present disclosure.

Referring now to FIGS. 4 and 5, a method 200 for making the elastomeric article, using the one-step Monosil process is shown. The method 200 may begin with a step 204 that includes extruding (e.g., with a single screw extruder 216) the first polyolefin 54 having a density less than 0.86 g/cm³, the second polyolefin 58 having a crystallinity less than 40%, the silan cocktail 62 including the silane crosslinker (e.g., vinyltrimethoxy silane, VTMO) and grafting initiator (e.g. dicumyl peroxide), and the condensation catalyst 94 together to form the crosslinkable silane-grafted polyolefin blend 114. The first polyolefin 54, second polyolefin 58, and silan cocktail 62 may be added to the reactive single screw extruder 216 using an addition hopper 70. In some aspects, the silan cocktail 62 may be added to a single screw 220 further down the extrusion line to help promote better mixing with the first and second polyolefin 54, 58 blend. In some aspects, one or more optional additives 98 may be added with the first polyolefin 54, second polyolefin 58, and silan cocktail 62 to modify the final material properties of the silane-crosslinkable polyolefin blend 114. The single screw extruder 216 is considered reactive because the radical initiator and silane crosslinker of the silan cocktail 62 are reacting with and forming new covalent bonds with both the first and second polyolefin blends 54, 58. In addition, the reactive single screw extruder 216 mixes the condensation catalyst 94 in together with the melted silane-grafted polyolefin blend 90. The melted silane-crosslinkable polyolefin blend 114 can exit the reactive single screw extruder 216 using a gear pump (not shown) and/or die that can inject, eject, and/or extrude the molten silane-crosslinkable polyolefin blend into the uncured static sealing element.

During step 204, as the first polyolefin 54, second polyolefin 58, silan cocktail 62, and condensation catalyst 94 are extruded together, a certain amount of crosslinking may occur in the reactive single screw extruder 216 (see FIGS. 4 and 5). In some aspects, the silane-crosslinkable polyolefin blend 114 may be about 25% cured, about 30% cured, about 35% cured, about 40% cured, about 45% cured, about 50% cured, about 55% cured, about 60% cured, bout 65% cured, or about 70% as it leaves the reactive single screw extruder 216. The gel test (ASTM D2765) can be used to determine the amount of crosslinking in the final silane-crosslinked polyolefin elastomer.

The reactive single screw extruder 216 can be configured to have a plurality of different temperature zones (e.g., Z0-Z7 as shown in FIG. 5) that extend for various lengths along the extruder. In some aspects, the respective temperature zones may have temperatures ranging from about room temperature to about 180° C., from about 120° C. to about 170° C., from about 120° C. to about 160° C., from about 120° C. to about 150° C., from about 120° C. to about 140° C., from about 120° C. to about 130° C., from about 130° C. to about 170° C., from about 130° C. to about 160° C., from about 130° C. to about 150° C., from about 130° C. to about 140° C., from about 140° C. to about 170° C., from about 140° C. to about 160° C., from about 140° C. to about 150° C., from about 150° C. to about 170° C., and from about 150° C. to about 160° C. In some aspects, Z0 may have a temperature from about 60° C. to about 110° C. or no cooling; Z1 may have a temperature from about 120° C. to about 130° C.; Z2 may have a temperature from about 140° C. to about 150° C.; Z3 may have a temperature from about 150° C. to about 160° C.; Z4 may have a temperature from about 150° C. to about 160° C.; Z5 may have a temperature from about 150° C. to about 160° C.; Z6 may have a temperature from about 150° C. to about 160° C.; and Z7 may have a temperature from about 150° C. to about 160° C.

In some aspects, the number average molecular weight of the silane-grafted polyolefin elastomers may be in the range of from about 4,000 g/mol to about 30,000 g/mol, including from about 5,000 g/mol to about 25,000 g/mol, from about 6,000 g/mol to about 14,000 g/mol, and greater than 25,000 g/mol. The weight average molecular weight of the grafted polymers may be from about 8,000 g/mol to about 60,000 g/mol, including from about 10,000 g/mol to about 30,000 g/mol.

Still referring to FIGS. 4 and 5, the method 200 further includes a step 208 of molding the silane-crosslinkable polyolefin blend into the elastomeric element. The reactive single screw extruder 216 can melt and extrude the silane-crosslinkable polyolefin blend 114 through the die that can extrude the molten silane-crosslinkable polyolefin blend 114 into the uncured elastomeric article.

Still referring to FIG. 4, the method 200 can further include a step 212 of crosslinking the silane-crosslinkable polyolefin blend 114 of the uncured elastomeric article at an ambient or elevated temperature and an ambient or elevated humidity to form the elastomeric article having a density from about 0.80 g/cm$^3$ to about 0.89 g/cm$^3$, 0.60 g/cm$^3$ to 0.69 g/cm$^3$, or 0.50 g/cm$^3$ to 0.59 g/cm$^3$. The amount of crosslinked silane groups, and thus the final polymer properties, can be regulated by controlling the production process, including the amount of catalyst used.

The step 212 of crosslinking the silane-crosslinkable polyolefin blend 114 may occur over a time period of from greater than about 40 seconds to about 200 seconds, 0 hours to about 10 hours, or 0 to about 20 hours. In some aspects, curing takes place over a time period of from about 10 seconds to about 200 seconds, about 40 seconds to about 400 seconds, about 1 hour to about 20 hours, 10 hours to about 20 hours, from about 15 hours to about 20 hours, from about 5 hours to about 15 hours, from about 1 hour to about 8 hours, or from about 3 hours to about 6 hours. The temperature during the crosslinking and curing may be about room temperature, from about 20° C. to about 425° C., from about 20° C. to about 250° C., from about 25° C. to about 200° C., or from about 20° C. to about 75° C. The humidity during curing may be from about 30% to about 100%, from about 40% to about 100%, or from about 50% to about 100%.

In some aspects, an extruder setting is used that is capable of extruding thermoplastic, with long L/D, 30 to 1, at an extruder heat setting close to TPV processing conditions wherein the extrudate can crosslink at ambient temperature or greater conditions becoming a thermoset in properties. In other aspects, this process may be accelerated by steam exposure. Immediately after extrusion, the gel content (also called the crosslink density) may be about 40%, about 50%, or about 60%, but after 96 hrs at ambient conditions, the gel content may reach greater than about 80%, about 85%, about 90%, or about 95%.

In some aspects, one or more reactive single screw extruders 216 (see FIG. 5) may be used to form the uncured sealing element and corresponding static sealing member that have one or more types of silane-crosslinked polyolefin elastomers. For example, in some aspects, one reactive single screw extruder 216 may be used to produce and extrude the silane-crosslinked polyolefin elastomer while a second reactive single screw extruder 216 may be used to produce and extrude the second silane-crosslinked polyolefin elastomer. The complexity and architecture of the final article or product will determine the number and types of reactive single screw extruder 216.

It is understood that the description outlining and teaching the various silane-crosslinked polyolefin elastomer and their respective components/composition previously discussed, which can be used in any combination, applies equally well to the method 200 for making the elastomeric article using the one-step Monosil process as shown.

Non-limiting examples of the elastomeric articles that the silane-crosslinked polyolefin elastomer of the disclosure may be used to manufacture include static seals such as weather seals (e.g., glass run channels including molded details/corners), sunroof seals, convertible top seals, mirror seals, body-panel interface seals, stationary window moldings, glass encapsulations, cut-line seals, greenhouse moldings, occupation detector system sensor switches, rocker seals, outer and inner belts, auxiliary and margin seals, edge protector/gimp seals, and below-belt brackets and channels; automotive hoses such as coolant hoses, air conditioning hoses, and vacuum hoses; anti-vibration system (AVS) components such as mounts (e.g., engine, body, accessory, component), dampers, bushings, strut mounts, and isolators; coatings such as coatings for brake lines, fuel lines, transmission oil cooler lines, brackets, cross members, frame components, body panels and components, suspension components, wheels, hubs, springs, and fasteners; air deflectors, spoilers, fascia, and trim; building, window, and door seals; boots, bellows, and grommets; gaskets (e.g., pneumatic and/or hydraulic gaskets); wire and cable sheathing; tires; windshield wipers and squeegees; floor mats; pedal covers; automotive belts; conveyor belts; shoe components; marine bumpers; O-rings; valves and seals; and springs (e.g., as substitutes for mechanical metal springs).

Molding Techniques

Injecting or adding the silane-crosslinkable polyolefin elastomer blend 114 into a mold may be performed using one of several different approaches. Depending on the molding approach selected, different material properties may be achieved for the elastomeric article. The molding can be performed by using one of the four following processes: Compression Molding, Injection Molding, Injection Compression Molding, and Supercritical Injection Molding.

According to the compression mold process, the silane-crosslinkable polyolefin elastomer 114 is pressurized in a compression mold or press under predetermined temperature, pressure, and time conditions to obtain a foamed silane-crosslinked polyolefin elastomer in the form of a plate-like sponge. As the silane-crosslinkable polyolefin elastomer 114 is heated and pressed in the compression mold, the chemical and/or physical foaming agents are activated to form the foamed silane-crosslinked polyolefin elastomer. Portions and/or edges of the plate-like sponge may then be skived, cut, and/or ground into a desired shape for the elastomeric article. Subsequently, the elastomeric article is again molded in a final mold with elastomeric article and other respective components under heat and pressure and the assembly is then pressurized during cooling in a closed state of the mold.

According to the injection molding process, the reactive single screw extruder 102, 216 used in either the Sioplas or Monosil process prepares and injects the silane-crosslinkable polyolefin elastomer 114 into a mold having an upper mold and a lower mold. Upon initial injection of the silane-crosslinkable polyolefin elastomer 114 into the mold, an uncured elastomeric article is formed. As the uncured elastomeric article is heated and cured, the chemical and/or physical foaming agents are activated to form the foamed silane-crosslinked polyolefin elastomer. The mold used in these aspects is designed to have a smaller size than the size of the final cured elastomeric article (foamed silane-crosslinked polyolefin elastomer). After foaming and expansion of the silane-crosslinkable polyolefin elastomer, the uncured elastomeric article is expanded to the desired size of the elastomeric article and the mold releases the final article.

The injection compression mold provides a hybrid approach to forming the elastomeric article by using aspects of both the compression mold and the injection mold. According to the injection compression process, the reactive single screw extruder 102, 216 used in either the Sioplas or Monosil process prepares and injects a mass of the silane-crosslinkable polyolefin elastomer 90 into a mold having an upper mold and a lower mold. The mass of silane-crosslinkable polyolefin elastomer 114 is then heated and pressed in the mold to form the uncured elastomeric article while the chemical and/or physical foaming agents are activated to form the foamed silane-crosslinked polyolefin elastomer making up the final cured elastomeric article. The mold used in these injection compression processes is designed to have a smaller size than the size of the final cured elastomeric article (foamed silane-crosslinked polyolefin elastomer). After foaming and expansion of the silane-crosslinked polyolefin elastomer, the mold is released to eject the final cured elastomeric article.

According to the supercritical fluid foaming approach, a supercritical fluid injector is coupled to an extruder. The process begins by extruding (e.g., with the reactive single screw extruder 216 as provided in FIG. 5) the first polyolefin having a density less than 0.86 g/cm$^3$ 54, the second polyolefin 58, the silan cocktail 62 including the silane crosslinker (e.g., vinyltrimethoxy silane, VTMO), grafting initiator (e.g. dicumyl peroxide), and the condensation catalyst 94 together to form the crosslinkable silane-grafted polyolefin blend 114. The first polyolefin 54, second polyolefin 58, and silan cocktail 62 may be added to the reactive single screw extruder 216 using the addition hopper 70 and gear pump. In some aspects, the silan cocktail 62 may be added to the single screw 220 further down the extrusion line to help promote better mixing with the first and second polyolefin 54, 58 blend. In some aspects, one or more optional additives 98 may be added with the first polyolefin 54, second polyolefin 58, and silan cocktail 62 to tweak the final material properties of the silane-crosslinkable polyolefin blend 114.

A supercritical fluid injector may be coupled to the single screw extruder 216 to add a supercritical fluid such as carbon dioxide or nitrogen to the silane-crosslinkable polyolefin blend 114 before it is injected through the die into a mold. The reactive single screw extruder 216 then injects the silane-crosslinkable polyolefin elastomer 114 into the mold. Upon initial injection of the silane-crosslinkable polyolefin elastomer 11 into the mold, an uncured elastomeric article is formed. As the uncured elastomeric article is heated and cured, the supercritical fluid foaming agent expands to form the foamed silane-crosslinked polyolefin elastomer. The mold used in these aspects is designed to have a smaller size than the size of the final cured elastomeric article (foamed silane-crosslinked polyolefin elastomer). After foaming, the foamed silane-crosslinked polyolefin elastomer is expanded to the desired size of the elastomeric article using core pull back to accommodate the expansion, and the mold releases.

Silane-Crosslinked Polyolefin Elastomer Physical Properties

A "thermoplastic", as used herein, is defined to mean a polymer that softens when exposed to heat and returns to its original condition when cooled to room temperature. A "thermoset", as used herein, is defined to mean a polymer that solidifies and irreversibly "sets" or "crosslinks" when cured. In either of the Monosil or Sioplas processes described above, it is important to understand the careful balance of thermoplastic and thermoset properties of the various different materials used to produce the final thermoset silane-crosslinked polyolefin elastomeric article. Each of the intermediate polymer materials mixed and reacted using a reactive twin screw extruder, a reactive single screw extruder, and/or a reactive single screw extruder are thermosets. Accordingly, the silane-grafted polyolefin blend and the silane-crosslinkable polyolefin blend are thermoplastics and can be softened by heating so the respective materials can flow. Once the silane-crosslinkable polyolefin blend is extruded, molded, pressed, and/or shaped into the uncured elastomeric article, the silane-crosslinkable polyolefin blend can begin to crosslink or cure at an ambient or elevated temperature and an ambient or elevated humidity to form the elastomeric article and silane-crosslinked polyolefin blend or silane-crosslinked polyolefin elastomer blend.

The thermoplastic/thermoset behavior of the silane-crosslinkable polyolefin blend and corresponding silane-crosslinked polyolefin blend are important for the various compositions and articles disclosed herein because of the potential energy savings provided using these materials. For example, a manufacturer can save considerable amounts of energy by being able to cure the silane-crosslinkable polyolefin blend at an ambient or reduced temperature and an ambient or reduced humidity. This curing process is typically performed in the industry by applying significant amounts of energy to heat or steam treat crosslinkable polyolefins. The ability to cure the inventive silane-crosslinkable polyolefin blend with ambient temperature and/or ambient humidity are not properties necessarily intrinsic to crosslinkable polyolefins, but rather is a property dependent on the relatively low density (i.e., as compared to EPDM and/or TPV) of the silane-crosslinkable polyolefin blend. In some aspects, no additional curing overs, heating ovens, steam ovens, or other forms of heat producing machinery other than what was provided in the extruders are used to form the silane-crosslinked polyolefin elastomers.

The specific gravity of the silane-crosslinked polyolefin elastomer of the present disclosure may be lower than the specific gravities of existing TPV and EPDM formulations used in the art. The reduced specific gravity of these materials can lead to lower weight parts, thereby helping automakers meet increasing demands for improved fuel economy. For example, the specific gravity of the silane-crosslinked polyolefin elastomer of the present disclosure may be from about 0.80 g/cm$^3$ to about 0.89 g/cm$^3$, from about 0.85 g/cm$^3$ to about 0.89 g/cm$^3$, from about 0.60 g/cm$^3$ to about 0.69 g/cm$^3$, from about 0.50 g/cm$^3$ to about 0.59 g/cm$^3$, less than 0.90 g/cm$^3$, less than 0.89 g/cm$^3$, less than 0.88 g/cm$^3$, less than 0.87 g/cm$^3$, less than 0.86 g/cm$^3$, or less than 0.85 g/cm$^3$ as compared to existing TPV materials which may have a specific gravity of from 0.95 to 1.2 g/cm$^3$ and EPDM materials which may have a specific gravity of from 1.0 to 1.35 g/cm$^3$. The low specific gravity or density of the silane-crosslinked polyolefin elastomer is attributable to the low crystallinity of the found in Examples 1-7 described below. In some aspects, the percent crystallinity of the silane-crosslinked polyolefin elastomer is less than 10%, less than 20%, or less than 30%.

Figure 6:
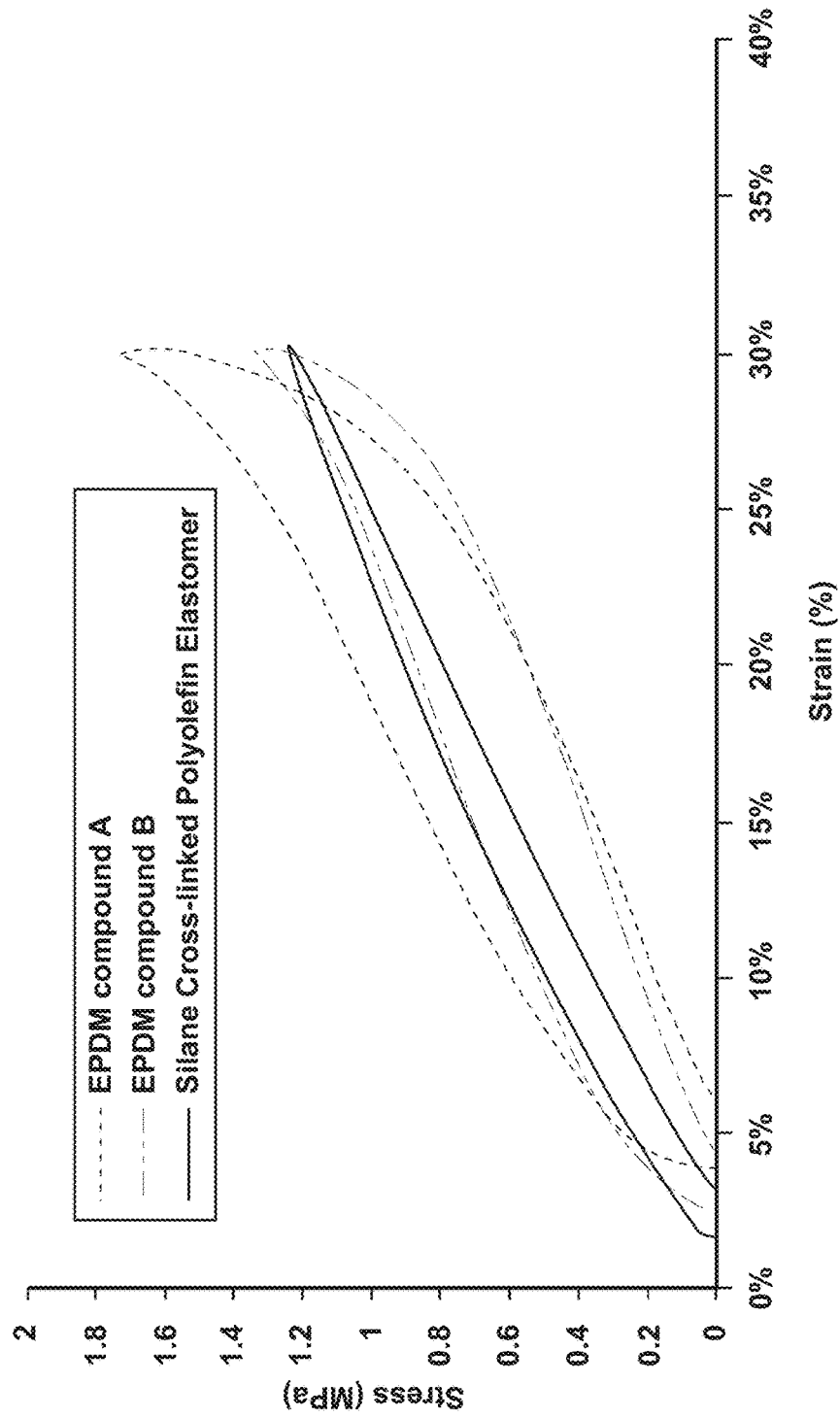
FIG. 6 is a graph illustrating the stress/strain behavior of a silane-crosslinked polyolefin elastomer compared to EPDM compounds.

Referring now to FIG. 6, the stress/strain behavior of an exemplary silane-crosslinked polyolefin elastomer of the present disclosure (i.e., the "Silane-Crosslinked Polyolefin Elastomer" in the legend) relative to two existing EPDM materials is provided. In particular, FIG. 6 displays a smaller area between the stress/strain curves for the silane-crosslinked polyolefin of the disclosure, versus the areas between the stress/strain curves for EPDM compound A and EPDM compound B. This smaller area between the stress/strain curves for the silane-crosslinked polyolefin elastomer can be desirable for the application of elastomeric articles. Elastomeric materials typically have non-linear stress-strain curves with a significant loss of energy when repeatedly stressed. The silane-crosslinked polyolefin elastomers of the present disclosure may exhibit greater elasticity and less viscoelasticity (e.g., have linear curves and exhibit very low energy loss). Embodiments of the silane-crosslinked polyolefin elastomers described herein do not have any filler or plasticizer incorporated into these materials so their corresponding stress/strain curves do not have or display any Mullins effect and/or Payne effect. The lack of Mullins effect for these silane-crosslinked polyolefin elastomers is due to the lack of any conventional reinforcing fillers (e.g., carbon black) or plasticizer added to the silane-crosslinked polyolefin blend so the stress-strain curve does not depend on the maximum loading previously encountered where there is no instantaneous and irreversible softening. The lack of Payne effect for these silane-crosslinked polyolefin elastomers is due to the lack of any filler or plasticizer added to the silane-crosslinked polyolefin blend so the stress-strain curve does not depend on the small strain amplitudes previously encountered where there is no change in the viscoelastic storage modulus based on the amplitude of the strain.

The silane-crosslinked polyolefin elastomer or elastomeric article can exhibit a compression set of from about 5.0% to about 30.0%, from about 5.0% to about 25.0%, from about 5.0% to about 20.0%, from about 5.0% to about 15.0%, from about 5.0% to about 10.0%, from about 10.0% to about 25.0%, from about 10.0% to about 20.0%, from about 10.0% to about 15.0%, from about 15.0% to about 30.0%, from about 15.0% to about 25.0%, from about 15.0% to about 20.0%, from about 20.0% to about 30.0%, or from about 20.0% to about 25.0%, as measured according to ASTM D 395 (22 hrs @ 23° C., 70° C., 80° C., 90° C., 125° C., and/or 175° C.).

In other implementations, the silane-crosslinked polyolefin elastomer or elastomeric article can exhibit a compression set of from about 5.0% to about 20.0%, from about 5.0% to about 15.0%, from about 5.0% to about 10.0%, from about 7.0% to about 20.0%, from about 7.0% to about 15.0%, from about 7.0% to about 10.0%, from about 9.0% to about 20.0%, from about 9.0% to about 15.0%, from about 9.0% to about 10.0%, from about 10.0% to about 20.0%, from about 10.0% to about 15.0%, from about 12.0% to about 20.0%, or from about 12.0% to about 15.0%, as measured according to ASTM D 395 (22 hrs @ 23° C., 70° C., 80° C., 90° C., 125° C., and/or 175° C.).

The silane-crosslinked polyolefin elastomers and elastomeric articles of the disclosure may exhibit a crystallinity of from about 5% to about 40%, from about 5% to about 25%, from about 5% to about 15%, from about 10% to about 20%, from about 10% to about 15%, or from about 11% to about 14% as determined using density measurements, differential scanning calorimetry (DSC), X-Ray Diffraction, infrared spectroscopy, and/or solid state nuclear magnetic spectroscopy. As disclosed herein, DSC was used to measure the enthalpy of melting in order to calculate the crystallinity of the respective samples.

The silane-crosslinked polyolefin elastomers and elastomer articles may exhibit a glass transition temperature of from about −75° C. to about −25° C., from about −65° C. to about −40° C., from about −60° C. to about −50° C., from about −50° C. to about −25° C., from about −50° C. to about −30° C., or from about −45° C. to about −25° C. as measured according to differential scanning calorimetry (DSC) using a second heating run at a rate of 5° C./min or 10° C./min.

The silane-crosslinked polyolefin elastomers and elastomeric articles may exhibit a weathering color difference of from about 0.25 ΔE to about 2.0 ΔE, from about 0.25 ΔE to about 1.5 ΔE, from about 0.25 ΔE to about 1.0 ΔE, or from about 0.25 ΔE to about 0.5 ΔE, as measured according to ASTM D2244 after 3000 hrs exposure to exterior weathering conditions.

The silane-crosslinked polyolefin elastomers and elastomeric articles may exhibit exceptional stain resistance properties as compared to EPDM samples. Ex. 3, as disclosed below, showed no cracking, wrinkling, crazing, iridescence, bloom, milkiness, separation, loss of adhesion, or loss of embossment as measured according to ASTM D1566. In addition, Ex. 3 which is representative of all the silane-crosslinked polyolefin elastomers produced, showed no spotting or discoloration in pH 11, pH 12.5, and pH 13 NaOH solutions as measured according to SunSimulation and Spotting Test (PR231-2.2.15).

EXAMPLES

The following examples represent certain non-limiting examples of elastomeric articles, compositions and methods of making them, according to the disclosure.

Materials

All chemicals, precursors and other constituents were obtained from commercial suppliers and used as provided without further purification.

Example 1

Example 1 or ED4 was produced by extruding 77.36 wt % ENGAGE™ 8150 and 19.34 wt % VISTAMAX™ 6102 together with 3.3 wt % SILFIN 13 to form the silane-grafted polyolefin elastomer. The Example 1 silane-grafted polyolefin elastomer was then extruded with 3 wt % AMBICAT™ LE4472 condensation catalyst to form a silane-crosslinkable polyolefin elastomer, which was then extruded into an uncured elastomeric article. The Example 1 silane-crosslinkable polyolefin elastomer of the uncured elastomeric article was cured at ambient temperature and humidity to form a silane-crosslinked polyolefins elastomer, consistent with the elastomers of the disclosure. The composition of Example 1 is provided in Table 1 below.

Example 2

Example 2 or ED76-4A was produced by extruding 82.55 wt % ENGAGE™ 8842 and 14.45 wt % MOSTEN™ TB 003 together with 3.0 wt % SILAN RHS 14/032 or SILFIN 29 to form the silane-grafted polyolefin elastomer. The Example 2 silane-grafted polyolefin elastomer was then extruded with 3 wt % AMBICAT™ LE4472 condensation catalyst to form a silane-crosslinkable polyolefin elastomer, which was then extruded into an uncured elastomeric article. The Example 2 silane-crosslinkable polyolefin elastomer of the uncured elastomeric article was cured at ambient temperature and humidity to form a silane-crosslinked polyolefins elastomer, consistent with the elastomers of the disclosure. The composition of Example 2 is provided in Table 1 below and some of its material properties are provided in FIGS. 7-10.

Example 3

Example 3 or ED76-4E was produced by extruding 19.00 wt % ENGAGE™ 8150, 58.00 wt % ENGAGE™ 8842, and 20.00 wt % MOSTEN™ TB 003 together with 3.0 wt % SILAN RHS 14/032 or SILFIN 29 to form the silane-grafted polyolefin elastomer. The Example 3 silane-grafted polyolefin elastomer was then extruded with 3 wt % AMBICAT™ LE4472 condensation catalyst to form the silane-crosslinkable polyolefin elastomer, which was then extruded into an uncured elastomeric article. The Example 3 silane-crosslinkable polyolefin elastomer of the uncured elastomeric article was cured at ambient temperature and humidity to form a silane-crosslinked polyolefins elastomer, consistent with the elastomers of the disclosure. The composition of Example 3 is provided in Table 1 below.

Example 4

Example 4 or ED76-5 was produced by extruding 19.00 wt % ENGAGE™ 8150, 53.00 wt % ENGAGE™ 8842, and 25.00 wt % MOSTEN TB 003 together with 3.0 wt % SILAN RHS 14/032 or SILFIN 29 to form the silane-grafted polyolefin elastomer. The Example 4 silane-grafted polyolefin elastomer was then extruded with 3 wt % AMBICAT™ LE4472 condensation catalyst to form the silane-crosslinkable polyolefin elastomer, which was then extruded into an uncured elastomeric article. The Example 4 silane-crosslinkable polyolefin elastomer of the uncured elastomeric article was cured at ambient temperature and humidity to form a silane-crosslinked polyolefins elastomer, consistent with the elastomers of the disclosure. The composition of Example 4 is provided in Table 1 below.

Example 5

Example 5 or ED76-6 was produced by extruding 16.36 wt % ENGAGE™ 8150, 45.64 wt % ENGAGE™ 8842, and 35.00 wt % MOSTEN™ TB 003 together with 3.0 wt % SILAN RHS 14/032 or SILFIN 29 to form the silane-grafted polyolefin elastomer. The Example 5 silane-grafted polyolefin elastomer was then extruded with 3 wt % AMBICAT™ LE4472 condensation catalyst to form the silane-crosslinkable polyolefin elastomer, which was then extruded into an uncured elastomeric article. The Example 5 silane-crosslinkable polyolefin elastomer of the uncured elastomeric article was cured at ambient temperature and humidity to form a silane-crosslinked polyolefins elastomer, consistent with the elastomers of the disclosure. The composition of Example 5 is provided in Table 1 below.

Table 1 below sets forth the compositions of the silane-grafted polyolefin elastomers of Examples 1-5.

TABLE 1

| | Ex. 1 | Ex. 2 | Ex. 3 | Ex. 4 | Ex. 5 |
|---|---|---|---|---|---|
| ENGAGE 8150 | 77.36 | — | 19.00 | 19.00 | 16.36 |
| ENGAGE 8842 | — | 82.55 | 58.00 | 53.00 | 45.64 |
| MOSTEN TB 003 | — | 14.45 | 20.00 | 25.00 | 35.00 |
| VISTAMAXX 6102 | 19.34 | — | — | — | — |
| SILAN RHS 14/032 or SILFIN 29 | — | 3.00 | 3.00 | 3.00 | 3.00 |
| SILFIN 13 | 3.30 | — | — | — | — |
| TOTAL | 100 | 100 | 100 | 100 | 100 |

Example 6

Example 6 or ED108-2A was produced by extruding 48.7 wt % ENGAGE™ XLT8677 or XUS 38677.15 and 48.7 wt % ENGAGE™ 8842 together with 2.6 wt % SILAN RHS 14/032 or SILFIN 29 to form the silane-grafted polyolefin elastomer. The Example 6 silane-grafted polyolefin elastomer was then extruded with about 360 ppm dioctyltin dilaurate (DOTL) condensation catalyst to form a silane-crosslinkable polyolefin elastomer as an uncured elastomeric article. The Example 6 silane-crosslinkable polyolefin elastomer of the uncured elastomeric article was cured at ambient temperature and humidity to form a silane-crosslinked polyolefins elastomer, consistent with the elastomers of the disclosure. The composition of Example 6 is provided in Table 2 below and some of its material properties are provided in FIGS. 7-10.

Example 7

Example 7 or ED92 was produced by extruding 41.4 wt % ENGAGE™ XLT8677 or XUS 38677.15 and 41.4 wt % ENGAGE™ 8842, and 14.4 wt % MOSTEN™ TB 003 together with 2.8 wt % SILAN RHS 14/032 or SILFIN 29 to form the silane-grafted polyolefin elastomer. The Example 7 silane-grafted polyolefin elastomer was then extruded with about 360 ppm dioctyltin dilaurate (DOTL) condensation catalyst to form a silane-crosslinkable polyolefin elastomer as an uncured elastomeric article. The Example 7 silane-crosslinkable polyolefin elastomer of the uncured elastomeric article was cured at ambient temperature and humidity to form a silane-crosslinked polyolefins elastomer, consistent with the elastomers of the disclosure. The composition of Example 7 is provided in Table 2 below and some of its material properties are provided in FIGS. 7-10.

Table 2 below sets forth the compositions of the silane-grafted polyolefin elastomers of Examples 6-7.

TABLE 2

| Ingredients | Ex. 6 | Ex. 7 |
|---|---|---|
| ENGAGE XLT8677/XUS 38677.15 | 48.7 | 41.4 |
| ENGAGE 8842 | 48.7 | 41.4 |
| SILAN RHS 14/032 or SILFIN 29 | 2.6 | 2.8 |
| MOSTEN TB 003 | — | 14.4 |
| TOTAL | 100 | 100 |

Table 3 below sets forth several of the material properties of Example 1. In particular, plied compression set percentages are provided using ASTM D 395, method B for 22 hrs at 23° C., 70° C., 80° C., 90° C., 125° C., and 175° C. Example 1 is representative of the silane-crosslinked polyolefin elastomers disclosed herein in that the compression set percentage does not vary as much as standard EPDM or TPV materials do across a range of different temperatures. In some aspects, the percent difference in plied compression set percentage values for the silane-crosslinked polyolefin elastomer is less than 400%, less than 300%, less than 275%, less than 250%, less than 225%, or less than 210%.

TABLE 3

| Test | Ex. 1 |
|---|---|
| Durometer (Type A per ASTM D 2240) | 75 |
| Tensile MPa (ASTM D 412, die C) | 9.8 |
| Elongation % (ASTM D 412, die C) | 291 |
| Tear Resistance (ASTM D624, die C) | 19 |
| 22 hrs/23° C. Plied Compression Set % | 20.0 |
| 22 hrs/70° C. Plied Compression Set % | 12.6 |
| 22 hrs/80° C. Plied Compression Set | 16.5 |
| 22 hrs/90° C. Plied Compression Set % | 10.9 |
| 22 hrs/125° C. Plied Compression Set % | 7.6 |
| 22 hrs/175° C. Plied Compression Set % | 9.6 |
| Gel % | 90 |

Table 4 below sets forth density, hardness, low and high temperature performance, compression set, and weathering material properties for Examples 2-4.

TABLE 4

| Property | Test | Method | Units/Output | Ex. 2 | Ex. 3 | Ex. 4 |
|---|---|---|---|---|---|---|
| Originals | Density | ASTM D297 | g/cc | 0.88 | 0.89 | 0.89 |
| | Hardness | ASTM D412 Die C | Shore A | 76 | 84 | 88 |
| | Tensile | ASTM D412 Die C | MPa | 10.4 | 13.2 | 14.5 |
| | Elongation | ASTM D412 Die C | % | 300 | 306 | 314 |
| | Tear C | ASTM D624 Die C | N/mm | 24 | 37 | 48 |
| | Hardness | JIS K 6253 | IRHD | 72 | 82 | 87 |
| | Tensile | JIS K 6251 | MPa | 8.3 | 13.3 | 16.1 |
| | Elongation | JIS K 6251 | % | 260 | 255 | 334 |
| | Tear C | JIS K 6252 | N/cm | 249 | 401 | 564 |
| Low & High Temperature Performance | Hardness Heat Age (70 h/100° C.) | ASTM D573 | Change (Shore A) | −2 | −2 | 1 |
| | Tensile Heat Age (70 h/100° C.) | ASTM D573 | % Change | −3.1 | −6 | 9.1 |
| | Elongation Heat Age (70 h/100° C.) | ASTM D573 | % Change | −10.4 | −8.7 | −2.6 |
| | Hardness Heat Age (168 h/100° C.) | JIS K 6251/7 | Change (IRHD) | 0 | 2 | −5 |
| | Tensile Heat Age (168 h/100° C.) | JIS K 6251/7 | % Change | 0 | −15.1 | −9.9 |
| | Elongation Heat Age (168 h/100° C.) | JIS K 6251/7 | % Change | −18 | −22.7 | −21 |
| | Tear Heat Age (168 h/100° C.) | JIS K 6251/7 | % Change | −11.2 | −8.7 | −10 |
| | Tensile Heat Age (1000 h/125° C.) | ASTM D573 | Change (Shore A) | −2 | −1 | 0 |
| | Elongation Heat Age (1000 h/125° C.) | ASTM D573 | % Change | −4.4 | 18.7 | 1.4 |
| | Tear Heat Age (1000 h/125° C.) | ASTM D573 | % Change | −6.1 | −11 | −8.8 |
| | −40° C. Tensile | ASTM D412 Die C | % Change | 38.5 | — | — |
| | −40° C. Elongation | ASTM D412 Die C | % Change | 17.6 | — | — |
| | Low Temperature (−40° C.) | ASTM D2137 Method A | — | Nonbrittle | Nonbrittle | Nonbrittle |
| | 80° C. Tensile | ASTM D412 Die C | % Change | −10.8 | — | — |
| | 80° C. Elongation | ASTM D412 Die C | % Change | −1.5 | — | — |
| Compression Set | Plied C/S (22 h/70° C.) | ASTM D395 Method B | % | 20.7 | 25 | 30 |
| | Plied C/S (22 h/80° C.) | ASTM D395 Method B | % | 20.2 | 30.5 | — |
| | Plied C/S (72 h/80° C.) | ASTM D395 Method B | % | 22.5 | 32.6 | — |
| | Plied C/S (100 h/80° C.) | ASTM D395 Method B | % | 39.2 | 44.3 | 54.7 |
| | Plied C/S (168 h/80° C.) | ASTM D395 Method B | % | 29 | 39 | — |
| | Plied C/S (500 h/80° C.) | ASTM D395 Method B | % | 41.2 | 53.8 | — |
| | Plied C/S (1000 h/80° C.) | ASTM D395 Method B | % | 43.8 | 55.4 | — |
| | Plied C/S (22 h/90° C.) | ASTM D395 Method B | % | 22.5 | 32.8 | — |
| | Plied C/S (22 h/100° C.) | ASTM D395 Method B | % | 25.4 | 35 | 42.5 |
| | Plied C/S (70 h/125° C.) | ASTM D395 Method B | % | 29 | 37.9 | 46.6 |
| | Plied C/S (22 h/135° C.) | ASTM D395 Method B | % | 38.5 | 46.6 | — |
| | Plied C/S (22 h/150° C.) | ASTM D395 Method B | % | 44.3 | 61 | — |
| | Plied C/S (22 h/175° C.) | ASTM D395 Method B | % | 23.3 | 38.1 | — |
| | Permanent Compressive Distortion (22 h/100° C.) | JIS K 6257 | % | 30 | 41 | 43 |
| Miscellaneous | Volume Resistivity | IEC 60093 | Ω cm | $2.1 \times 10^{16}$ | $2.2 \times 10^{16}$ | $2.2 \times 10^{16}$ |
| | Weathering (3000 hrs.) | SAE J2527 | AATCC | 4-5 | 4-5 | 4-5 |
| | Arizona Natural Weathering (2 yrs.) | SAE J1976, Procedure A | ΔE | 1.6 | 1.2 | 1.7 |
| | Florida Natural Weathering (2 yrs.) | SAE J1976, Procedure A | ΔE | 1.6 | 1.0 | 1.2 |
| | Fogging | SAE J1756 | % | 97 | 96 | 97 |
| | Ozone Resistance | ASTM D1171 Method B | Retention Rating (%) | 100 | 100 | 100 |
| | Flammability | ISO 3795 | Burn Rate (mm/min) | 19 | 22 | 17 |
| | Odor | SAE J1351 | No Disagreeable | Pass | Pass | Pass |

TABLE 4-continued

| Property | Test | Method | Units/Output | Ex. 2 | Ex. 3 | Ex. 4 |
|---|---|---|---|---|---|---|
| | Paint Staining (24 h/70° C.) | ASTM D925 Method A | Odor Wet or Dry | — | No Staining | No Staining | No Staining |

Table 5 below sets forth the chemical resistance material properties for Example 2, which is representative of all of the disclosed silane-crosslinked polyolefin elastomers. Method B includes reporting any evidence of softening, staining, blistering, flaking, chipping, checking, chalking, cracks, spills, sinks, bulges, tackiness, peeling, or delamination. The fairness grade is 5 for a CELAB difference of 0 and a Tolerance of 0.2 and the fairness grade is 4 for a CELAB difference of 1.7 and a Tolerance of ±0.3.

TABLE 5

| Test | Chemical | Method | Units/Output | Ex. 2 |
|---|---|---|---|---|
| Solvent Resistance (72 h/RT) | 7:3 (Kerosene:Mineral Spirits) | TSM1720G | % Change in Volume | 170 |
| Fluid Resistance | Gasoline 87 Octane, Lead Free, 20% Ethanol | FLTM BI 168-01, Method B | Rating (see above) | Pass, 4 |
| | Diesel, Grade 2, 20% Biodiesel | FLTM BI 168-01, Method B | Rating (see above) | Pass, 4 |
| | Coolant, Ethylene glycol/Water 50/50 | FLTM BI 168-01, Method B | Rating (see above) | Pass, 5 |
| | Engine Oil, Meets API-ILSAC Requirements | FLTM BI 168-01, Method B | Rating (see above) | Pass, 5 |
| | Deionized Water | FLTM BI 168-01, Method B | Rating (see above) | Pass, 5 |
| | Multipurpose Cleaner (Formula 409, Fantastic, or Armor All) | FLTM BI 168-01, Method B | Rating (see above) | Pass, 5 |
| | Windshield Wash Fluid, Methanol Based, 1 Part Motorcraft Fluid to 1.5 Parts Water | FLTM BI 168-01, Method B | Rating (see above) | Pass, 5 |
| | Motorcraft Bug and Tar Remover | FLTM BI 168-01, Method B | Rating (see above) | Pass, 5 |
| | Glass Cleaner | FLTM BI 168-01, Method B | Rating (see above) | Pass, 5 |
| | Isopropyl Alcohol 1:1 with Water | FLTM BI 168-01, Method B | Rating (see above) | Pass, 5 |

Figure 7:
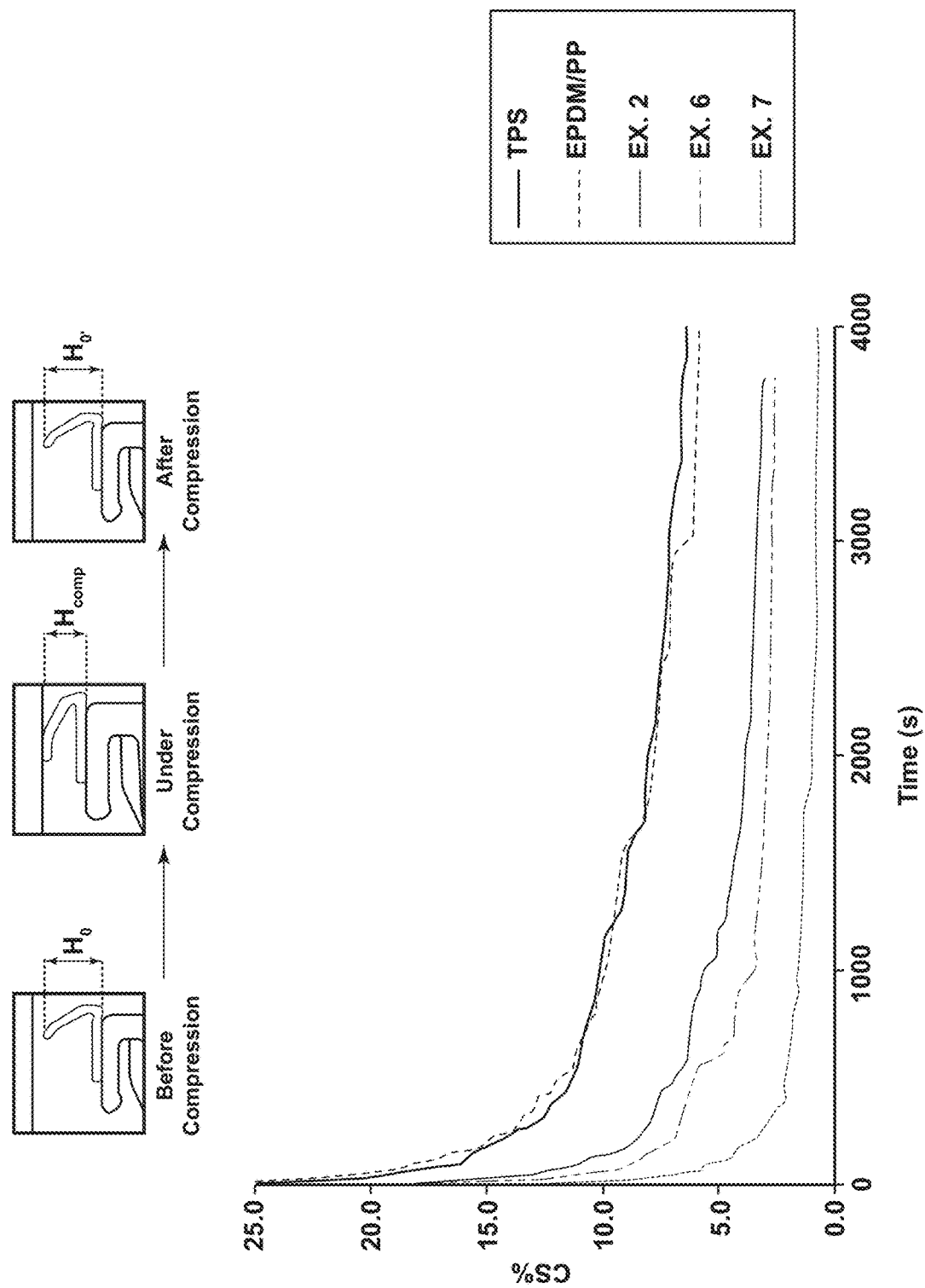
FIG. 7 is a graph illustrating the lip compression set of inventive silane-crosslinked polyolefin elastomers and comparative polyolefin elastomers.

Referring now to FIG. 7, the compression set percentage is given by $C_B=[(H_0-H_0')/(H_0-H_{comp})]\times 100\%$ where $H_0$ is the original specimen thickness before compression, $H_0'$ is the specimen thickness after testing, and $H_{comp}$ is the specimen thickness during the test. As provided in FIG. 7, each of Examples 2, 6, and 7 ("Exs. 2, 6 and 7" in FIG. 7) made from the silane-crosslinked polyolefin elastomers exhibited a lower compression set after one hour and a higher speed of set recovery as compared to TOSE 539 70 ("TPS" in FIG. 7), a styrenic TPV or TPS, and SANTOPRENE 12167W175 ("EPDM/PP" in FIG. 7), a EPDM/PP copolymer. The compression set percentages provided by each of the silane-crosslinked polyolefin elastomers (Exs. 2, 6 and 7) relative to the comparative TPV and EPDM materials demonstrate the improved high elastic properties exhibited by these materials.

Figure 8:
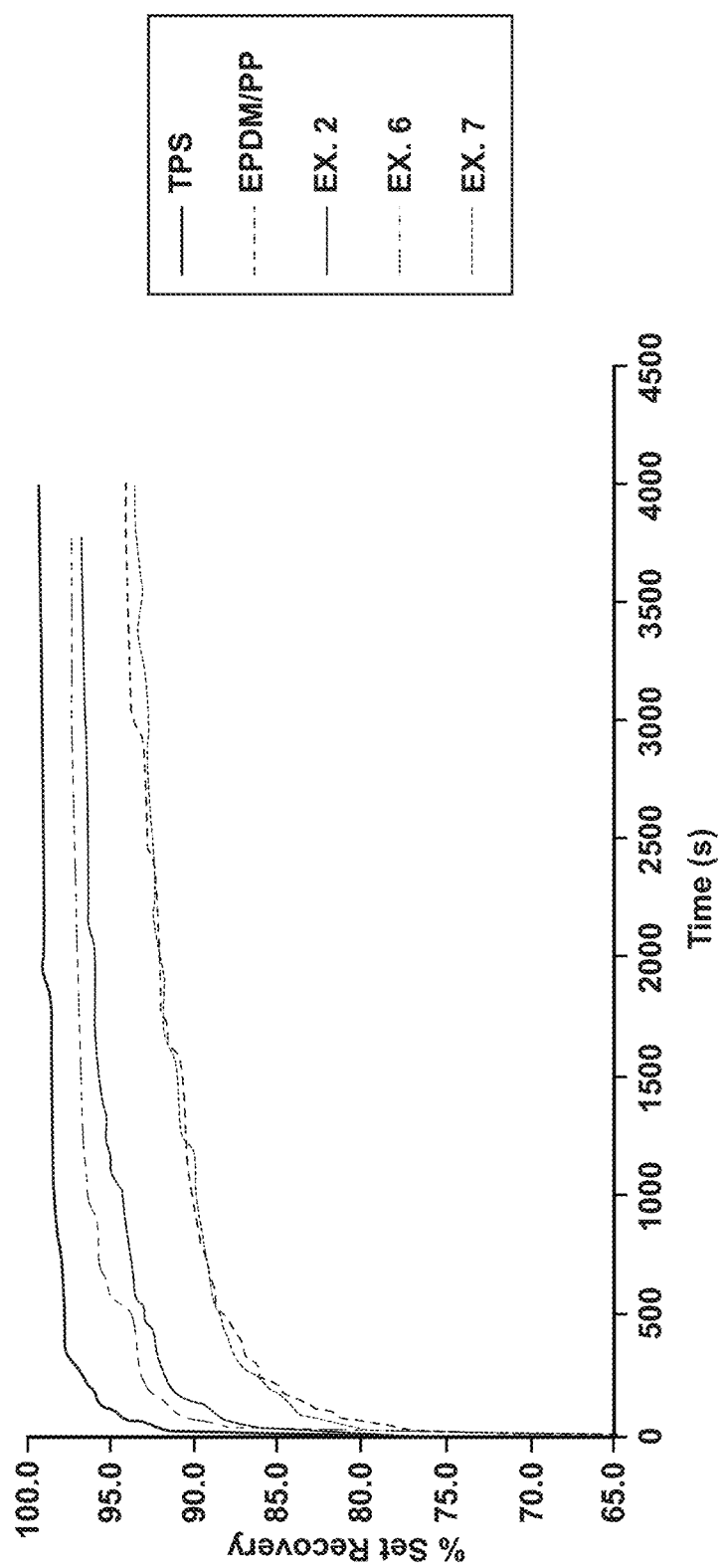
FIG. 8 is a graph illustrating the lip set recovery of inventive silane-crosslinked polyolefin elastomers and comparative polyolefin elastomers.

Referring now to FIG. 8, the lip set recovery percentage is given by $LSR=[(L_0')/(L_0)]\times 100\%$ where $L_0$ is the original lip thickness before compression and $L_0'$ is the lip thickness after testing. As provided in FIG. 8, each of Examples 2, 6, and 7 made from the silane-crosslinked polyolefin elastomers exhibited a higher lip set recovery after one hour (97%, 97.5%, and 99.2%, respectively) and a higher speed of lip set recovery as compared to TPS (93%) or EPDM/PP copolymer (94%). Again, the lip set recovery percentages provided by each of the silane-crosslinked polyolefin elastomers relative to TPV and EPDM materials demonstrate the improved elastic properties exhibited by these materials.

Figure 9:
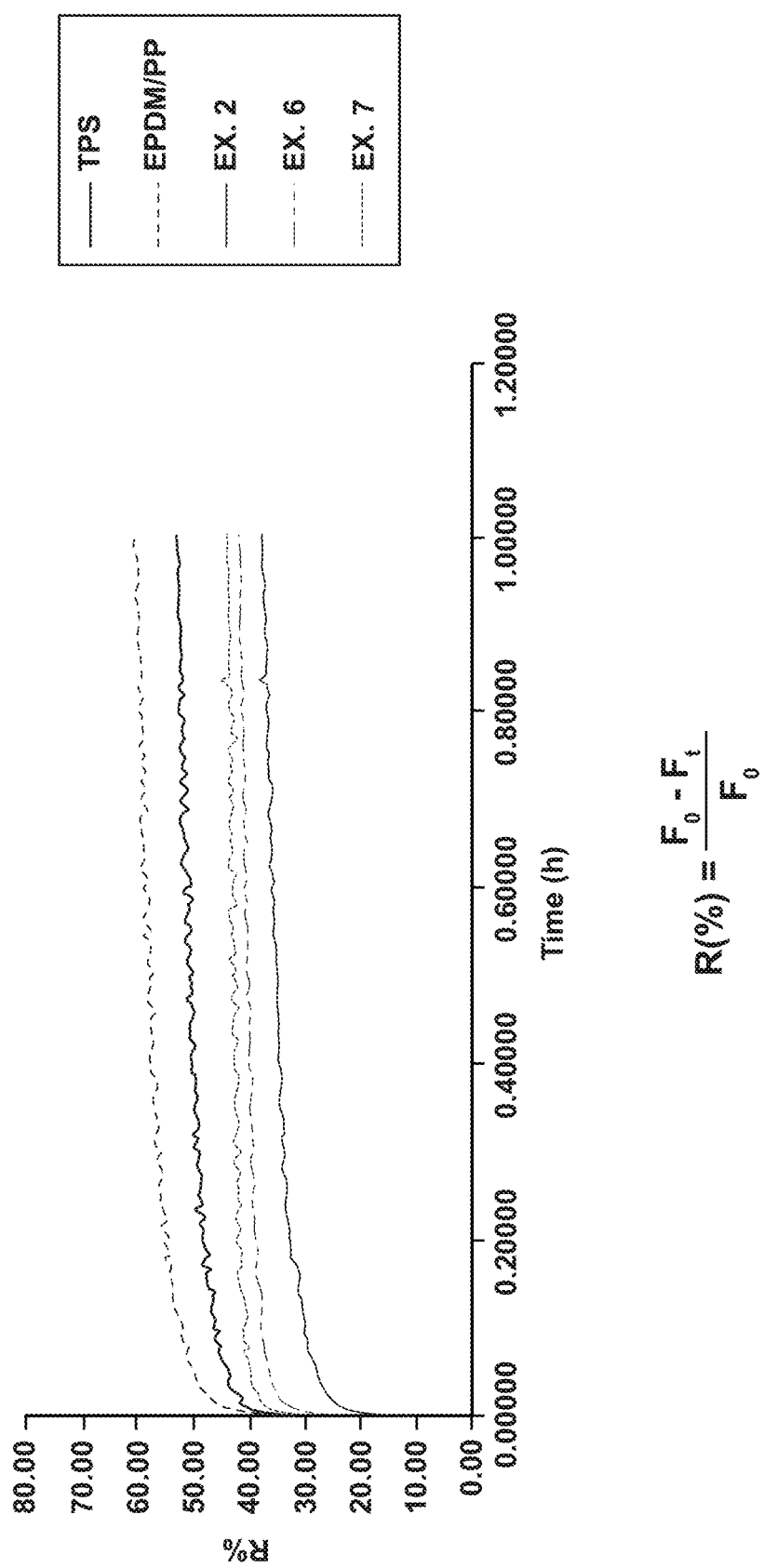
FIG. 9 is a graph illustrating the relaxation rate of several silane-crosslinked polyolefin elastomers and comparative polyolefin elastomers.

Referring now to FIG. 9, the lip relaxation rate percentage for 1 hr at 23° C. is given by $R\,(\%)=(F_0-F_t)/(F_0)$ where $F_0$ is the initial force required for the first compression and $F_t$ is the final force required for compression for the testing period. As provided in FIG. 9, each of Examples 2, 6, and 7 made from the silane-crosslinked polyolefin elastomers exhibited an improved relaxation rate as compared to TPS or EPDM/PP copolymer.

Figure 10:
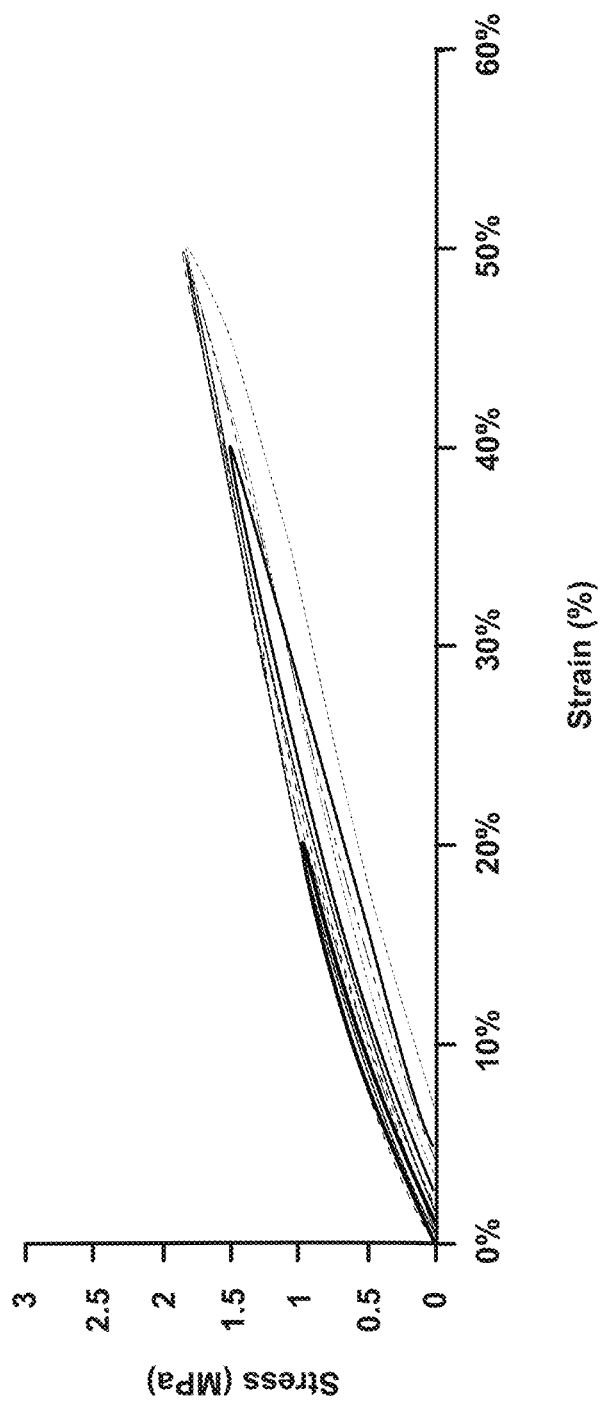
FIG. 10 is a graph illustrating the stress/strain behavior of an inventive silane-crosslinked polyolefin elastomer.

Referring now to FIG. 10, the stress/strain behavior of an exemplary silane-crosslinked polyolefin elastomer of the present disclosure is provided. The traces in FIG. 10 demonstrate the particularly small areas that can be achieved between the stress/strain curves for the silane-crosslinked polyolefin of the disclosure. Elastomeric materials typically have non-linear stress-strain curves with a significant loss of energy when repeatedly stressed. The silane-crosslinked polyolefin elastomers of the present disclosure exhibit greater elasticity and less viscoelasticity (e.g., have linear curves and exhibit very low energy loss). The lack of any filler or plasticizer in these materials lead to no demonstration of any Mullins and/or Payne effect.

Figure 11:
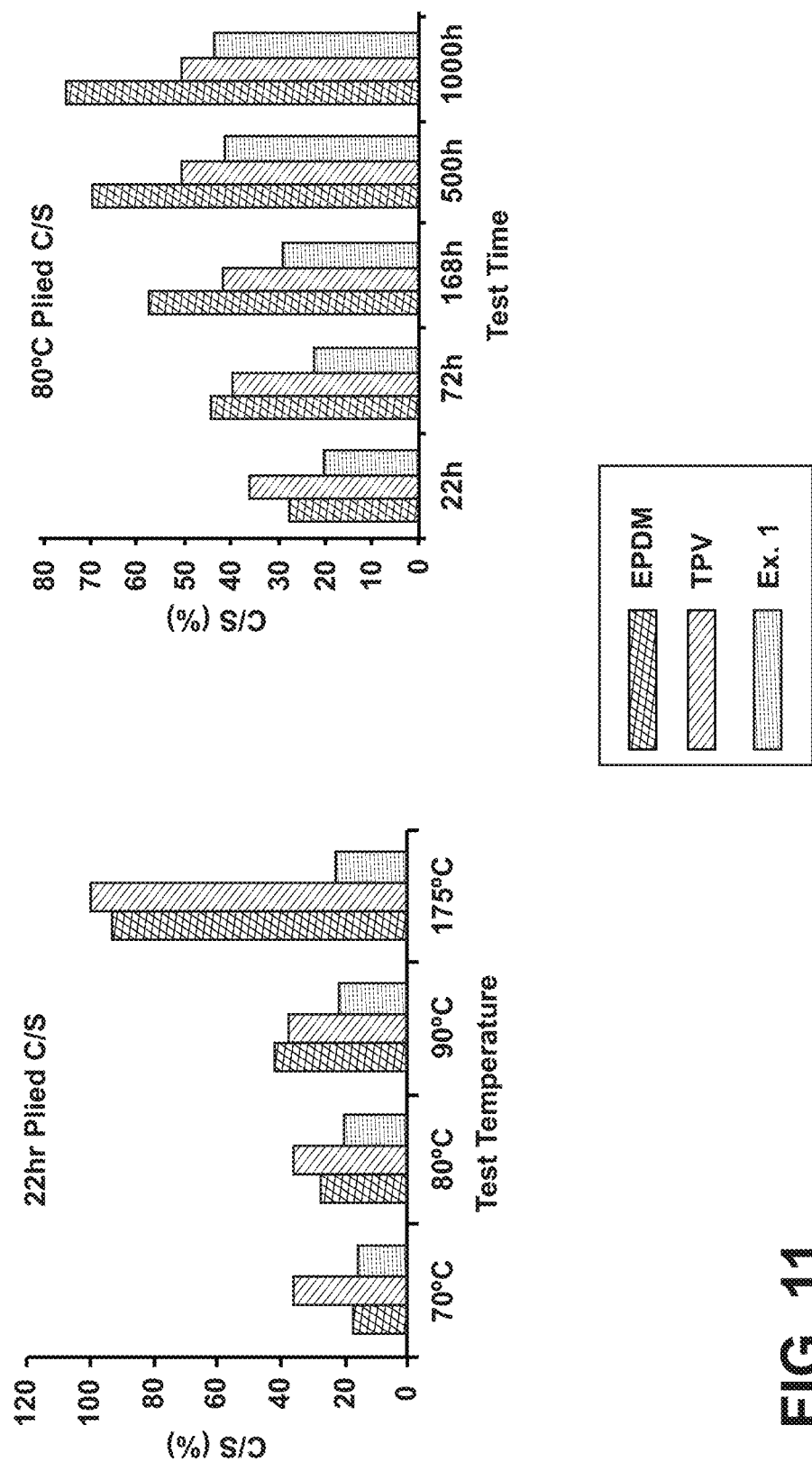
FIG. 11 is a graph illustrating the compression set of EPDM, TPV, and a silane-crosslinked polyolefin elastomer as plotted with respect to various test temperatures and time conditions.
Figure 12:
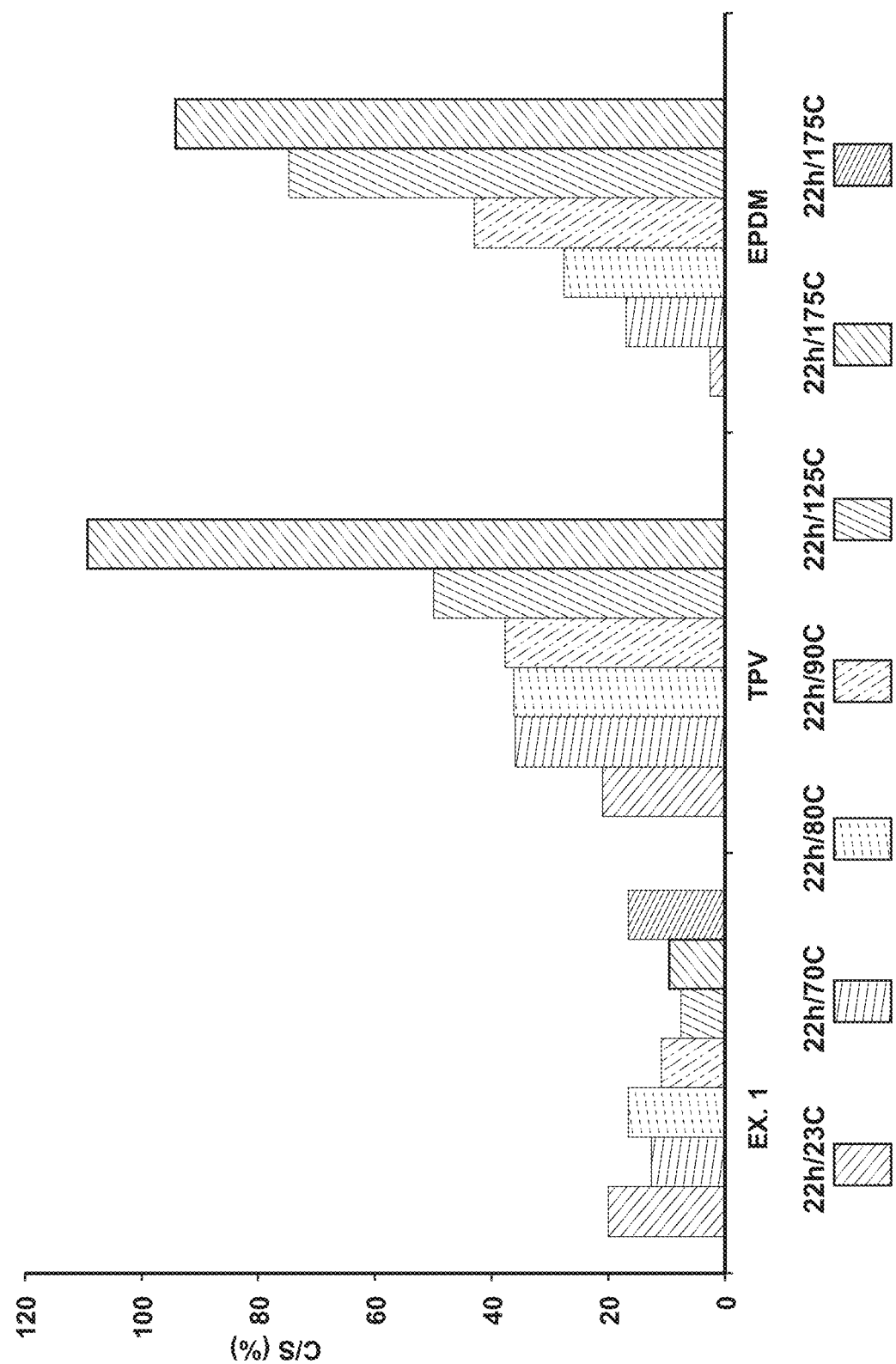
FIG. 12 is a graph illustrating the compression set of EPDM, TPV, and a silane-crosslinked polyolefin elastomer as plotted with respect to temperatures ranging from 23° C. to 175° C.

Referring now to FIGS. 11-12, compression set performance is provided across a range of elevated temperatures and increasing periods of time for Example 1, a comparative TPV, and a comparative EPDM. As shown in the graph of FIG. 12, the compression set % of the silane-crosslinked polyolefin elastomer (Ex. 1) increases slightly over the provided increasing temperatures (23° C.-175° C.) for a test time of 22 h relative to the comparative TPV and EPDM materials. The compression set % of the Ex. 1 silane-crosslinked polyolefin elastomer stays surprisingly even across the provided temperature range as compared to the dramatic increase in compression set % demonstrated for the TPV and EPDM materials.

As shown in the graph of FIG. 11, the compression set % of the silane-crosslinked polyolefin elastomer (Ex. 1) increases slightly over the provided increasing temperatures (70° C.-175° C.) and test times (22 h-1000 h) relative to the comparative TPV and EPDM materials.

Figure 13:
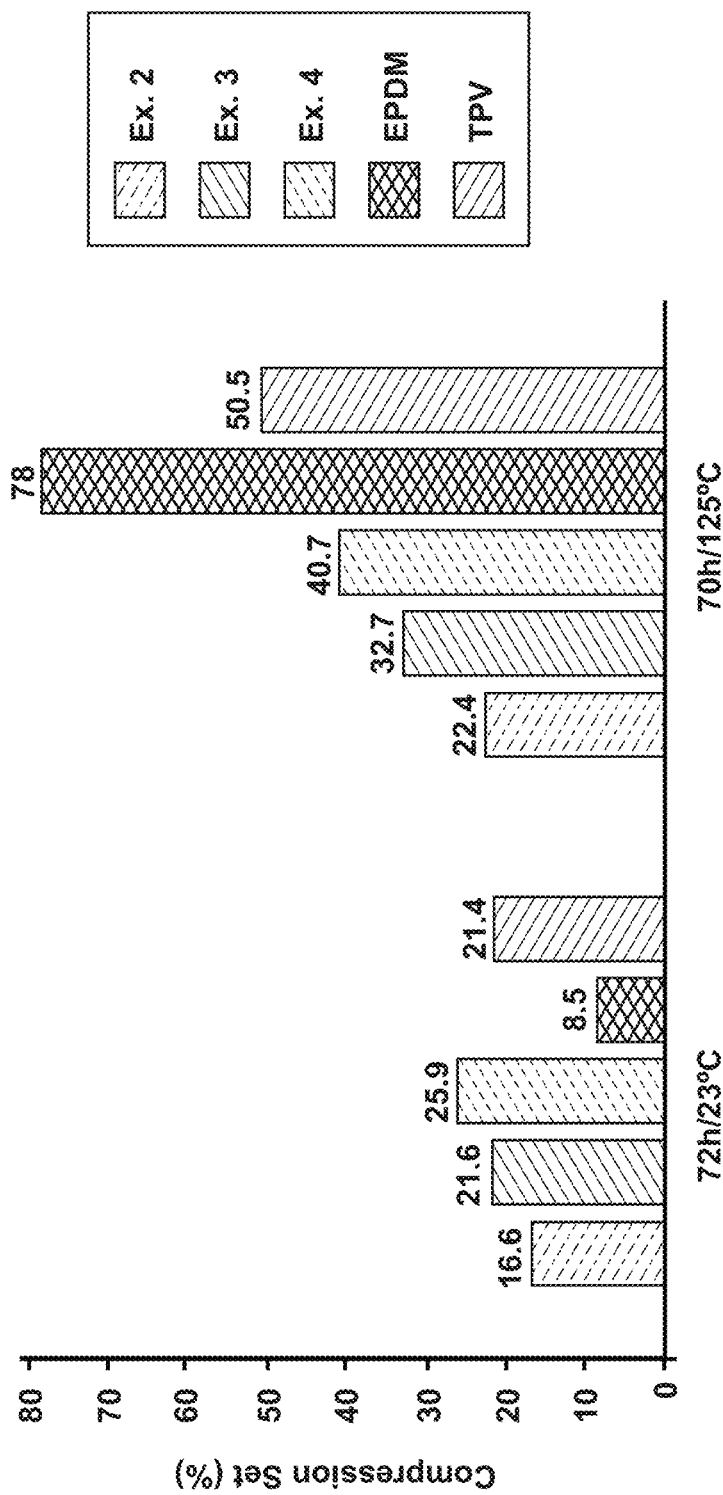
FIG. 13 is a graph illustrating the compression set of TPV and several silane-crosslinked polyolefin elastomers as plotted with respect to 23° C. and 125° C. temperatures.

FIG. 13 and Table 6 below provide additional data regarding the compression set performance of Examples 2-4 relative to EPDM 9724 and TPV 121-67. Table 6 provides compression set data performed in triplicate for Examples 2-4 relative to EPDM 9724 ("EPDM") and TPV 121-67 ("TPV"). FIG. 13 plots the average compression set values for these samples performed at 72 hrs at 23° C. and 70 hrs at 125° C.

TABLE 6

| Compound | 72 h/23° C. | 70 h/125° C. |
| --- | --- | --- |
| Ex. 2 | 13.8 | 22.1 |
| Ex. 2 | 15.7 | 22.3 |
| Ex. 2 | 20.4 | 22.9 |
| Avg. | 16.6 | 22.4 |
| Ex. 3 | 19.9 | 31.0 |
| Ex. 3 | 21.4 | 33.6 |
| Ex. 3 | 23.6 | 33.6 |
| Avg. | 21.6 | 32.7 |
| Ex. 4 | 24.8 | 41.9 |
| Ex. 4 | 24.6 | 40.2 |
| Ex. 4 | 28.4 | 40.0 |
| Avg. | 25.9 | 40.7 |
| EPDM | 5.6 | 75.4 |
| EPDM | 8.3 | 76.3 |
| EPDM | 11.5 | 82.3 |
| Avg. | 8.5 | 78.0 |
| TPV | 21.2 | 51.2 |
| TPV | 21.4 | 52.4 |
| TPV | 21.5 | 47.8 |
| Avg. | 21.4 | 50.5 |

Example 8

Example 8 (Ex. 8) or ED108-2A was produced by extruding 48.70 wt % ENGAGE™ 8842 and 48.70 wt % XUS38677.15 together with 2.6 wt % SILAN RHS 14/032 or SILFIN 13 to form a silane-grafted polyolefin elastomer. The Example 8 silane-grafted polyolefin elastomer was then extruded with 1.7 wt % Hydrocerol 1170 foaming agent, 2 wt % AMBICAT™ LE4472 condensation catalyst, and 360 ppm dioctyltin dilaurate (DOTL) condensation catalyst to form a silane-crosslinkable polyolefin elastomer, which was then extruded into an uncured elastomeric article. The Example 8 silane-crosslinkable polyolefin elastomer of the uncured dynamic sealing member was then cured at ambient temperature and humidity to form a silane-crosslinked polyolefin elastomer, consistent with the elastomers of the disclosure. The composition of Example 8 is provided in Table 7 below and its material properties are provided in Table 8 below.

Example 9

Example 9 (Ex. 9) or ED108-2B was produced by extruding 48.70 wt % ENGAGE 8842 and 48.70 wt % XUS38677.15 and 2.6 wt % SILAN RHS 14/032 or SILFIN 13 together with Exact 9061/SpectraSyn 10 (70/30) to form the silane-grafted polyolefin elastomer. The Example 9 silane-grafted polyolefin elastomer was then extruded with 1.7 wt % Hydrocerol 1170 foaming agent, 2 wt % AMBICAT™ LE4472 condensation catalyst, and 360 ppm dioctyltin dilaurate (DOTL) condensation catalyst to form a silane-crosslinkable polyolefin elastomer, which was then extruded into an uncured elastomeric article. The Example 9 silane-crosslinkable polyolefin elastomer of the uncured elastomeric article was then cured at ambient temperature and humidity to form a silane-crosslinked polyolefin elastomer, consistent with the elastomers of the disclosure. The composition of Example 9 is provided in Table 7 below and its material properties are provided in Table 8 below. Also provided below in Table 8 are properties associated with a comparative EPDM material ("EPDM").

TABLE 7

| Ingredients | Ex. 8 | Ex. 9 |
| --- | --- | --- |
| ENGAGE XLT8677/XUS 38677.15 | 48.7 | 46.25 |
| ENGAGE 8842 | 48.7 | 46.25 |
| SILAN RHS 14/032 or SILFIN 29 | 2.6 | 2.5 |
| Exact 9061/SpectraSyn 10 (70/30) | — | 5 |
| TOTAL | 100 | 100 |

TABLE 8

| Property | Test | Method | Units/Output | Ex. 8 | Ex. 9 | EPDM |
| --- | --- | --- | --- | --- | --- | --- |
| Structural | Density | ASTM D297 | g/cc | 0.52 | 0.55 | 0.66 |
| | Tensile | ASTM D412 Die C | MPa | 2.6 | 2.0 | 2.9 |
| | Elongation | ASTM D412 Die C | % | 230 | 209 | 354 |
| | 100% Modulus | ASTM D412 Die C | MPa | 1.5 | 1.4 | 0.80 |
| | Tear C | ASTM D624 Die C | N/mm | 8.0 | 9.6 | 8.8 |
| Compression Set (50% compression) | Plied C/S (22 h/80° C.) | ASTM D395 Method B | % | 29.4 | 35.4 | 47.4 |
| | Plied C/S (96 h/80° C.) | ASTM D395 Method B | % | 37.6 | 58.9 | 56.4 |
| | Plied C/S (168 h/80° C.) | ASTM D395 Method B | % | 67.0 | 69.6 | 67.8 |
| | Plied C/S (500 h/80° C.) | ASTM D395 Method B | % | 76.4 | — | 73.5 |
| | Plied C/S (1000 h/80° C.) | ASTM D395 Method B | % | 78.6 | — | 97.3 |
| Miscellaneous | Water Absorption | GM9888P | % | 0.16 | — | 0.21 |

Figure 14:
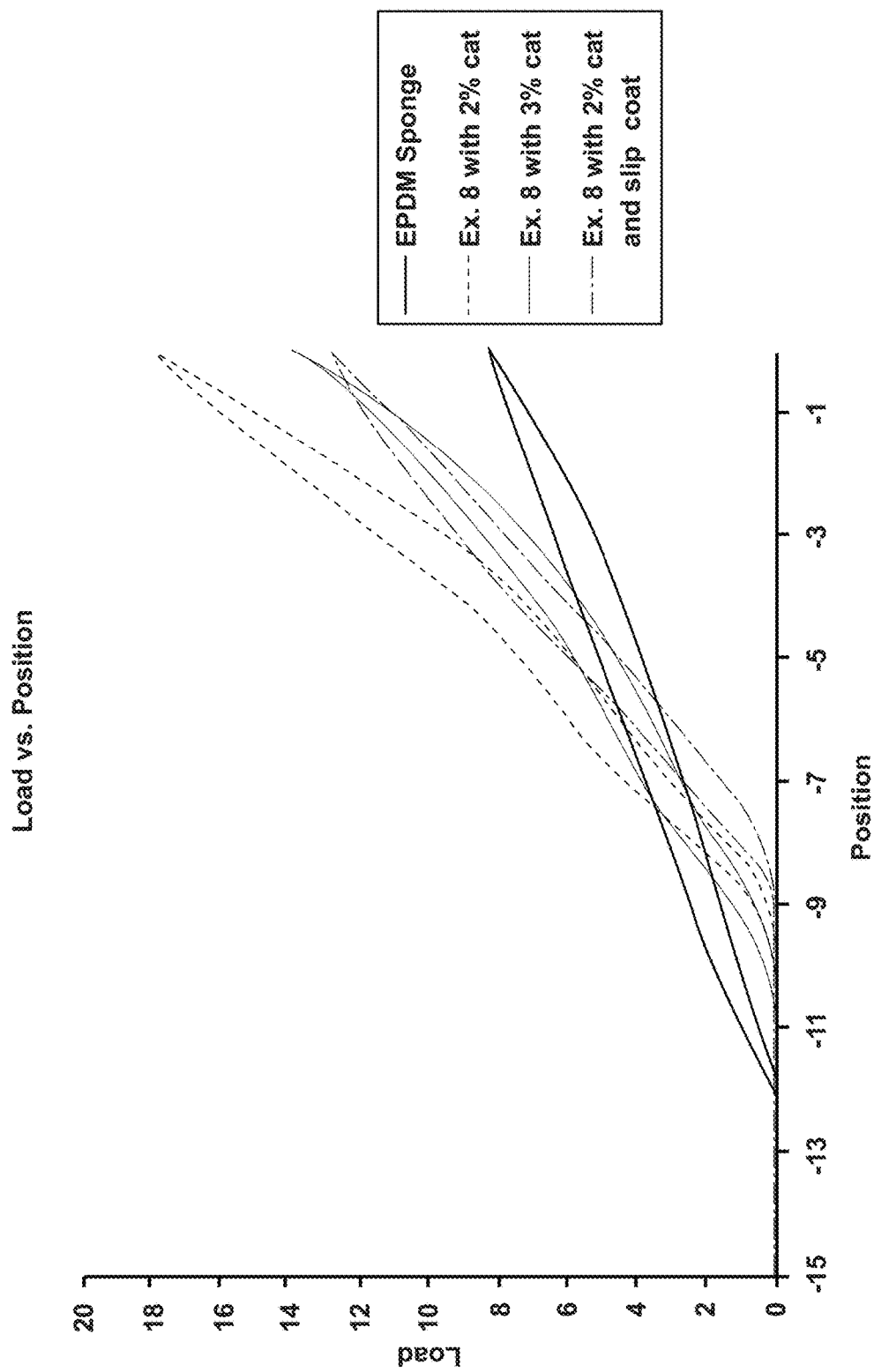
FIG. 14 is a graph illustrating the load versus position behavior of a dynamic silane-crosslinked elastomer, as compared to load versus position behavior of comparative EPDM compounds.

Referring now to FIG. 14, a load vs. position plot is provided for the Ex. 8 ED108-2A resin (i.e., as prepared above in Example 8), as crosslinked with 2% catalyst ("Ex. 8 with 2% cat"), 3% catalyst (Ex. 8 with 3% cat"), and 2% catalyst with a slip coat ("Ex. 8 with 2% cat and slip coat"). A comparative example load v. position plot is provided for a traditional EPDM sponge material ("EPDM"). The Ex. 8 materials (i.e., dynamic silane-crosslinked polyolefin elastomers according to the disclosure) display a smaller area between the load/position curves as compared to the areas between the load/position curves for the comparative EPDM compound. This smaller area between the load/position curves for the dynamic silane-crosslinked polyolefin elastomers can be desirable for elastomeric articles, e.g., weatherstrips, that can be used for various sealing applications. Further, the Ex. 8 polyolefin blends do not contain any filler or plasticizer incorporated so each of corresponding load/position curves for these blends do not have or display any Mullins effect and/or Payne effect.

The selection of the condensation catalyst may have an influence on the final material properties for a sample. For example, the Example 9 ED108-2B silane-grafted polyolefin elastomer was produced by extruding 48.70 wt % ENGAGE 8842 and 48.70 wt % XUS38677.15 and 2.6 wt % SILAN RHS 14/032 or SILFIN 13 together with Exact 9061/SpectraSyn 10 (70/30) to form the silane-grafted polyolefin elastomer. These Example 9 silane-grafted polyolefin elastomers were then extruded with two different condensation catalysts: (a) with 1.7 wt % Hydrocerol 1170 foaming agent, 2 wt % AMBICAT™ LE4472 condensation catalyst, and 360 ppm dioctyltin dilaurate (DOTL) condensation catalyst; and (b) with 1.7 wt % Hydrocerol 1170 foaming agent, 2 wt % AMBICAT™ LE4472 condensation catalyst, and 360 ppm dibutyltin dilaurate (DBTDL) condensation catalyst. Accordingly, two silane-crosslinkable polyolefin elastomers were formed (identified as "DOTL" and "DBTDL"), which were then extruded into an uncured elastomeric article. The difference in material properties of these crosslinkable elastomers are given below in Tables 9 and 10.

TABLE 9

| Elastomer Group | 22 h/80 C. Tube C/S (%) | 96 h/80 C. Tube C/S (%) | 168 h/80 C. Tube C/S |
|---|---|---|---|
| DOTL | 38.9 | 42.1 | 52.3 |
| DBTDL | 25.9 | 27.9 | 34.0 |

TABLE 10

| Group | Duro | Tensile MPa | Elongation (%) | 100% Modulus (Mpa) | Auburn Density (g/cc) | TC (N/mm) |
|---|---|---|---|---|---|---|
| DOTL | 43 | 2.8 | 294 | 1.3 | 0.52 | 9.3 |
| DBTDL | 39 | 2.9 | 170 | 1.9 | 0.51 | 7.6 |

Referring now to FIG. 15, cross-sectional views are provided for a silane-crosslinked polyolefin elastomer foamed used supercritical gas injection and chemical foaming agents. As provided by the images, the pore size resulting from the chemical foaming agent is from 20 m to 147 μm while the pore size resulting from the supercritical gas injection is from 46 μm to 274 μm. Depending on the type of foaming agent selected to foam each of the respective silane-crosslinkable polyolefin elastomer disclosed herein, a variety of different pore sizes can be obtained which will affect the final density of the foamed silane-crosslinked polyolefin elastomer. In some aspects, the pore size may be from 20 μm to 200 μm, from 25 μm to 400 lam, or from 25 μm to 300 μm.

Example 10

Example 10 (Ex. 10) or ED76-4A was produced by extruding 82.55 wt % ENGAGE™ 8842 and 14.45 wt % MOSTEN™ TB 003 together with 3.0 wt % SILAN RHS 14/032 or SILFIN 29 to form a silane-grafted polyolefin elastomer. The Example 10 silane-grafted polyolefin elastomer was then extruded with 2.0 wt % MBF-AC170EVA microencapsulated blowing agent, 3 wt % AMBICAT™ LE4472 condensation catalyst, and 0.7 wt % AD-2 process aide to form a foamed silane-crosslinkable polyolefin elastomer, which was then extruded into the form of an uncured elastomeric article. The Example 10 foamed silane-crosslinkable polyolefin elastomer of the uncured elastomeric article was then cured at ambient temperature and humidity to form a foamed silane-crosslinked polyolefin elastomer, consistent with the elastomers of the disclosure. The composition of Example 10 is provided in Table 11 below and the material properties associated with its foamed silane-crosslinked polyolefin blend are provided in Table 12 below.

Example 11

Example 11 (Ex. 11) or ED76-4E was produced by extruding 19.00 wt % ENGAGE™ 8150, 58.00 wt % ENGAGE™ 8842, and 20.00 wt % MOSTEN™ TB 003 together with 3.0 wt % SILAN RHS 14/032 or SILFIN 29 to form a silane-grafted polyolefin elastomer. The Example 11 silane-grafted polyolefin elastomer was then extruded with 2.0 wt % MBF-AC170EVA microencapsulated blowing agent, 3 wt % AMBICAT™ LE4472 condensation catalyst, and 0.7 wt % AD-2 process aide to form a foamed silane-crosslinkable polyolefin elastomer, which was then extruded into an uncured elastomeric article. The Example 11 foamed silane-crosslinkable polyolefin elastomer of the uncured elastomeric article was then cured at ambient temperature and humidity to form a foamed silane-crosslinked polyolefin elastomer, consistent with the elastomers of the disclosure. The composition of Example 11 is provided in Table 11 below and the material properties associated with its foamed silane-crosslinked polyolefin blend are provided in Table 12 below.

Example 12

Example 12 (Ex. 12) or ED76-5 was produced by extruding 19.00 wt % ENGAGE™ 8150, 53.00 wt % ENGAGE™ 8842, and 25.00 wt % MOSTEN™ TB 003 together with 3.0 wt % SILAN RHS 14/032 or SILFIN 29 to form the silane-grafted polyolefin elastomer. The Example 12 silane-grafted polyolefin elastomer was then extruded with 2.0 wt % MBF-AC170EVA microencapsulated blowing agent, 3 wt % AMBICAT™ LE4472 condensation catalyst, and 0.7 wt % AD-2 process aide to form a foamed silane-crosslinkable polyolefin elastomer, which was then extruded into an uncured elastomeric article. The Example 12 foamed silane-crosslinkable polyolefin elastomer of the uncured elastomeric article was then cured at ambient temperature and humidity to form a foamed silane-crosslinked polyolefin elastomer, consistent with the elastomers of the disclosure. The composition of Example 12 is provided in Table 11 below and the material properties associated with its foamed silane-crosslinked polyolefin blend are provided in Table 12 below.

Example 13

Example 13 (Ex. 13) or ED76-6 was produced by extruding 16.36 wt % ENGAGE™ 8150, 45.64 wt % ENGAGE™ 8842, and 35.00 wt % MOSTEN™ TB 003 together with 3.0 wt % SILAN RHS 14/032 or SILFIN 29 to form the silane-grafted polyolefin elastomer. The Example 13 silane-grafted polyolefin elastomer was then extruded with 2.0 wt % MBF-AC170EVA microencapsulated blowing agent, 3 wt % AMBICAT™ LE4472 condensation catalyst, and 0.7 wt % AD-2 process aide to form a foamed silane-crosslinkable polyolefin elastomer, which was then extruded into an uncured elastomeric article. The Example 13 foamed silane-crosslinkable polyolefin elastomer of the uncured elastomeric article was then cured at ambient temperature and humidity to form a foamed silane-crosslinked polyolefin elastomer, consistent with the elastomers of the disclosure. The composition of Example 13 is provided in Table 11 below and the material properties associated with its foamed silane-crosslinked polyolefin blend are provided in Table 12 below.

TABLE 11

| Ingredients | Ex. 10 | Ex. 11 | Ex. 12 | Ex. 13 |
|---|---|---|---|---|
| ENGAGE 8150 | — | 19.00 | 19.00 | 16.36 |
| ENGAGE 8842 | 82.55 | 58.00 | 53.00 | 45.64 |
| MOSTEN TB 003 | 14.45 | 20.00 | 25.00 | 35.00 |
| SILAN RHS 14/032 or SILFIN 29 | 3.00 | 3.00 | 3.00 | 3.00 |
| TOTAL | 100 | 100 | 100 | 100 |

TABLE 12

| Property | Test | Method | Units/Output | Ex. 10 | Ex. 11 | Ex. 12 | Ex. 13 |
|---|---|---|---|---|---|---|---|
| Physical Properties | Density | ASTM D297 | g/cc | 0.67 | 0.66 | 0.67 | 0.69 |
| | Hardness | ASTM D412 Die C | Shore A | 60 | 67 | 69 | 87 |
| | Tensile | ASTM D412 Die C | MPa | 5.0 | 7.2 | 8.7 | 7.6 |
| | Elongation | ASTM D412 Die C | % | 160 | 174 | 203 | 293 |
| | Tear C | ASTM D624 Die C | N/mm | 12.6 | 22.8 | 22.5 | 46.8 |
| Aged Properties | Hardness Heat Age (70 h/70° C.) | ASTM D573 | Change (Shore A) | 2 | 0 | 1 | 1 |
| | Tensile Heat Age (70 h/70° C.) | ASTM D573 | % Change | 12.6 | 5.5 | −0.8 | 7 |
| | Elongation Heat Age (70 h/70° C.) | ASTM D573 | % Change | −0.6 | −7.2 | −13.5 | −12.8 |
| Compression Set | Plied C/S (22 h/70° C.) | ASTM D395 Method B | % | 40 | 41 | 61 | 78 |
| Miscellaneous | Water Absorption | MS-AK-92 | % | 0.5 | 0.2 | 0.7 | 0.5 |
| | Ozone Resistance (168 h/40% Elongation) | ASTM D1149 | — | No Cracks | No Cracks | No Cracks | No Cracks |
| | Odor | SAE J1351 | No odor wet or dry | Pass | Pass | Pass | Pass |
| | Paint Staining (24 h/70° C.) | ASTM D925 Method A | — | No Staining | No Staining | No Staining | No Staining |

Example 14

A foamed elastomeric article was prepared using a reactive twin-screw extruder 66 (see FIG. 3A) to extrude 48.7 wt % ENGAGE™ XLT8677 or XUS 38677.15 and 48.7 wt % ENGAGE™ 8842 together with 2.6 wt % SILAN RHS 14/032 or SILFIN 29 to form the ED108-2A silane-grafted polyolefin elastomer. Next, a reactive single screw extruder 102 (see FIG. 3B) equipped with a supercritical fluid injector (not shown) was employed to further process the blend, where the supercritical fluid medium was nitrogen ($N_2$) with a gas flow rate of 0.29 kg/h. The injector open time was 10 sec and the pressure was maintained at 140 bar. A gas load of 0.5 wt % was used with an injection speed of 75 mm/s. The weight of the ED108-2A material used was 153.4 g. The resulting sample has a density of 0.382 $g/cm^3$, as measured using a density scale. No condensation catalyst was added and the precision opening was 1.5 mm. The material properties for Example 14 are listed below in Table 13, where the compression set values were measured according to ASTM D 395 and the density values were measured by measuring the weight, length, width and thickness of a sample (approximately 9 cm×10 cm, and 0.2-0.5 cm in thickness).

TABLE 13

| Compression Set 6 h/50° C. | | | |
|---|---|---|---|
| Compression | 30 min | 24 hr | 48 hr |
| 25% | 37.4% | 30.6% | 26.5% |
| 50% | 44.9% | 38.2% | 35.0% |
| Density | % Rebound | ASKER C | ShA |
| 0.46 | 48.6 | 43.8 | 25.6 |

Example 15

A foamed elastomeric article was prepared using a reactive twin-screw extruder 66 (see FIG. 3A) to extrude 82.55 wt % ENGAGE™ 8842 and 14.45 wt % MOSTEN™ TB 003 together with 3.0 wt % SILAN RHS 14/032 or SILFIN 29 to form the ED76-4A silane-grafted polyolefin elastomer. Next, a reactive single screw extruder 102 was then used to load and extrude silane-grafted polyolefin elastomer, with 1.0 wt % dioctyltin dilaurate (DOTL) condensation catalyst, and 10 wt % MEBA chemical foaming agent. The density of the corresponding foamed silane-crosslinked polyolefin elastomer was 0.304 g/cm$^3$, as measure using a density scale. The compression set data for Example 15 is listed below in Table 14.

TABLE 14

| Compression Set 6 h/50° C. | | | |
|---|---|---|---|
| Compression | 30 min | 24 hr | 48 hr |
| 25% | 22.1% | 17.2% | 18.4% |
| 50% | 14.6% | 12.9% | 10.4% |

Example 16

Example 16 or ED76-4A was produced by extruding 82.55 wt % ENGAGE™ 8842, 14.45 wt % MOSTEN™ TB 003 together with 3.0 wt % SILAN RHS14/032 or SILFIN 29 to form the silane-grafted polyolefin elastomer. The Example 16 silane-grafted polyolefin elastomer was then extruded with 300 ppm to 400 ppm dioctyltin dilaurate (DOTL) condensation catalyst to form a silane-crosslinkable polyolefin elastomer that can be molded or extruded into an uncured hose element. The Example 16 silane-crosslinkable polyolefin elastomer was then cured at ambient temperature and humidity to form the corresponding silane-crosslinked polyolefin elastomer. The composition of Example 16 and acceptable composition ranges for the various components of this example are provided in Table 15 below.

TABLE 15

| Component | Relative amount (wt %) | First range (wt %) | Second range (wt %) |
|---|---|---|---|
| ENGAGE 8842 | 82.55 | 60-90 | 75-85 |
| RHS 14/032 | 3.00 | 1-5 | 2-4 |
| MOSTEN TB 003 | 14.45 | 5-25 | 10-20 |
| Total | 100 | 100 | 100 |

Example 17

Example 17 (Ex. 17) or ED 92-GF was produced by extruding 34.20 wt % ENGAGE™ 8842, 41.20 wt % ENGAGE™ XLT8677 or XUS 38677.15, 14.50 wt % and 19.34 wt % MOSTEN™ TB 003, and 7.50 wt % RHS14/033 (35% GF) with 2.6 wt % SILAN RHS14/032 or SILFIN 29 to form the silane-grafted polyolefin elastomer. The Example 17 silane-grafted polyolefin elastomer was then extruded with dioctyltin dilaurate (DOTL) condensation catalyst to form a silane-crosslinkable polyolefin elastomer that can be molded or extruded into an uncured hose element. The Example 17 silane-crosslinkable polyolefin elastomer was cured at ambient temperature and humidity to form the corresponding silane-crosslinked polyolefin elastomer. The composition of Example 17 and acceptable composition ranges for the various elements of this example are provided in Table 16 below. The material properties of Example 17 are provided in Table 17 below, the provided material properties are representative of those shared by each of the silane-crosslinked polyolefin elastomers disclosed herein.

The composition of Example 17 may be cured using 200 ppm to about 500 ppm dioctyltin dilaurate (DOTL) catalyst system. ENGAGE™ 8842 polyolefin elastomer is an ultra-low density ethylene-octene copolymer. ENGAGE™ XLT8677 polyolefin elastomer is an ethylene-octene copolymer that is added to function as an impact modifier. MOSTEN™ TB 003 is a polypropylene homopolymer. RHS 14/033 is an ethylene-octene copolymer having 35 wt % glass fibers. SILAN RHS 14/032 and SILFIN 29 are both blends of a vinyltrimethoxysilane monomer and a peroxide molecule for grafting and crosslinking the various polyolefins added to the blend.

TABLE 16

| Component | Relative Amount (wt %) | First range (wt %) | Second range (wt %) |
|---|---|---|---|
| ENGAGE 8842 | 34.20 | 20-50 | 30-40 |
| ENGAGE XLT8677 (XUS 38677.15) | 41.20 | 20-60 | 35-45 |
| MOSTEN TB 003 | 14.50 | 5-25 | 10-20 |
| RHS14/033 (35% GF) | 7.50 | 2-20 | 5-10 |
| SILAN RHS14/032 or SILFIN 29 | 2.60 | 1-10 | 2-3 |
| Total | 100 | 100 | 100 |

TABLE 17

| Property | Test | Method | Units/Output | Ex. 1 |
|---|---|---|---|---|
| Originals | Hardness | ASTM D412 Die C | Shore A | 74 |
|  | Tensile | ASTM D412 Die C | Mpa | 9.3 |
|  | Elongation | ASTM D412 Die C | % | 301 |
|  | Tear C | ASTM D624 Die C | N/mm | 33.4 |
| Delft Tear | Ambient Delft Tear | ISO 34-2 | N | 44.3 |
|  | 100° C. Delft Tear | ISO 34-2 | N | 14.8 |
|  | 125° C. Delft Tear | ISO 34-2 | N | 9.4 |
|  | 135° C. Delft Tear | ISO 34-2 | N | 8.5 |
| Heat Age | Hardness Heat Age (1000 h/120° C.) | ASTM D573 | Change (Shore A) | −1 |
|  | Tensile Heat Age (1000 h/120° C.) | ASTM D573 | % Change | 9.1 |
|  | Elongation Heat Age (1000 h/120° C.) | ASTM D573 | % Change | −28.2 |
|  | Hardness Heat Age (168 h/135° C.) | ASTM D573 | Change (Shore A) | −1 |
|  | Tensile Heat Age (168 h/135° C.) | ASTM D573 | % Change | 6.5 |
|  | Elongation Heat Age (168 h/135° C.) | ASTM D573 | % Change | −17 |

TABLE 17-continued

| Property | Test | Method | Units/Output | Ex. 1 |
|---|---|---|---|---|
| | Hardness Heat Age (1000 h/135° C.) | ASTM D573 | Change (Shore A) | −3 |
| | Tensile Heat Age (1000 h/135° C.) | ASTM D573 | % Change | 20.8 |
| | Elongation Heat Age (1000 h/135° C.) | ASTM D573 | % Change | −25.5 |
| | Hardness Heat Age (168 h/150° C.) | ASTM D573 | Change (Shore A) | 0 |
| | Tensile Heat Age (168 h/150° C.) | ASTM D573 | % Change | −1.3 |
| | Elongation Heat Age (168 h/150° C.) | ASTM D573 | % Change | −33 |
| Compression Set | Plied C/S (22 h/80° C.) | ASTM D395 Method B | % | 28 |
| Misc. | Weathering (3000 hrs.) | SAE J2527 | AATCC | 4-5 (pass) |

Abrasion testing results were performed for Examples 16 and 17 using a William's Abrasion Testing method (JIS K6242). The test conditions included a rotation speed of 37±3 rpm, a load of 35.5N, and a testing time of 6 minutes. The results are provided below in Table 18.

TABLE 18

| Material | SG (g/cm$^3$) | mass decrease (g) | | | | Abrasion volume $\Delta$V (mm$^3$) | $\Delta$V1000 (mm$^3$) |
|---|---|---|---|---|---|---|---|
| | | | 1 | 2 | 3 | Ave. | | |
| Ex. 16 | 0.880 | ① | 0.0036 | 0.0062 | 0.0045 | 0.0044 | 5.0 | 21.8 |
| | | ② | 0.0029 | 0.0033 | 0.0057 | | | |
| Ex. 17 | 0.911 | ① | 0.0450 | 0.0424 | 0.0271 | 0.0296 | 32.5 | 142.3 |

Silane Effect

Blends of polyolefin elastomers (Engage 8842), polypropylene (PP 4.0), and silane (silfin 13) were mixed in a twin-screw extruder at high temperature to graft the silane onto the polyolefin. The amount of silane was varied. The results are shown in Table 19 below. For this blend, tensile, elongation, and Tear C (TC) were good at 2.6 wt % silane cocktail but C/S results were lower for 2.8 wt %.

Polypropylene Effect

The effect of polypropylene was also tested. Varying amounts of TAMFER™ PN 3560 and PP 4.0 were used. The results are shown in Table 20 below. Comparing ED76 to ED87, a slight improvement in elongation was observed but overall, no significant improvement was seen from the addition of PN-3560 (propylene-based polymer, a specialty olefinic resin designed to improve transparency, flexibility, softness, and impact resistance). Without wishing to be bound by theory, it is believed that PN3560 improves plied C/S due to higher melting point of the crystalline region.

TABLE 19

| Test | | ED76 | ED76-2.4 | ED76-2.6 | ED76-2.8 |
|---|---|---|---|---|---|
| | Component | | | | |
| | Engage 8842 | 0.8245 | 0.8296 | 0.8279 | 0.8262 |
| | PP 4.0 | 0.1455 | 0.1464 | 0.1461 | 0.1458 |
| | silfin 13 | 0.03 | 0.024 | 0.026 | 0.028 |
| | Property | | | | |
| Orig. Tensile (D412 die) Lrg die | Durometer (ShA) | 67 | 67 | 72 | 68 |
| | Peak Stress (MPa) | 7.7 | 7.7 | 8.7 | 8.4 |
| | Elongation (%) | 223 | 246 | 271 | 263 |
| | 100% Modulus (MPa) | 3.3 | 3.2 | 3.2 | 3.1 |
| TC | Tear C (N/mm) | 20.8 | 20.3 | 21.4 | 19.3 |
| VW C/S (compression set) | 22 h/90 C. (%) | 76.5 | 78.2 | — | 75 |
| VW C/S | 22 h/70 C. (%) Daimler | 76 | 74.7 | 78.4 | 75 |
| Plied C/S | 22 h/80 C. (%) | 22.6 | 19.5 | 21.6 | 17.6 |

TABLE 20

| Test | | ED76 | ED86 | ED87 |
|---|---|---|---|---|
| | Component | | | |
| | Engage 8842 | 0.8245 | 0.8279 | 0.8279 |
| | PN 3560 | | 0.1461 | 0.0487 |
| | PP 4.0 | 0.1455 | — | 0.0974 |
| | silfin 13 | 0.03 | 0.026 | 0.026 |
| | Property | | | |
| Orig. Tensile | Durometer (ShA) | 67 | 60 | 66 |
| (D412 die) Lrg die | Peak Stress (MPa) | 7.7 | 6.1 | 8 |
| | Elongation (%) | 223 | 299 | 284 |
| | 100% Modulus (MPa) | 3.3 | 2.1 | 2.9 |
| TC | Tear C (N/mm) | 20.8 | 14.6 | 19.2 |
| VW C/S | 22 h/90 C. (%) | 76.5 | 78.8 | 76.7 |
| VW C/S | 22 h/70 C. (%) Daimler | 76 | 76.6 | 74.7 |
| Plied C/S | 22 h/80 C. (%) | 22.6 | 16.1 | 20.7 |

XUS Polymer Effect

The effect of XUS polymer was also studied. The results are shown in Table 21 below. ENGAGE™ 8842 and XUS 38677.15 are both ethylene-octene copolymers. ENGAGE™ 8842 has about 55% ethylene and XUS 38677.15 has about 52% ethylene. However, XUS 38677.15 is a block olefin copolymer where the soft segment is amorphous (to have low compression set). The hard segment has a melting point well above 70° C. Excellent tensile and TC results were observed for ED89 but C/S was high. Lower C/S resulted from ED92.

TABLE 21

| Test | | ED88 | ED89 | ED92 |
|---|---|---|---|---|
| | Component | | | |
| | XUS 38677 (XUS) | 0.828 | 0.414 | 0.414 |
| | Engage 8003 | — | 0.414 | — |
| | Engage 8842 | — | — | 0.414 |
| | PP 4.0 | 0.146 | 0.146 | 0.146 |
| | silfin 13 | 0.026 | 0.026 | 0.026 |
| | Property | | | |
| Orig. Tensile (D412 die) Lrg die | Durometer (ShA) | 75 | 84 | 74 |
| | Peak Stress (MPa) | 9.7 | 12.2 | 8.6 |
| | Elongation (%) | 254 | 310 | 257 |
| | 100% Modulus (MPa) | 4.7 | 5.3 | 3.7 |
| TC | Tear C (N/mm) | 26 | 33.3 | 25.7 |
| VW C/S | 22 h/90 C. (%) | 66 | 85.6 | 60.2 |
| VW C/S | 22 h/70 C. (%) Daimler | 58.4 | 83.5 | 53.1 |
| Plied C/S | 22 h/80 C. (%) | 21.8 | 29.5 | 16.5 |

For purposes of this disclosure, the term "coupled" (in all of its forms, couple, coupling, coupled, etc.) generally means the joining of two components directly or indirectly to one another. Such joining may be stationary in nature or movable in nature. Such joining may be achieved with the two components and any additional intermediate members being integrally formed as a single unitary body with one another or with the two components. Such joining may be permanent in nature or may be removable or releasable in nature unless otherwise stated.

It is also important to note that the construction and arrangement of the elements of the device as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present device. The exemplary structures and processes disclosed herein are for illustrative purposes and are not to be construed as limiting.

The above description is considered that of the illustrated embodiments only. Modifications of the device will occur to those skilled in the art and to those who make or use the device. Therefore, it is understood that the embodiments shown in the drawings and described above is merely for illustrative purposes and not intended to limit the scope of the articles, processes and compositions, which are defined by the following claims as interpreted according to the principles of patent law, including the Doctrine of Equivalents.

Listing of Non-Limiting Embodiments

Embodiment A is a silane-crosslinked polyolefin elastomer blend comprising: a first polyolefin having a density less than 0.86 g/cm$^3$; a second polyolefin having a percent crystallinity less than 40%; a silane crosslinker, wherein the silane-crosslinked polyolefin elastomer blend exhibits a compression set of from about 5.0% to about 35.0%, as measured according to ASTM D 395 (22 hrs @ 70° C.) and wherein the silane-crosslinked polyolefin elastomer blend has a density less than 0.90 g/cm$^3$.

The silane-crosslinked polyolefin elastomer blend of Embodiment A further comprising a microencapsulating foaming agent.

The silane-crosslinked polyolefin elastomer blend of Embodiment A or Embodiment A with any of the intervening features wherein the density is less than 0.70 g/cm$^3$.

The silane-crosslinked polyolefin elastomer blend of Embodiment A or Embodiment A with any of the intervening features further comprising a foaming agent.

The silane-crosslinked polyolefin elastomer blend of Embodiment A or Embodiment A with any of the intervening features wherein the density is less than 0.60 g/cm$^3$.

The silane-crosslinked polyolefin elastomer blend of Embodiment A or Embodiment A with any of the intervening features wherein the compression set is from about 15.0% to about 35.0%, as measured according to ASTM D 395 (22 hrs @ 70° C.).

The silane-crosslinked polyolefin elastomer blend of Embodiment A or Embodiment A with any of the intervening features wherein the first polyolefin comprises an ethylene-octene copolymer from about 60 wt % to about 97 wt %.

The silane-crosslinked polyolefin elastomer blend of Embodiment A or Embodiment A with any of the intervening features wherein the second polyolefin comprises a polypropylene homopolymer from about 10 wt % to about 35 wt % and/or a poly(ethylene-co-propylene).

The silane-crosslinked polyolefin elastomer blend of Embodiment A or Embodiment A with any of the intervening features wherein the silane crosslinker comprises a vinyltrimethoxy silane from about 1 wt % to about 4 wt %.

Embodiment B is a silane-crosslinked polyolefin elastomer blend comprising: a first polyolefin having a density less than 0.86 g/cm$^3$; a second polyolefin having a percent crystallinity less than 40%; a silane crosslinker; a foaming agent; wherein the silane-crosslinked polyolefin elastomer blend exhibits a compression set of from about 5.0% to about 35.0%, as measured according to ASTM D 395 (22 hrs @ 70° C.) and wherein the silane-crosslinked polyolefin elastomer blend has a density less than 0.70 g/cm$^3$.

The silane-crosslinked polyolefin elastomer blend of Embodiment B wherein the first polyolefin comprises an ethylene-octene copolymer from about 60 wt % to about 97 wt %.

The silane-crosslinked polyolefin elastomer blend of Embodiment B or Embodiment B with any of the intervening features wherein the second polyolefin comprises a polypropylene homopolymer from about 10 wt % to about 35 wt % and/or a poly(ethylene-co-propylene).

The silane-crosslinked polyolefin elastomer blend of Embodiment B or Embodiment B with any of the intervening features wherein the silane crosslinker comprises a vinyltrimethoxy silane from about 1 wt % to about 4 wt %.

The silane-crosslinked polyolefin elastomer blend of Embodiment B or Embodiment B with any of the intervening features further comprising a condensation catalyst that comprises a sulfonic ester from about 1 wt % to about 4 wt %.

The silane-crosslinked polyolefin elastomer blend of Embodiment B or Embodiment B with any of the intervening features wherein the density is less than 0.60 g/cm$^3$.

The silane-crosslinked polyolefin elastomer blend of Embodiment B or Embodiment B with any of the intervening features wherein the foaming agent includes a microencapsulating foaming agent.

The silane-crosslinked polyolefin elastomer blend of Embodiment B or Embodiment B with any of the intervening features wherein the compression set is from about 15.0% to about 35.0%, as measured according to ASTM D 395 (22 hrs @ 70° C.).

Embodiment C is a method for making an elastomeric article, the method comprising: extruding a first polyolefin having a density less than 0.86 g/cm$^3$, a second polyolefin having a crystallinity less than 40%, a silane crosslinker and a grafting initiator together to form a silane-grafted polyolefin blend; extruding the silane-grafted polyolefin blend and a condensation catalyst together to form a silane-crosslinkable polyolefin blend; molding the silane-crosslinkable polyolefin blend into an uncured elastomeric article; and crosslinking the crosslinkable-polyolefin blend of the uncured elastomeric article at an ambient temperature and an ambient humidity to form the elastomeric article having a density less than 0.70 g/cm$^3$, wherein the elastomeric article exhibits a compression set of from about 5.0% to about 35.0%, as measured according to ASTM D 395 (22 hrs @ 70° C.).

The method of Embodiment C wherein the silane-grafted polyolefin blend and the crosslinkable-polyolefin blend are thermoplastics and the crosslinked polyolefin blend is a thermoset.

The method of Embodiment C or Embodiment C with any of the intervening features wherein the first polyolefin is an ethylene/α-olefin copolymer and the second polyolefin is a polypropylene homopolymer and/or a poly(ethylene-co-propylene).

What is claimed is:

1. A silane-crosslinked polyolefin elastomer blend comprising:
    a first polyolefin having a density less than 0.86 g/cm$^3$ wherein the first polyolefin is an ethylene/α-olefin copolymer,
    a second polyolefin having a percent crystallinity less than 40% wherein the second polyolefin is a propylene/α-olefin copolymer or a blend of propylene/α-olefin copolymer with an ethylene/α-olefin copolymer;
    from about 1 wt % to about 35 wt % polypropylene filler having a crystallinity greater than 40%; and
    silane crosslinks,
    wherein the silane-crosslinked polyolefin elastomer blend exhibits a compression set of from about 5.0% to about 35.0%, as measured according to ASTM D 395 (22 hrs @ 70° C.) and wherein the silane-crosslinked polyolefin elastomer blend has a density less than 0.90 g/cm$^3$,
    wherein the silane-crosslinked polyolefin elastomer blend is a thermoset,
    wherein the silane-crosslinked polyolefin elastomer blend exhibits a crystallinity of from about 5% to about 20%, and
    wherein the silane-crosslinked polyolefin elastomer blend does not display a Mullins effect or a Payne effect.

2. The silane-crosslinked polyolefin elastomer blend of claim 1 further comprising a microencapsulated foaming agent.

3. The silane-crosslinked polyolefin elastomer blend of claim 1, wherein the silane-crosslinked polyolefin elastomer blend comprises from about 3 wt % to about 10 wt % polypropylene filler and has a density is less than 0.70 g/cm$^3$.

4. The silane-crosslinked polyolefin elastomer blend of claim 1 wherein the silane-crosslinked polyolefin elastomer blend exhibits a crystallinity of from about 5% to about 10%.

5. The silane-crosslinked polyolefin elastomer blend of claim 1, wherein the silane-crosslinked polyolefin elastomer blend comprises from about 3 wt % to about 10 wt % polypropylene filler and has a density is less than 0.60 g/cm$^3$.

6. The silane-crosslinked polyolefin elastomer blend of claim 1, wherein the compression set is from about 15.0% to about 35.0%, as measured according to ASTM D 395 (22 hrs @ 70° C.).

7. The silane-crosslinked polyolefin elastomer blend of claim 1, wherein the silane-crosslinked polyolefin blend comprises from about 30 wt. % to about 70 wt. % of the first polyolefin.

8. The silane-crosslinked polyolefin elastomer blend of claim 1, wherein the second polyolefin is a blend of propylene/α-olefin copolymer with an ethylene/α-olefin copolymer and the second polyolefin comprises from about 20 wt % to about 40 wt % of the silane-crosslinked polyolefin elastomer blend.

9. The silane-crosslinked polyolefin elastomer blend of claim 1, wherein the silane crosslinks are derived from vinyltrimethoxy silane and/or a vinyltriethoxy silane crosslinkers present in an amount of from about 0.5 wt. % to about 5 wt. % of the silane-crosslinked polyolefin elastomer blend.

10. A silane-crosslinked polyolefin elastomer blend comprising:
    a first polyolefin having a density less than 0.86 g/cm$^3$ wherein the first polyolefin is an ethylene/α-olefin copolymer;
    a second polyolefin having a percent crystallinity less than 40% wherein the second polyolefin is a propylene/α-olefin copolymer or a blend of propylene/α-olefin copolymer with an ethylene/α-olefin copolymer;
    from about 1 wt % to about 35 wt % polypropylene filler having a crystallinity greater than 40%;
    vinyltrialkoxy silane-based crosslinks;
    wherein the silane-crosslinked polyolefin elastomer blend exhibits a compression set of from about 5.0% to about 35.0%, as measured according to ASTM D 395 (22 hrs @ 70° C.) and wherein the silane-crosslinked polyolefin elastomer blend has a density less than 0.70 g/cm$^3$,
    wherein the silane-crosslinked polyolefin elastomer blend is a thermoset,
    wherein the silane-crosslinked polyolefin elastomer blend exhibits a crystallinity of from about 5% to about 20%, and
    wherein the silane-crosslinked polyolefin elastomer blend does not display a Mullins effect or a Payne effect.

11. The silane-crosslinked polyolefin elastomer blend of claim 10, wherein the silane-crosslinked polyolefin blend comprises from about 30 wt. % to about 70 wt. % of the first polyolefin.

12. The silane-crosslinked polyolefin elastomer blend of claim 10, wherein the second polyolefin is a blend of propylene/α-olefin copolymer with an ethylene/α-olefin copolymer and the second polyolefin comprises from about 20 wt % to about 40 wt % of the silane-crosslinked polyolefin elastomer blend.

13. The silane-crosslinked polyolefin elastomer blend of claim 10, wherein the vinyltrialkoxy silane-based crosslinks are derived from a vinyltrimethoxy silane and/or vinyltriethoxy silane crosslinkers present in an amount of from about 0.5 wt. % to about 5 wt. % of the silane-crosslinked polyolefin elastomer blend.

14. The silane-crosslinked polyolefin elastomer blend of claim 10, further comprising from about 0.25 wt % to about 8 wt % of a condensation catalyst.

15. The silane-crosslinked polyolefin elastomer blend of claim 10, wherein the silane-crosslinked polyolefin elastomer blend comprises from about 3 wt % to about 10 wt % polypropylene filler and has a density is less than 0.60 g/cm$^3$.

16. The silane-crosslinked polyolefin elastomer blend of claim 10, wherein the silane-crosslinked polyolefin elastomer blend exhibits a crystallinity of from about 5% to about 10% and comprises a microencapsulated foaming agent.

17. The silane-crosslinked polyolefin elastomer blend of claim 10, wherein the compression set is from about 15.0% to about 35.0%, as measured according to ASTM D 395 (22 hrs @ 70° C.).

18. A method for making an elastomeric article, the method comprising:
    extruding a first polyolefin having a density less than 0.86 g/cm$^3$, wherein the first polyolefin is an ethylene/α-olefin copolymer; a second polyolefin having a crystallinity less than 40% wherein the second polyolefin is a propylene/α-olefin copolymer or a blend of propylene/α-olefin copolymer with an ethylene/α-olefin copolymer; a polypropylene filler having a crystallinity greater than 40%; a silane crosslinker and a grafting initiator together to form a silane-grafted polyolefin blend, wherein the polypropylene filler comprises from about 1 wt % to about 20 wt % of the silane-grafted polyolefin blend;
    extruding the silane-grafted polyolefin blend, a condensation catalyst and a foaming agent together to form a silane-crosslinkable polyolefin blend;
    molding the silane-crosslinkable polyolefin blend into an uncured elastomeric article; and
    crosslinking the crosslinkable-polyolefin blend of the uncured elastomeric article at an ambient temperature and an ambient humidity to form the elastomeric article having a density less than 0.70 g/cm$^3$,
    wherein the elastomeric article exhibits a compression set of from about 5.0% to about 35.0%, as measured according to ASTM D 395 (22 hrs @ 70° C.)),
    wherein the elastomeric article exhibits a crystallinity of from about 5% to about 20%,
    wherein the elastomeric article does not display a Mullins effect or a Payne effect; and
    wherein the silane-grafted polyolefin blend and the silane-crosslinkable polyolefin blend exhibit thermoplastic properties and the elastomeric article is a thermoset.

19. The method of claim 18, wherein the amount of polypropylene filler ranges from about 3 wt % to about 10 wt %.

20. The method of claim 18, wherein the foaming agent is a microencapsulated foaming agent.

* * * * *